United States Patent [19]

Young et al.

[11] Patent Number: 5,680,579
[45] Date of Patent: Oct. 21, 1997

[54] REDUNDANT ARRAY OF SOLID STATE MEMORY DEVICES

[75] Inventors: Paul R. Young, Cromwell; Peter L. Solari, Lebanon; Gregory J. Shumski, Colchester, all of Conn.; Yin Cheung So, Fremont, Calif.

[73] Assignee: Kaman Aerospace Corporation, Bloomfield, Conn.

[21] Appl. No.: 540,338

[22] Filed: Jan. 25, 1996

Related U.S. Application Data

[62] Division of Ser. No. 337,629, Nov. 10, 1994, abandoned.

[51] Int. Cl.$^6$ ............................ G06F 12/02; G06F 11/00
[52] U.S. Cl. ............... 395/484; 395/497.01; 395/497.04; 395/427; 371/40.4; 371/49.1; 371/51.1; 371/50.1
[58] Field of Search ........................... 365/200, 201; 395/484, 497.01, 497.04, 427; 371/40.4, 49.1, 51.1, 50.1

[56] References Cited

U.S. PATENT DOCUMENTS

| | | | |
|---|---|---|---|
| 4,914,656 | 4/1990 | Dunphy, Jr., et al. | |
| 4,993,030 | 2/1991 | Krakauer et al. | |
| 5,072,378 | 12/1991 | Manka. | |
| 5,263,003 | 11/1993 | Cowles et al. | 365/230.03 |
| 5,430,859 | 7/1995 | Norman et al. | 395/425 |
| 5,469,566 | 11/1995 | Hohenstein et al. | 395/182.04 |
| 5,519,843 | 5/1996 | Moran et al. | 395/430 |
| 5,537,534 | 7/1996 | Voigt et al. | 395/182.04 |

FOREIGN PATENT DOCUMENTS

| | | |
|---|---|---|
| 0 136 443 | 4/1985 | European Pat. Off. . |
| 0 245 029 | 5/1986 | European Pat. Off. . |
| 0 193 306 | 9/1986 | European Pat. Off. . |
| A-0613151 | 8/1994 | European Pat. Off. . |
| 2 202 656 A | 9/1988 | United Kingdom . |
| 2 231 984 A | 11/1990 | United Kingdom . |
| 2 250 838 A | 6/1992 | United Kingdom . |
| 2 255 843 A | 11/1992 | United Kingdom . |
| WO A 94-19746 | 9/1994 | WIPO . |

OTHER PUBLICATIONS

Computer Design, vol. 33, No. 2, 1 Feb. 1994, pp. 99–100 "Solid State Disk Puts Flash To Work"; How the CR–513 solid state solid disk drive works.
Computer Technology Review, vol. 14, No. 4, 1 Apr. 1994, Bouzari, A. "Raid Needs Proper Implementation"; p. 36.
The Allodyne Dorado High Performance Disk Array.
Conner Storage Systems Product Pricing Guide.
Raid Roundup—Picking the Numbers—The Essentials of Raid—Industrial Computing Apr. 1994, Christie.
Conner Storage Systems—Reliable, Fault Tolerant Network Storage, 1994.
Raid Aid: A Taxonomic Extension of the Berkeley Disk array Schema, Storage Computer Corporation, 1991.
Data Storage Systems Center—Technical Report #94–49 Jul. 31, 1994 RAID: High–Performance, Reliable Secondary Storage, Chen et al.

Primary Examiner—Viet Q. Nguyen
Attorney, Agent, or Firm—Fishman, Dionne, Cantor & Colburn

[57] ABSTRACT

A device employing a redundant array of solid state memory devices is presented, whereby RAID technology architecture is uniquely combined with solid state memory devices. The devices comprises a plurality of circuit boards assemblies mounted within a housing, preferably a housing which fits into a standard 5¼ inch computer drive bay or a rack mount housing. The circuit board assemblies are electrically connected to solid state memory devices, for example, flash memory PCMCIA cards. A data path controller circuit provides the interface between a host system and the flash memory cards.

28 Claims, 79 Drawing Sheets

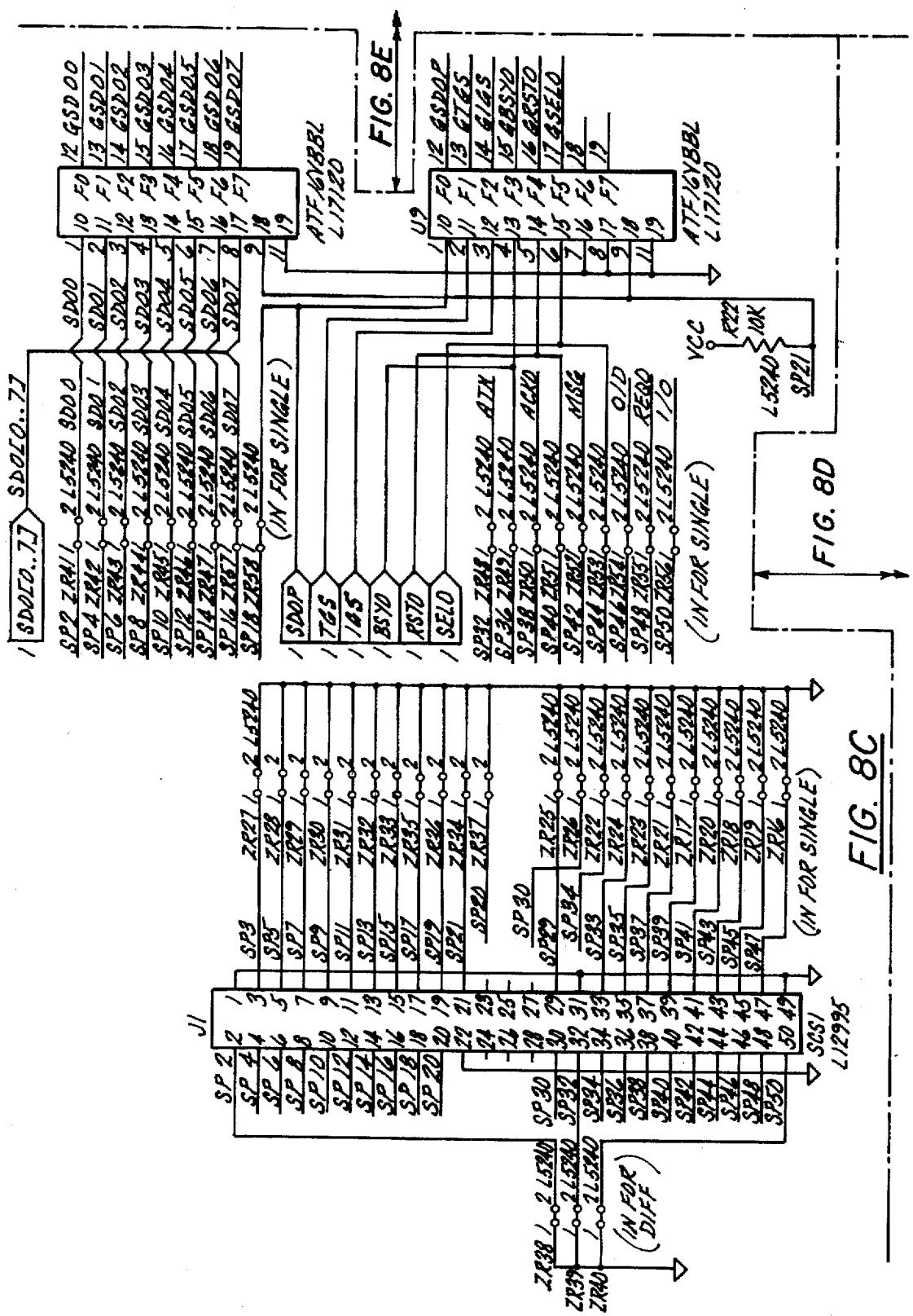

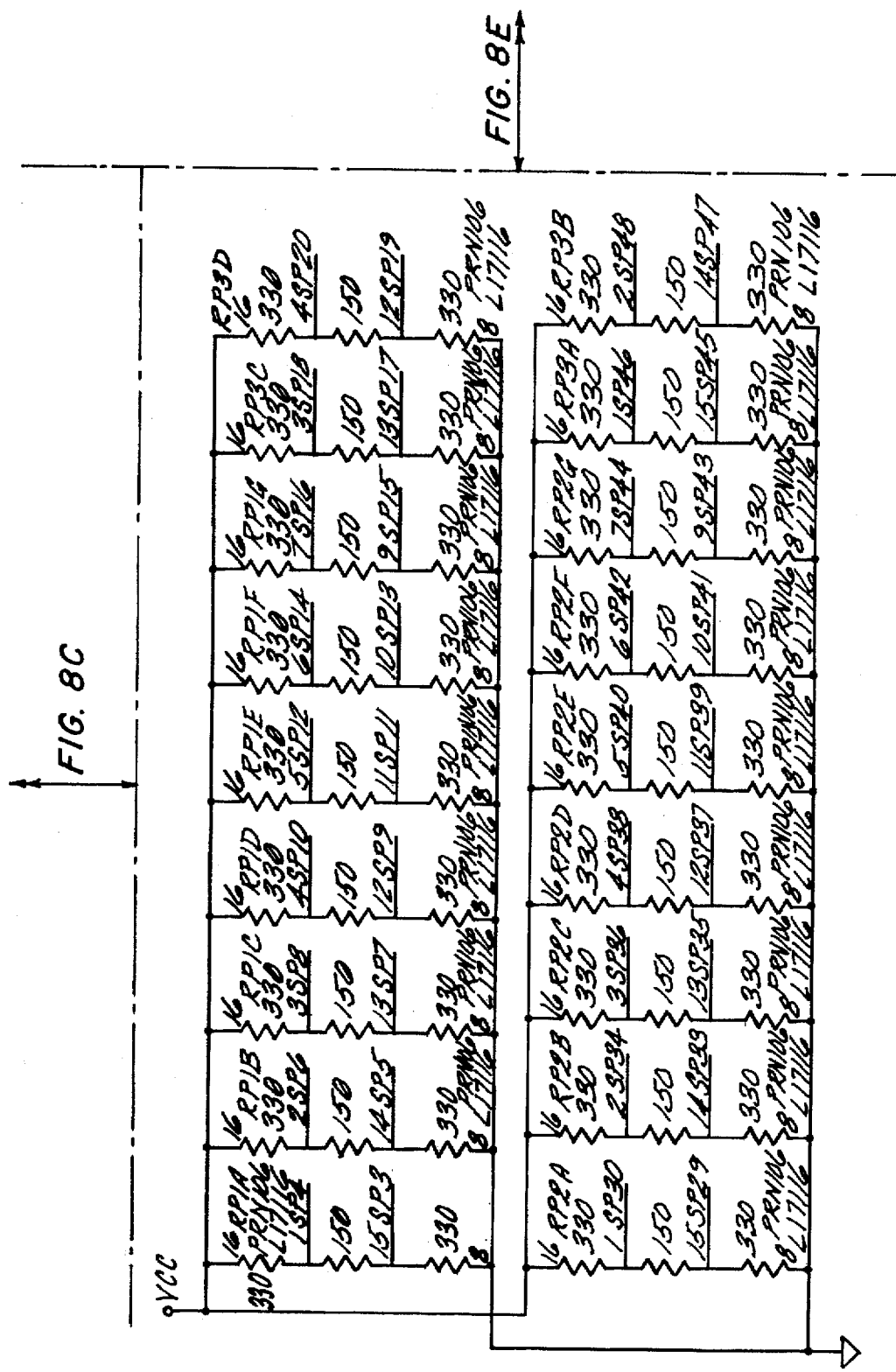

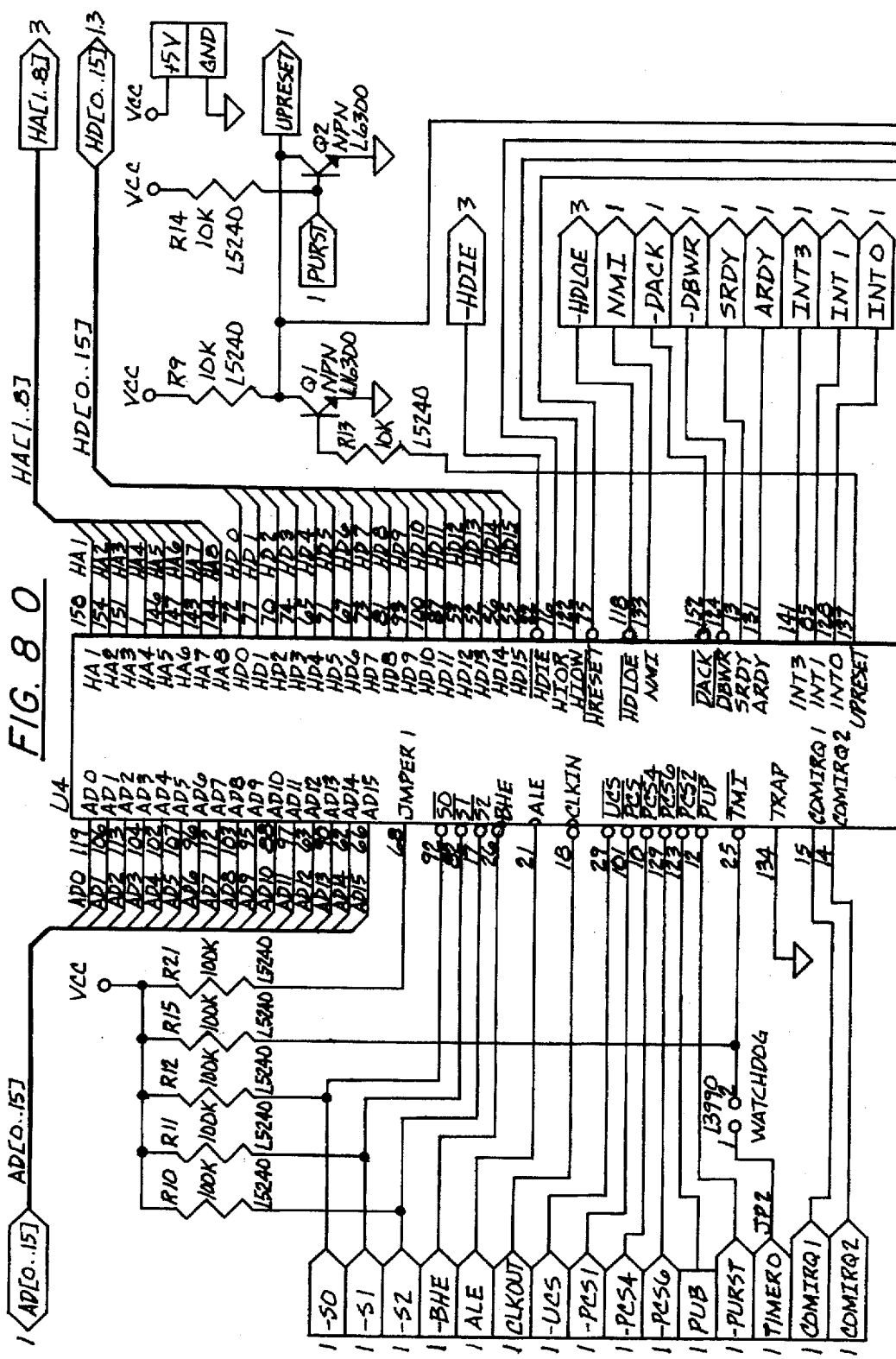

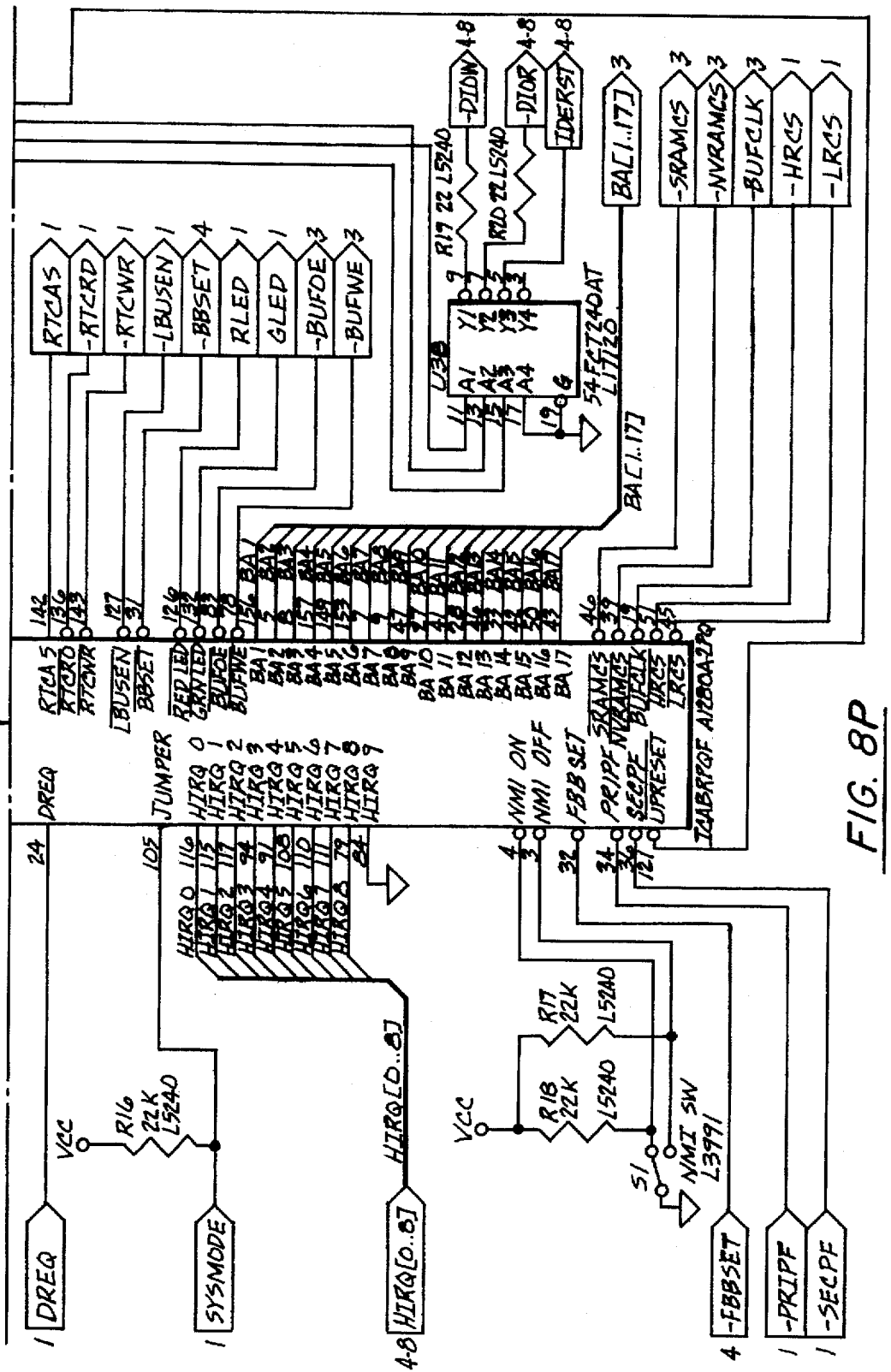

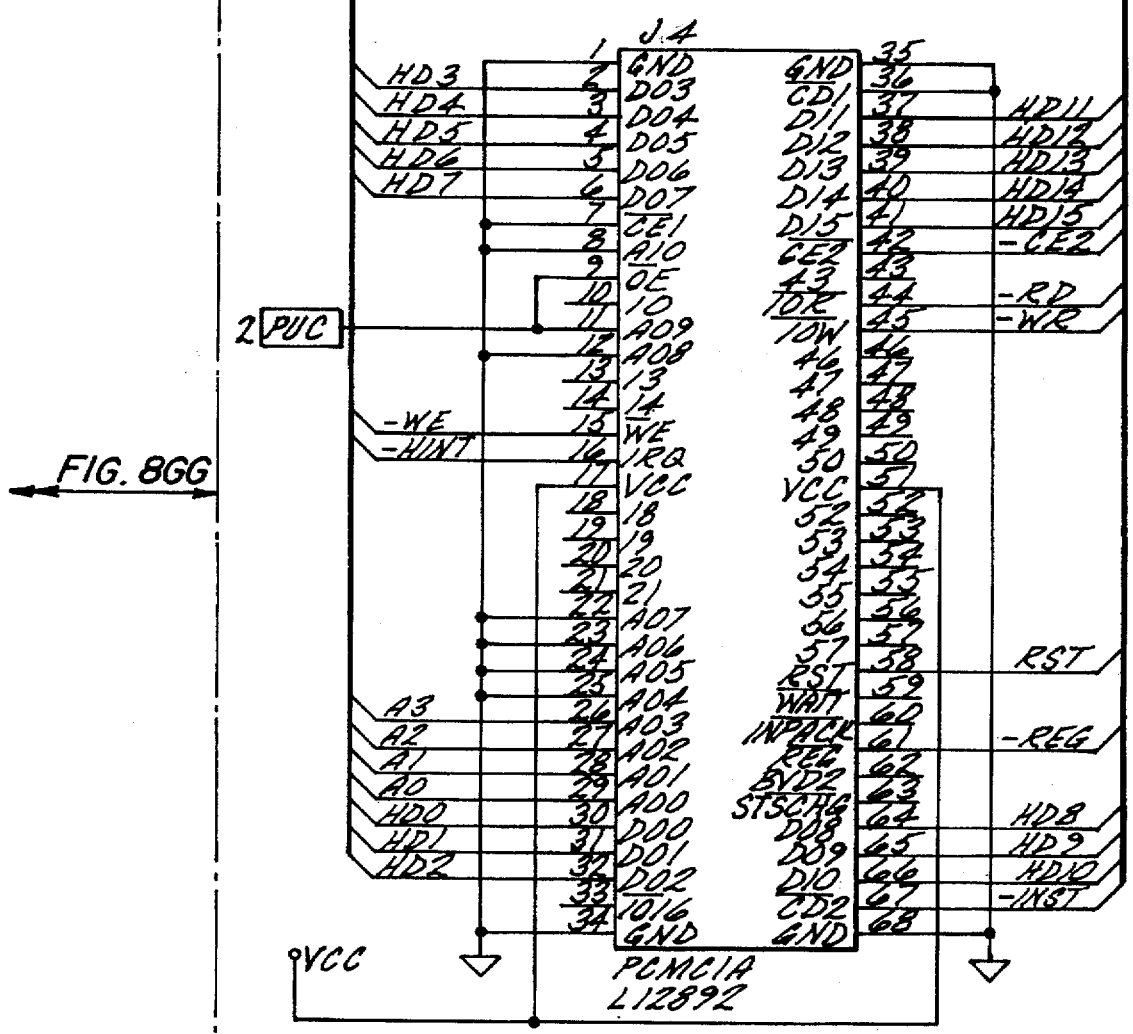
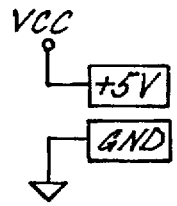
FIG. 8HH

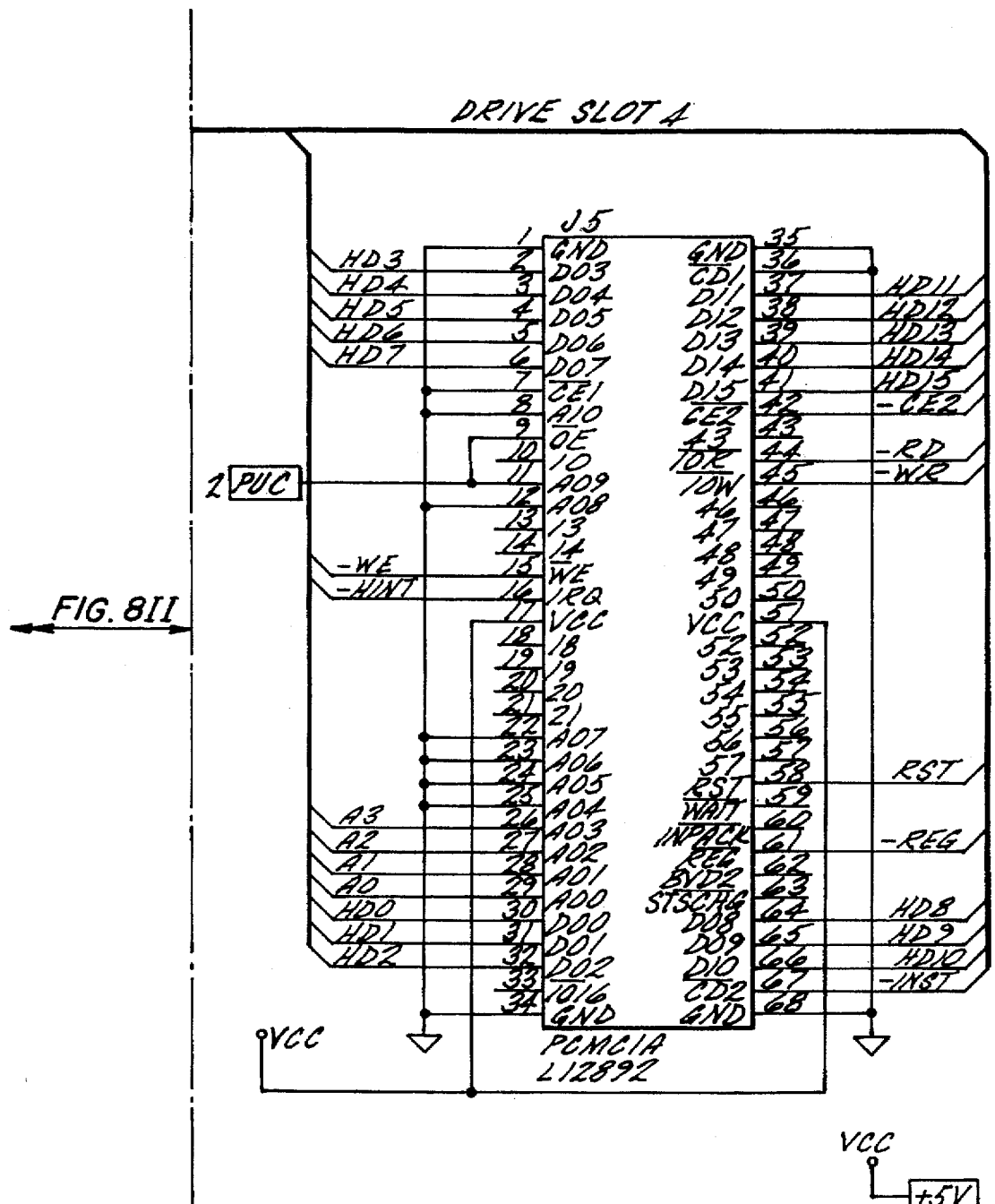
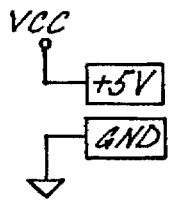
FIG. 8JJ

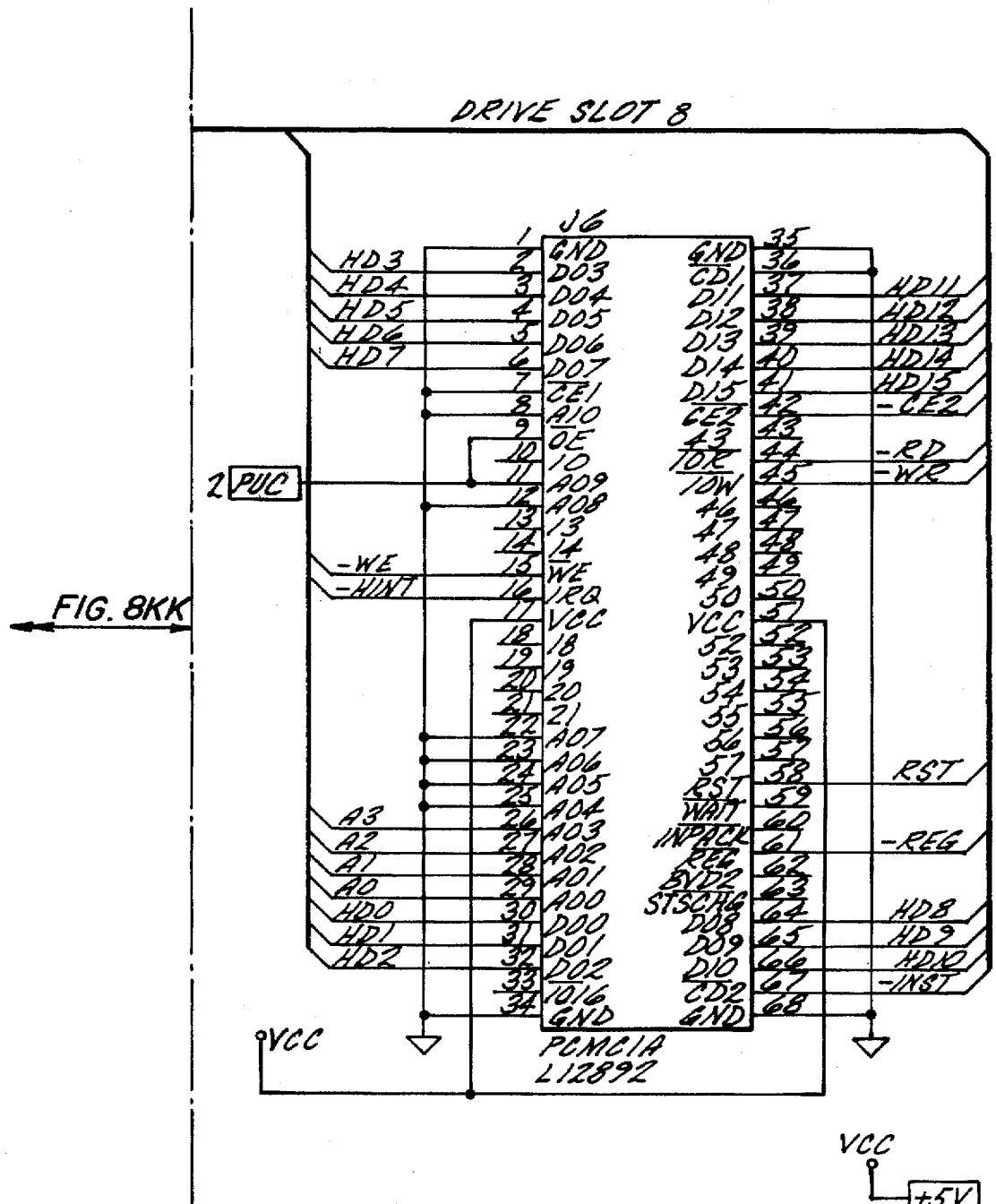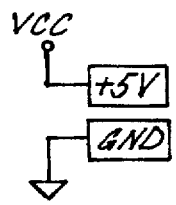
FIG. 8LL

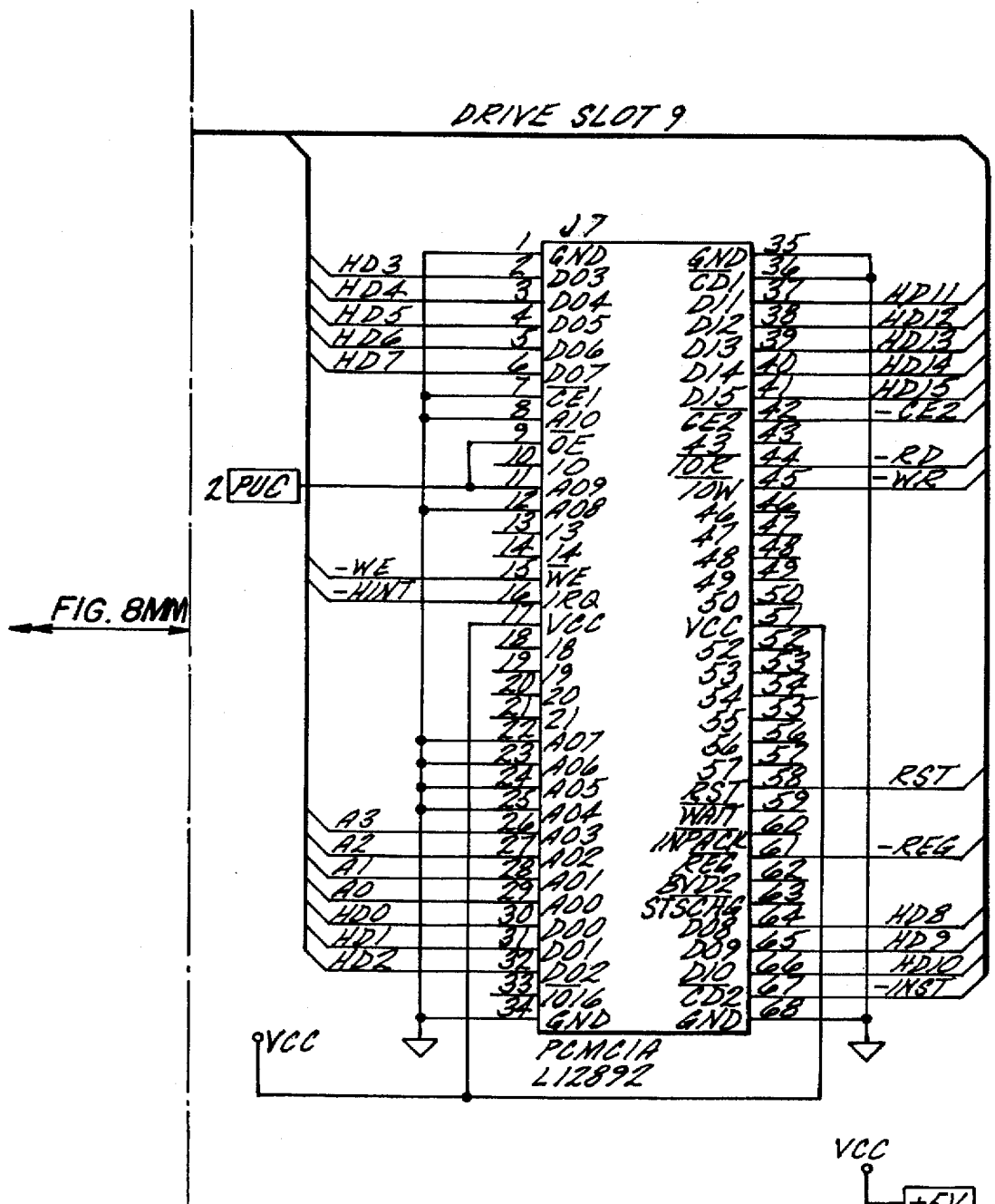
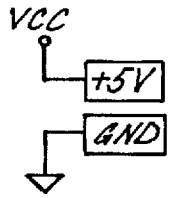
FIG. 8NN

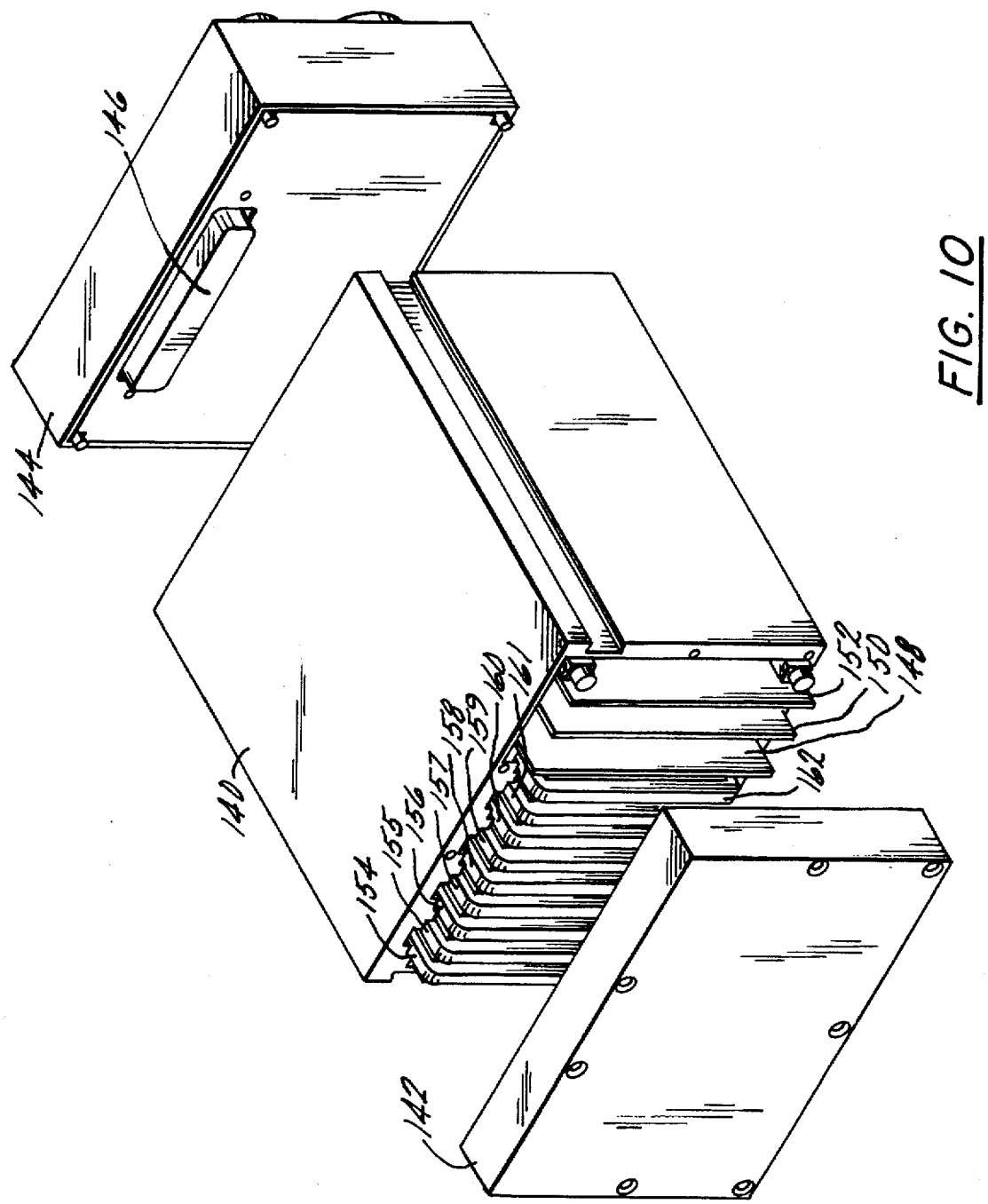

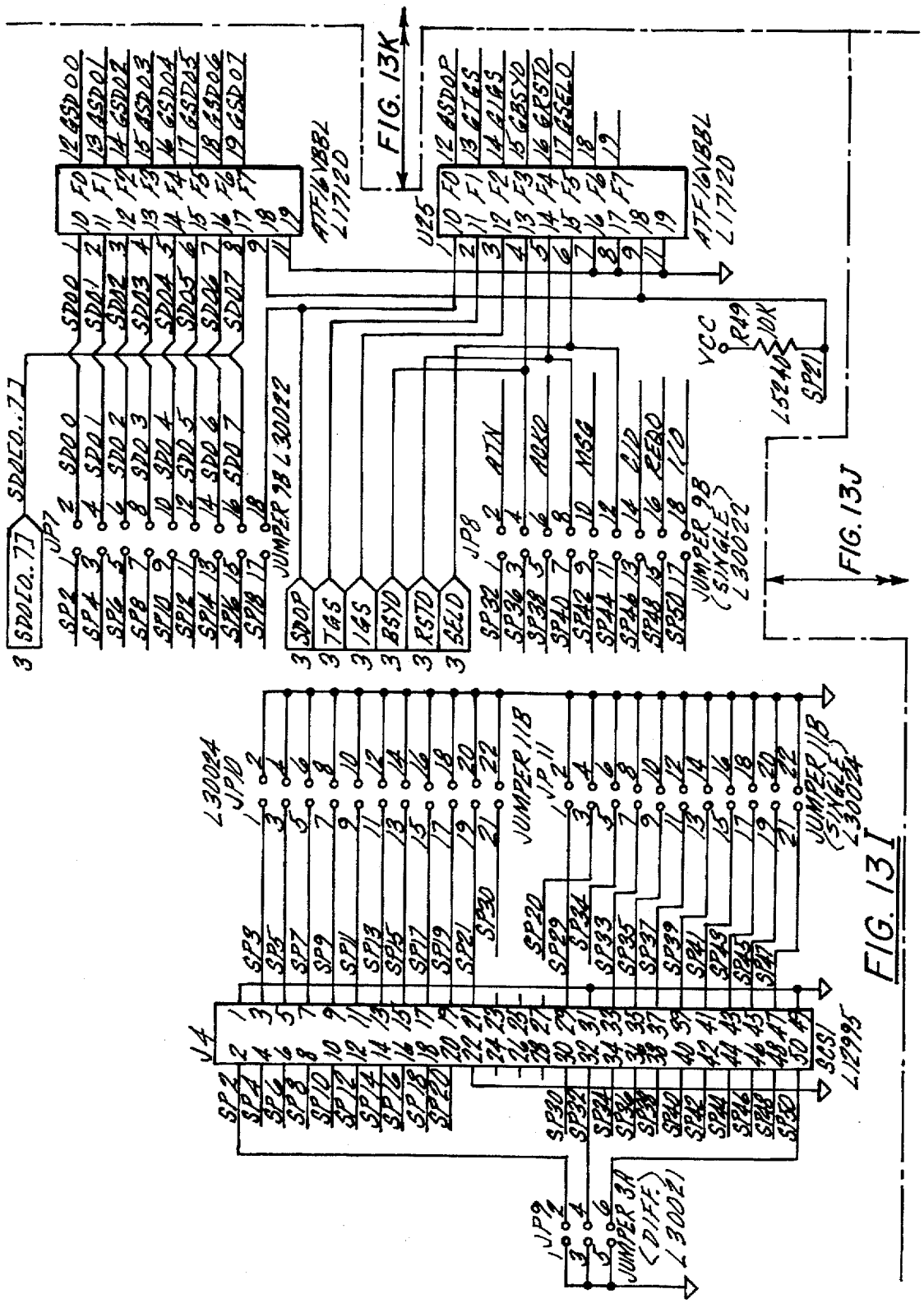

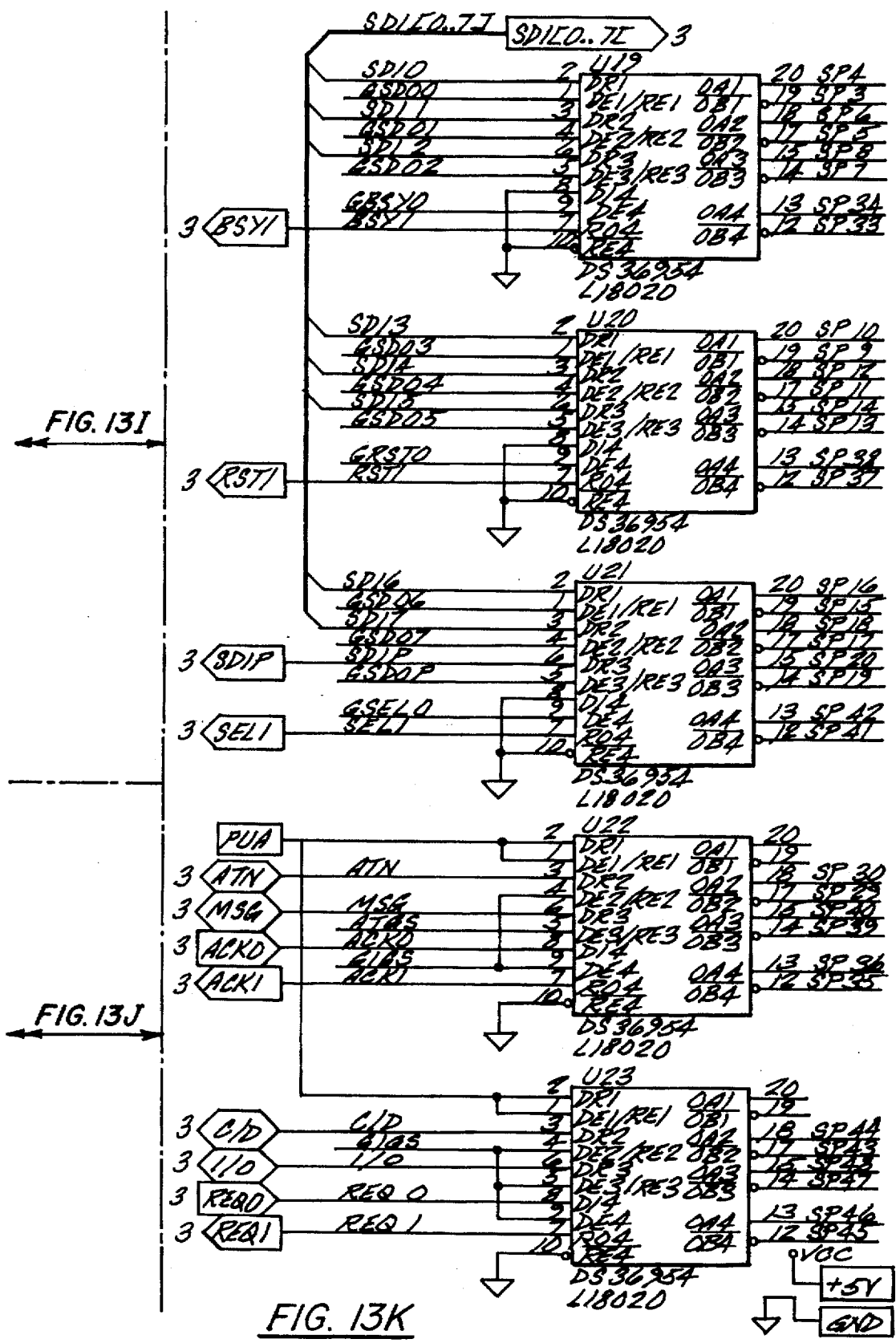

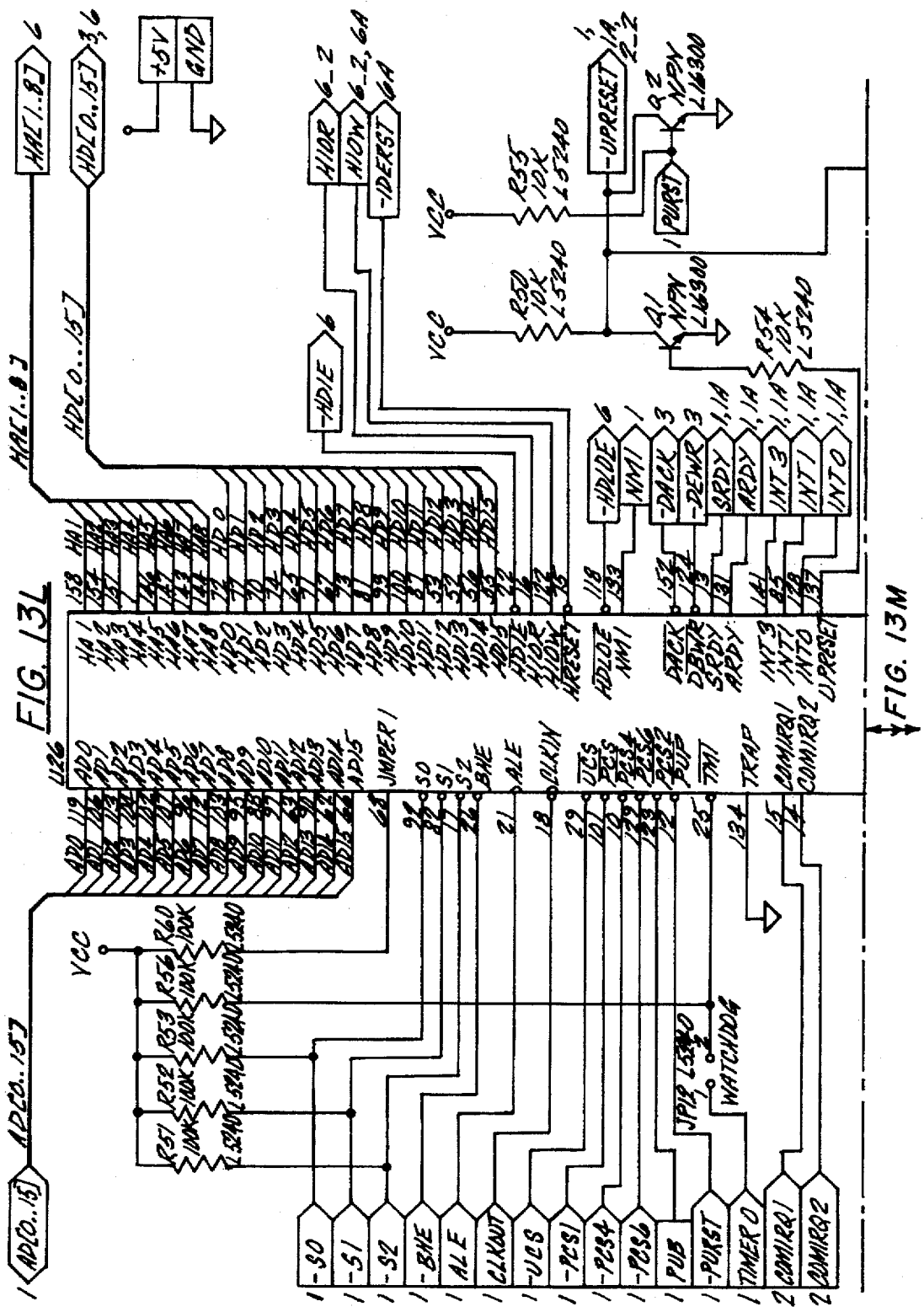

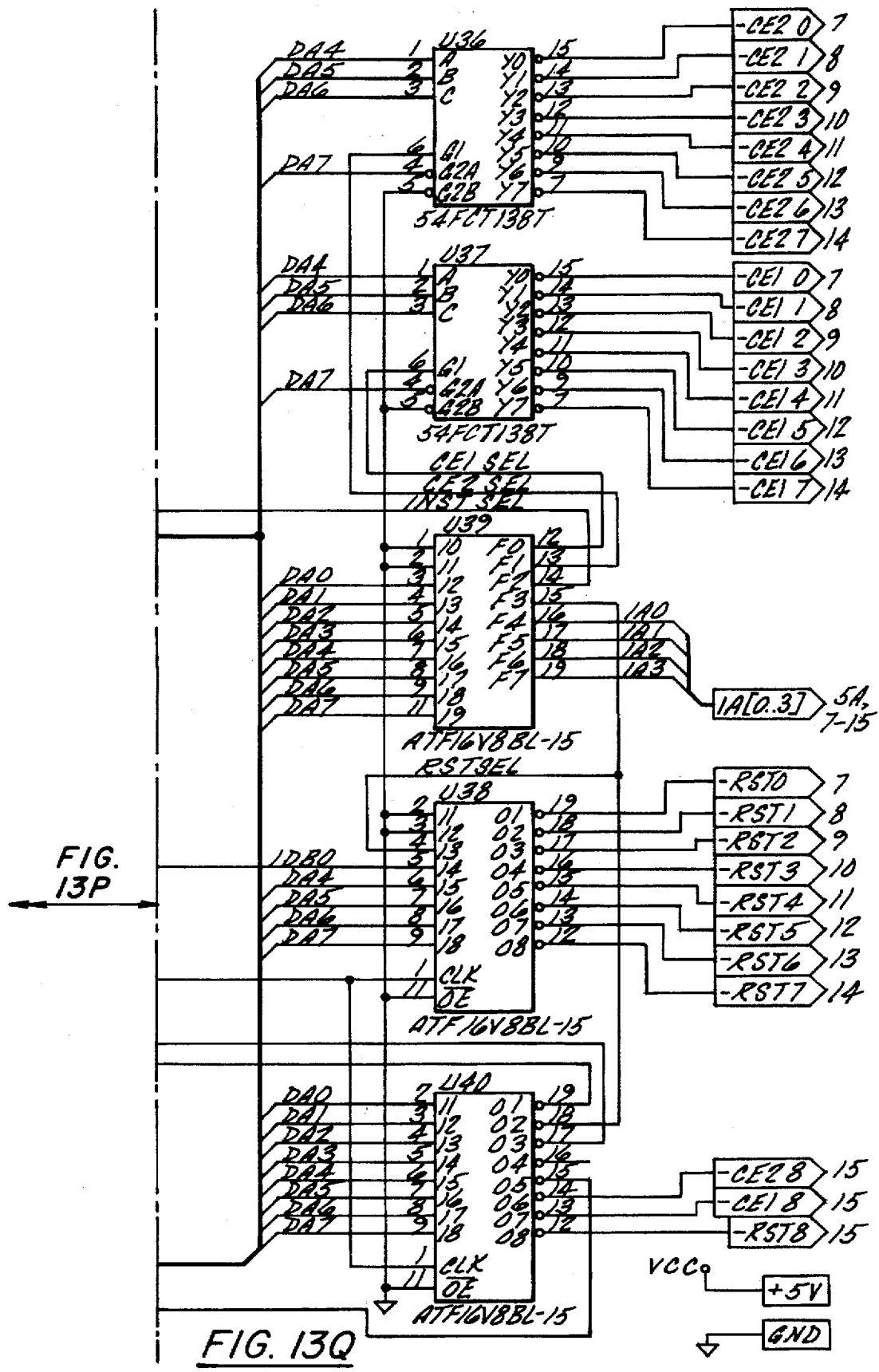

REDUNDANT ARRAY OF SOLID STATE MEMORY DEVICES

This application is a divisional of Ser. No. 08/337,629 filed Nov. 10, 1994, now abandoned.

BACKGROUND OF THE INVENTION

The present invention relates to memory devices. More particularly, the present invention relates to a redundant array of solid state memory devices.

Solid state memory devices are well known and include such devices as ROM (read only memory) and RAM (random access memory). These types of semiconductor based (solid state) mass storage devices are extremely rugged, highly reliable and highly efficient as compared to mechanically driven magnetic storage (memory) devices. Various such solid state device are discussed only briefly below, as each is commercially readily available and well known.

A dynamic random access memory (DRAM) utilizes a single transistor for each memory cell. DRAM is commonly used as computer main memory, but is generally considered unsuitable for non-volatile memory applications due to refresh and continuous power requirements.

A static random access memory (SRAM) is basically a high performance RAM, since several transistors per memory cell are utilized. SRAM has a lower memory density than DRAM, but does not require refresh or continuous power to maintain its memory.

An electronically erasable programmable read only memory (EEPROM or EPROM) utilizes two transistors per memory cell and does not require continuous power to maintain its memory. However, EEPROMs are limited in the number of overwrites to the device.

An erasable programmable read only memory (EPROM) utilizes a single transistor per memory cell, which is erasable by exposure to ultraviolet light projected through a window into the device. Unlike the EEPROM, the EPROM is cumbersome to use in the field, due to this requirement of an external device for erasing.

A FLASH EEPROM (referred to herein as flash memory) is a combination of EPROM and EEPROM technology. Flash memory utilizes a single transistor per memory cell, i.e., architecture similar to the EPROM, and is erased electronically, i.e., similar to the EEPROM. One type of flash cell architecture is commonly referred to as ETOX (EEPROM with tunnel oxide). The flash cells are erased by tunneling electrons, a so called Fowler-Nordeim Tunneling effect as is known. Flash memory is non-volatile (similar to magnetic medium memory devices) and erasure and overwriting is accomplished on compatible block sectors of the device, not on individual bytes or other data segments, as with magnetic medium memory devices. Flash memory has advanced beyond ETOX, with architecture configured for solid state applications fabricated using a triple polysilicon CMOS (complementary metal oxide semiconductor) process, such is commercially available from SunDisk Corp., Santa Clara, Calif., as part no. SDP5A-40. This triple polysilicon CMOS devices permits a 512 byte block erase size compatible with most disc operating systems, includes overerasure protection and provides a minimum of 200,000 erase/write cycles. Further, the serial architecture of the triple polysilicon CMOS device minimizes contact count which reduces die size, thereby providing a high density compact flash memory device. Flash memory is commonly packaged in a PCMCIA (personal computer memory card international association) format, for use in laptop and desktop computers as removable mass memory storage. The above discussed triple polysilicon CMOS devices is well suited for PCMCIA applications.

PCMCIA cards are presently defined as Type I, Type II and Type III. Type I cards generally contain software programs or extra memory Type II cards typically house modems (e.g. data and fax) and network adapters. Type III cards are thick enough to accommodate removable hard disk drives and wireless communication devices.

The above described solid state flash memory devices are significantly slower in read/write operations and have a significantly lower memory density than the well known mechanically driven magnetic media memory devices. However, such mechanically driven magnetic media memory devices are significantly less rugged and reliable than the solid state memory devices.

The reliability of the mechanically driven magnetic media memory devices has been dramatically improved by the introduction of RAID (redundant array of inexpensive disks) technology. In accordance with RAID, a plurality of magnetic media disks are assembled in an array and through a hardware/software interface, presents itself to a host system as a single logical physical disk drive. A hardware based RAID system employs dedicated electronic circuitry to perform the processing functions of the RAID system. A software based RAID system employs hardware and software which locates processing functions of the RAID system on the host CPU (central processing unit). RAID is used as a reliable computer mass memory storage device which minimizes the risk of data loss.

While the individual drives in a RAID system are still subject to the same failure rates, redundant arrays ensure that data is available even if one of the drives fails. For example, with five disk each having a 250,000 hour MTBF (mean time between failure) in a RAID array, the RAID system mean time between data unavailability (i.e., two drives failing at the same time) is theoretically 250,000,000,000 hours, in other words about 29,000,000 years.

Redundancy is a method of storing redundant data on drives within the array, so that with the failure of a single drive, the data from the failed disk can be reconstructed using the redundant data from the other operating drives. This mathematical technique of storing redundant data is well known and is referred to as parity, which typically uses an exclusive or function, and is an important feature of RAID.

A RAID Advisory Board has been established whereby standard RAID configurations are being defined as industry standards. By way of example, RAID-0 has disks with data stripped across the drives. Stripping is a known method of quickly storing blocks of data across a number of different drives. With RAID-0 each drive is read independently and there is no redundancy. Accordingly, the RAID-0 configuration improves speed performance but does not increase data reliability, as compared to individual drives. RAID-1 defines a configuration where data is written in identical form, or mirrored onto two or more drives. With this configuration many drives are required and therefore it is not an economical solution to data reliability. RAID-2 utilizes complex ECC (error correction codes) codes written on multiple redundant disks. RAID-3 incorporates redundancy using a single disk drive to support the extra memory needed for parity, which is shared among all of the drives. This configuration is commonly used where high transfer rates are required and/or long blocks of data are used. The other disk drives (i.e., other than the parity drive) in the RAID-3 configuration operate on every I/O (input/output) transaction handled by the array, i.e., parallel access. RAID-4 is similar to RAID-3 in that it also uses interleaved parity, however unlike RAID-3, RAID-4 uses block-interleaved parity and not bit-interleaved parity. Accordingly, RAID-4 defines a parallel array using block striping and a single redundant parity disk. The RAID-5 configuration has parity shared across all drives in the array. However, in the RAID-5 configuration the disks are independent, i.e., independent access, which is used with many I/O request as it can more rapidly handle concurrent I/O transactions. The RAID-5 configuration is commonly used with multi-user networked workstations. Typically with RAID-1 and higher configurations, one disk can fail, be removed and replaced without interruption. Thereafter a new drive is quickly reconstructed, returning the system its original configuration. Such RAID type systems are, for example, commercially available from Allodyne, Freemont, California, identified as The Allodyne Dorado High Performance Disk Array.

SUMMARY OF THE INVENTION

The above-discussed and other drawbacks and deficiencies of the prior art are overcome or alleviated by the device employing a redundant array of solid state memory devices of the present invention. In accordance with the present invention, RAID technology type architecture is uniquely combined with solid state memory devices. The redundant array of solid state memory devices provides significantly faster read/write operations (on the order of 8 to 10 time faster) and significantly higher memory density than the solid state memory devices individually, and is extremely more rugged and reliable than the mechanically driven magnetic media memory devices.

The devices comprises a plurality of circuit boards assemblies mounted within a housing, preferably a housing which fits into a standard 5¼ inch computer drive bay or a rack mount housing. The circuit board assemblies are electrically connected to solid state memory devices, for example, flash memory PCMCIA cards.

A data path controller circuit provides the interface between a host system and the flash memory cards. The data path controller circuit comprises a data path control ASIC (application specific integrated circuit) and associated cache buffer for data path control, parity generation and data stripping. The data path control ASIC interfaces with a microprocessor, which manages the setup of the data path control ASIC, controls SCSI-2 controller, controls a RS-232 ATE (automatic test equipment) interface port, and maintains error and status logs for the system. Data transfer between a host computer and the device of the present invention is in accordance with SCSI-2 Standard protocol. Operating software is stored redundantly in the flash memory cards and downloaded to a 1 MB RAM during boot-up of the system. The boot-up firmware program resides in a 32 Kbyte EPROM. The firmware includes system initialization, built-in-test, SCSI and data management routines. The built-in-test provides failure detection and location functions for both organizational and intermediate levels of maintenance.

Each of the flash memory PCMCIA cards may be encapsulated in an hermetically sealed metal case suitable for use in hostile environments. Further, each of the flash memory PCMCIA cards is organized in sectors and a portion of each memory element is configured as spare memory space. Each flash memory PCMCIA card comprises a flash memory, an intelligent controller and a memory control microprocessor as is known. Algorithms stored in the intelligent controller are implemented by the memory control microprocessor for utilizing this spare memory space to assure reliable data integrity.

Any of the aforementioned RAID type configurations (e.g., RAID-0 through 5) may be employed with the solid state memory devices as such is typically implemented in software or hardware as is well known. Further, any electrical memory devices suitable for mass storage many be configured in a redundant array as defined herein.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

FIG. 10 is an exploded front perspective view of a device employing a redundant array of solid state memory devices, in accordance with an alternate embodiment of the present invention;

DESCRIPTION OF THE PREFERRED EMBODIMENT

The present invention uniquely combines RAID technology architecture with solid state memory devices, whereby many the aforementioned deficiencies of each are overcome. More specifically, a device employing a redundant array of solid state memory deices is presented. The redundant array of solid state memory devices provides significantly faster read/write operations and significantly higher memory density than the solid state memory devices individually, and is extremely more rugged and reliable than the mechanically driven magnetic media memory devices.

Figure 1:
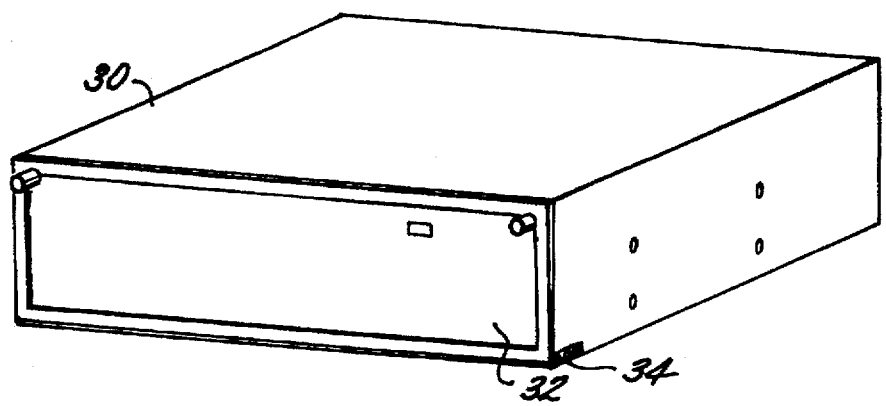
FIG. 1 is a front perspective view of a device employing a redundant array of solid state memory devices with the front panel thereof closed, in accordance with the present invention.
Figure 2:
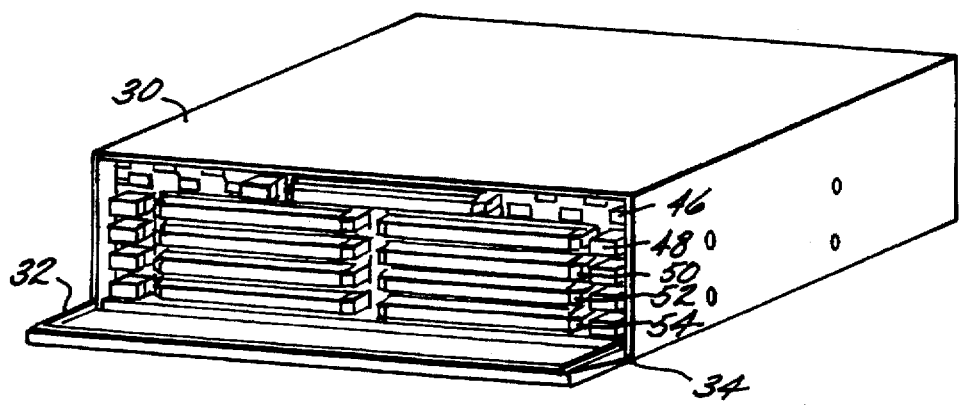
FIG. 2 is a front perspective view of the device of FIG. 1 with the front panel open.
Figure 3:
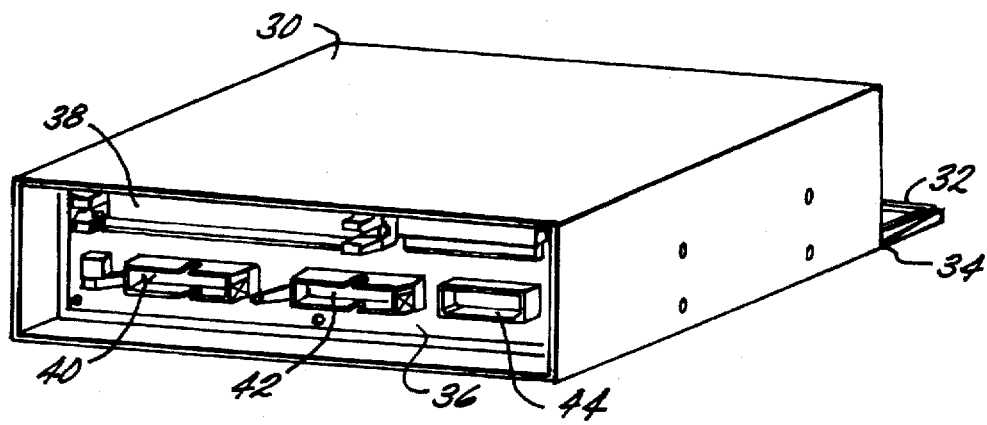
FIG. 3 is a rear perspective view of the device of FIG. 1.

Referring to FIGS. 1–3, a housing 30 which fits into a standard half height 5¼ inch computer drive bay includes a front door panel 32 pivotably attached by a pair of hinges 34. A rear panel 36 includes access to a SCSI-2 (small computer system interface) connector 38, two RS-232 connectors 40 and 42, and a power connector 44, each of which is attached to a backplane (not shown). A plurality of circuit boards assemblies 46, 48, 50, 52 and 54 are mounted within housing 30 and are connected to the backplane.

Figure 4:
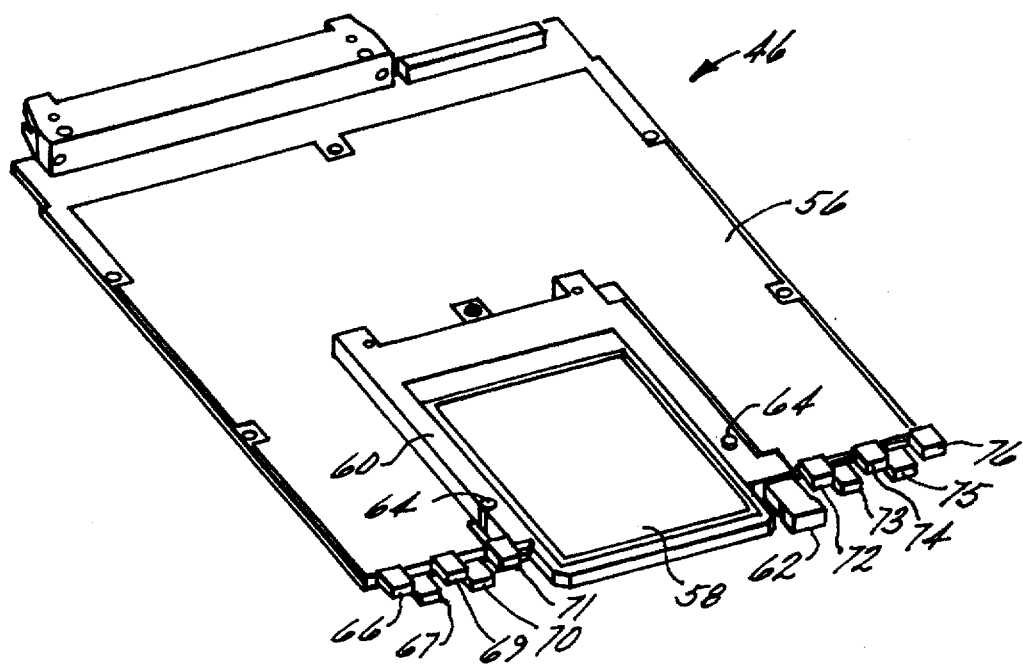
FIG. 4 is a diagrammatic perspective view of a circuit board assembly removed from the device of FIG. 1.

Referring to FIG. 4, circuit board assembly 46 is shown. Circuit board assembly 46 comprises a circuit board 56 having electronic components mounted thereon with interconnecting circuitry (not shown). A solid state memory device, in this example a 5–40 Mbyte flash memory PCMCIA card 58 (e.g., part no. SPD5A-40, commercially available from SunDisk Corp., Santa Clara, Calif.) which is electronically connected to circuit board 56 via its standard 68 pin connector. Flash memory card 58 is mechanically secured to circuit board 56 by card bracket assembly 60 which includes means, i.e., button 62, for releasing card 58 from assembly 60. Assembly 60 is secured to circuit board 56 by standard fasteners 64. Such a card bracket assembly 60 is commercially available from Hirose Electronics, part no. IC7-68Pd-127SF-EJR. A plurality of LEDs (light emitting diodes) 66–76 are mounted at the exposed end of circuit board 56 for displaying the status of the system. One LED is dedicated to monitoring the status of each flash memory card in the system, in the present example there are nine flash memory cards, and one LED is dedicated to monitoring overall system status.

Figure 5:
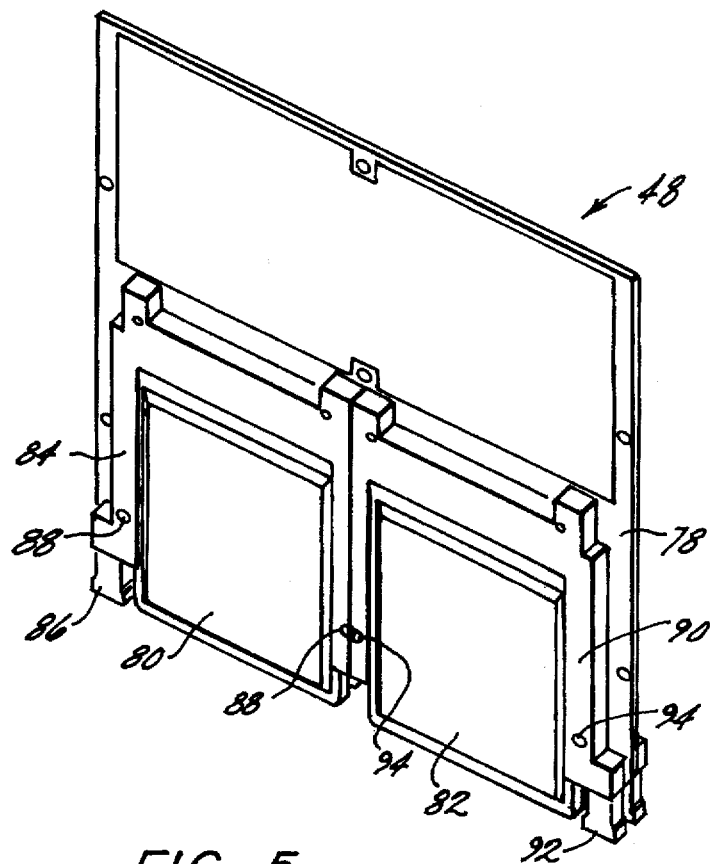
FIG. 5 is a diagrammatic perspective view of another circuit board assembly removed from the device of FIG. 1.

Referring to FIG. 5, circuit board 48 is shown. Only circuit board 48 is described as it is similar to circuit boards 50, 52 and 54. Circuit board 48 comprises a circuit board 78 having electronic components mounted thereon with interconnecting circuitry (not shown). Two solid state memory devices, in this example 5–40 Mbyte flash memory PCMCIA cards 80 and 82 (e.g., part no SPD5A-40, commercially available from SunDisk Corp., Santa Clara, Calif.) which are electronically connected to circuit board 78 via their standard 68 pin connectors. Flash memory card 80 is mechanically secured to circuit board 78 by card bracket assembly 84 which includes means, i.e., button 86, for releasing card 80 from assembly 84. Assembly 84 is secured to circuit board 78 by standard fasteners 88. Flash memory card 82 is mechanically secured to circuit board 78 by card bracket assembly 90 which includes means, i.e., button 92, for releasing card 82 from assembly 90. Assembly 90 is secured to circuit board 78 by standard fasteners 94. Such card bracket assemblies 84 and 90 are commercially available from Hirose Electronics, as part no. IC7-68Pd-127SF-EJR.

Figure 6:
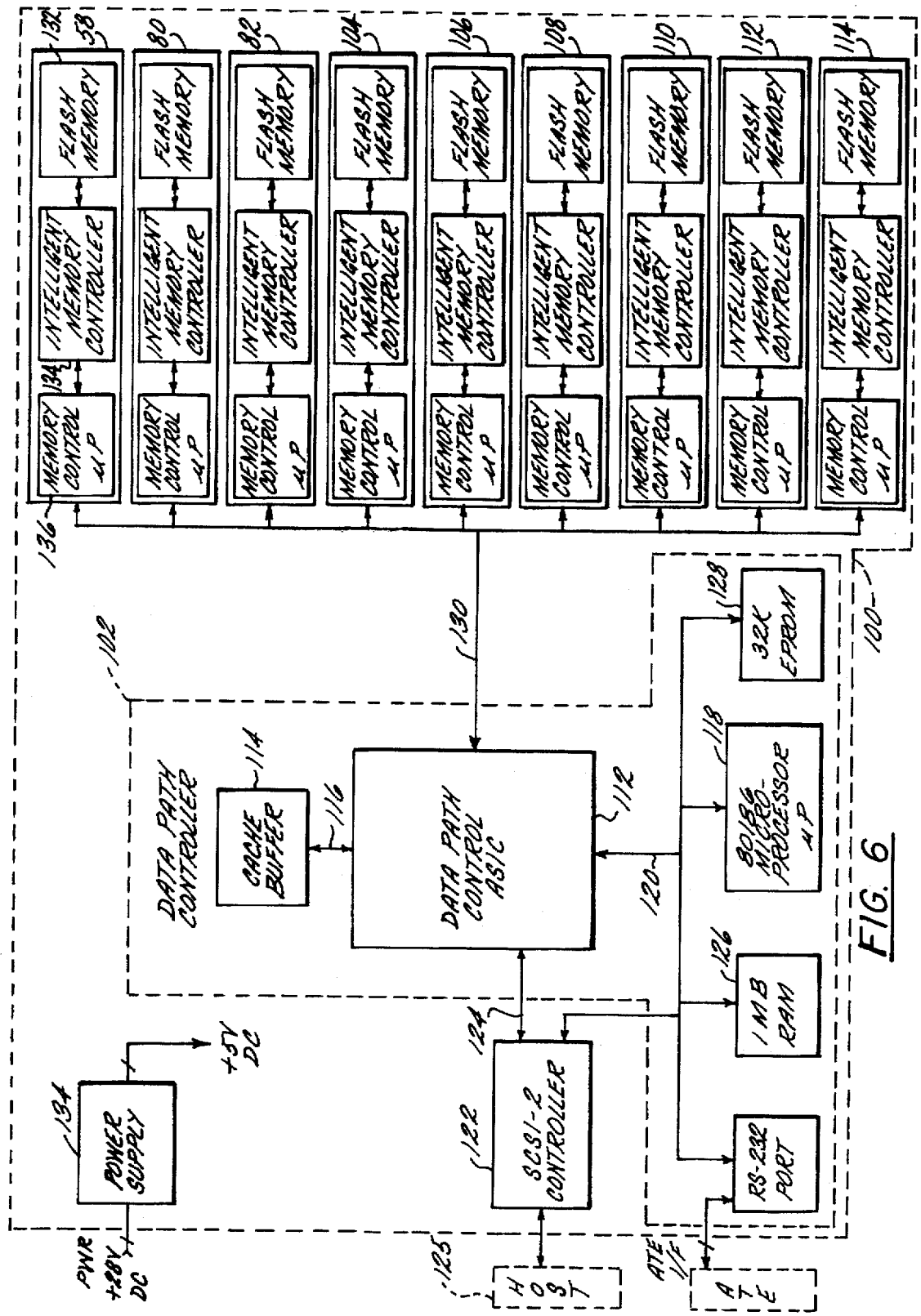
FIG. 6 is an schematic block diagram of the electronics of the device of FIG. 1.

Referring now to FIG. 6, an schematic block diagram for the redundant array electronics is shown generally at 100. A data path controller circuit 102 provides the interface between a host system and flash memory cards, 58, 80, 82, 104, 106, 108, 110, 112 and 114. Flash memory card 58 is disposed on circuit board assembly 46. Flash memory cards 80 and 82 are disposed on circuit board assembly 48. Flash memory cards 104 and 106 are disposed on circuit board assembly 50. Flash memory cards 108 and 110 are disposed on circuit board assembly 52. Flash memory cards 112 and 114 are disposed on circuit board assembly 54.

Data path controller circuit 102 comprises a data path control ASIC (application specific integrated circuit) 112 for data path control, parity generation and data stripping. Data path control ASIC 112 interfaces with an associated cache buffer 114 over a bus 116. Data path control ASIC 112 interfaces with a microprocessor 118 over a bus 120. Microprocessor 118 operates on a 40 Mhz clock, manages the setup of data path control ASIC 112, controls a SCSI-2 controller 122, controls a 9600 baud RS-232 ATE (automatic test equipment) interface port 124, and maintains error and status logs for the system. Microprocessor 118 is, for example, commercially available from Intel as part no. TS80C186XL-20. The ATE interface is a conventional RS-232 serial communication port which may be connected to an ASCII terminal or to a communications program to perform terminal evaluation. Data path control ASIC 112 interfaces with SCSI-2 controller 122 over a bus 124, whereby data transfer between a host computer 125 and data path control ASIC 112 are in accordance with SCSI-2 Standard protocol. SCSI-2 controller 122 implements data management and interface protocol. Operating firmware is stored redundantly in the flash memory cards and downloaded to a 1 MB RAM 126 during boot-up of the system. The boot-up program resides in a 32 Kbyte EPROM 128. RAM 126 also provides for a processor scratch pad and storage of program variables. The firmware includes system initialization, built-in-test, SCSI and data management routines. The built-in-test provides failure detection and location functions for both organizational and intermediate levels of maintenance. Built-in-test is initiated by remote commands and self-monitoring of operating modes. Fault status indication is provided remotely by way of SCSI bus fault indicator signals. DMA (direct memory access) transfers are supported between SCSI-2 controller 122 and RAM 126 and between RAM 126 and the flash memory cards. Communication between data path control ASIC 112 and the flash memory cards is over a bus 130.

Each of the flash memory PCMCIA cards is preferably encapsulated in an hermetically sealed metal case, such as described in U.S. patent application Ser. No. 08/318,507, filed Oct. 5, 1994, entitled HERMETICALLY SEALED PC CARD UNIT, which is expressly incorporated herein by reference. These hermetically sealed cards can withstand severe environmental conditions, i.e., wide temperature range operability, altitude, shock, vibration, full immersion in water, rain, salt spray, sand and dust, hydraulic fluid, and EMI tolerance.

Further, each of the flash memory PCMCIA cards is organized in 512 byte sectors and a portion of each memory element is configured as spare memory space. Each flash memory PCMCIA card comprises a flash memory 132, an intelligent controller 134 and a memory control microprocessor 136 as is known. Algorithms stored in intelligent controller 134 are implemented by memory control microprocessor 136 for utilizing this spare memory space to assure reliable data integrity.

A power supply circuit 134 comprises a power converter, power supply regulators and system enable function circuitry to provided a regulated 15 VDC to the system.

As stated above communication is in accordance with the SCSI-2 Standard. In accordance with the SCSI-2 Standard, information transfers are handled through nine control signals and nine data signals comprising an eighteen signal interface bus. Communication on the bus is between an initiator and a target, whereby an initiator (i.e., the host computer) originates an operation and a target (i.e., the redundant array of solid state memory devices) performs the operation.

Figure 7:
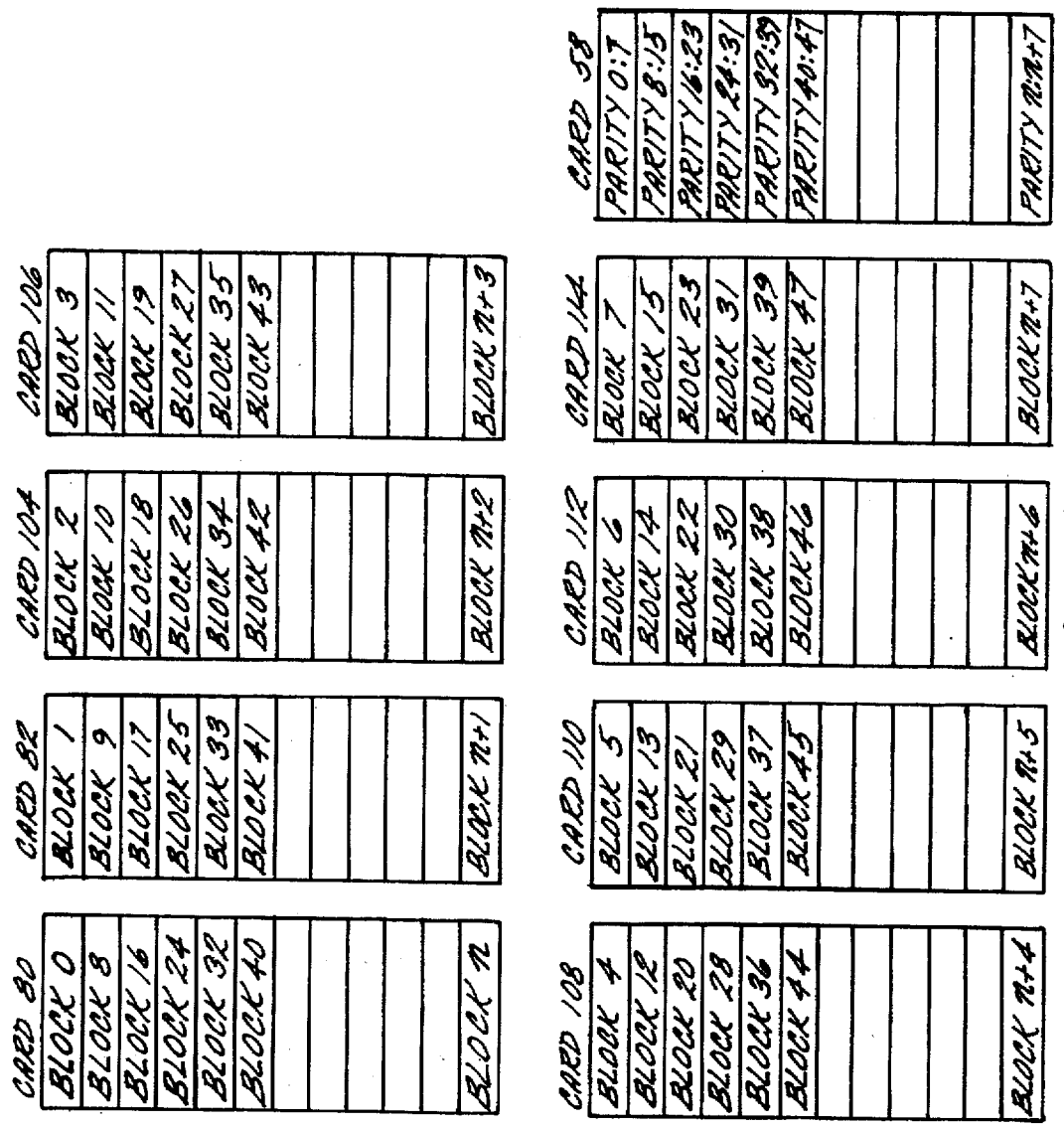
FIG. 7 is a diagrammatic illustration of the memory configuration of the flash memory cards found in the device of FIG. 1 in accordance with a RAID-3 type configuration.

Referring to FIG. 7, the present example employs a RAID-3 type configuration using nine flash memory cards 58, 80, 82, 104, 106, 108, 110, 112 and 114 to store data in a parallel fashion. It will be appreciated, however that the present invention is not a RAID system as such by definition employs magnetic disk as opposed to the solid state memory devices of the present invention. Eight cards 80, 82, 104, 106, 108, 110, 112 and 114 are used to store data, while card 58 is dedicated to storing parity information. The parity information is used to reconstruct data in the event of a failure on any one of the cards. This parallel configuration allows data to be written to or read from all cards simultaneously, which results in a multiplication of the flash memory card's data transfer rate. By way of illustration, a single flash memory PCMCIA card has a data transfer rate of 0.5 Mbytes/second and the array of flash memory PCMCIA cards of the present example has a data transfer rate of 4 Mbytes/second. While it is possible to write and read in single blocks (typically 512 bytes per block), no additional overhead is required to write or read from all of the card, whereby the optimal performance is obtained when writing or reading a large number of blocks with each command. This configuration finds application when large data files are used and when high data transfer rate are required.

It will be appreciated that while a RAID-3 type configuration is described for the redundant array of solid state memory devices, any of the RAID type configurations may be employed with the solid state memory devices. Further, that redundancy is employed herein has a method of storing redundant data on flash memory PCMCIA cards within the array, so that with the failure of a single card, the data from the failed card can be reconstructed using the redundant data from the other operating cards. This mathematical technique of storing redundant data is well known and is referred to as parity, which typically uses an exclusive or function, and is an important feature of the present invention.

In accordance with the present invention, the following configurations are contemplated, but are not intended to be limited thereto. A redundant array of flash memory PCMCIA cards configured so that data is stripped across the cards is similar to the RAID-0 type configuration. Stripping is a method of quickly storing blocks of data across a number of different cards. In this configuration each card is read independently and there is no redundancy. Accordingly, this RAID-0 type configuration improves speed performance but does not increase data reliability, as compared to individual cards. A redundant array of flash memory PCMCIA cards configured so that data is written in identical form, or mirrored onto two or more cards is similar to the RAID-1 type configuration. With this configuration many cards are required and therefore it is not an economical solution to data reliability. A redundant array of flash memory PCMCIA cards utilizing complex ECC (error correction codes) codes written on multiple redundant cards is similar to the RAID-2 type configuration. A redundant array of flash memory PCMCIA cards incorporating redundancy using a single card to support the extra memory needed for parity, which is shared among all of the cards (i.e., bit-interleaved parity), is similar to the RAID-3 type configuration and is described herein. In accordance with which the other cards (i.e., other than the parity card) operate on every I/O (input/output) transaction handled by the array, i.e., parallel access. A redundant array of flash memory PCMCIA cards having a parallel array using block striping and a single redundant parity card (i.e., block-interleaved parity) is similar to the RAID-4 configuration. A redundant array of flash memory PCMCIA cards having parity shared across all cards in the array is similar to the RAID-5 type configuration. However, in this configuration the cards are independent, i.e., independent access, which is used with many I/O request as it can more rapidly handle concurrent I/O transactions. This configuration is believed to be well suited for use with multi-user networked workstations. With RAID-1 type and higher configurations, one card can fail, be removed and replaced without interruption. Thereafter a new card is quickly reconstructed, returning the system its original configuration.

Figure 8A:
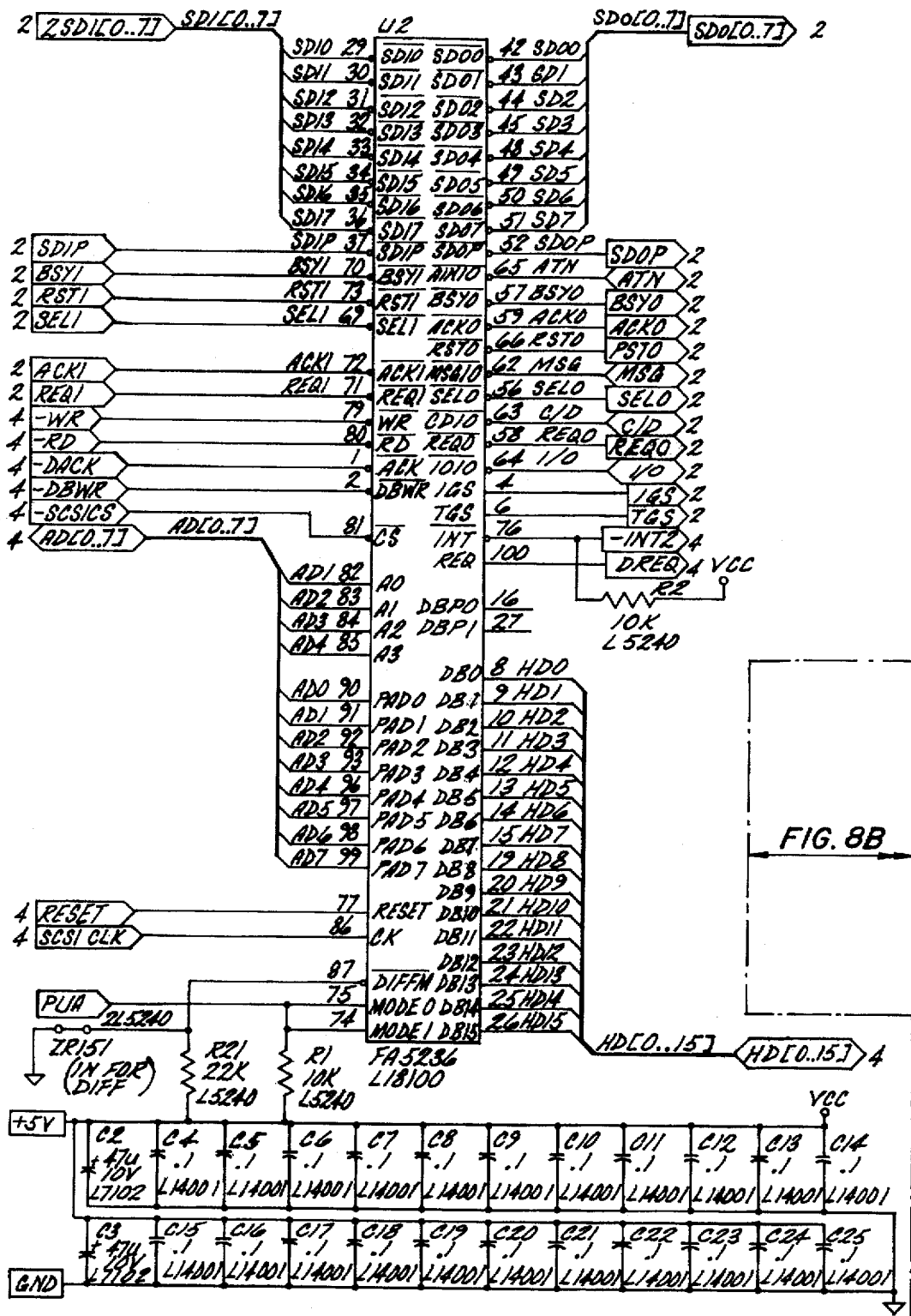
FIGS. 8A–8NN are schematic diagrams of the electronics of the device of FIG. 1.
Figure 8B:
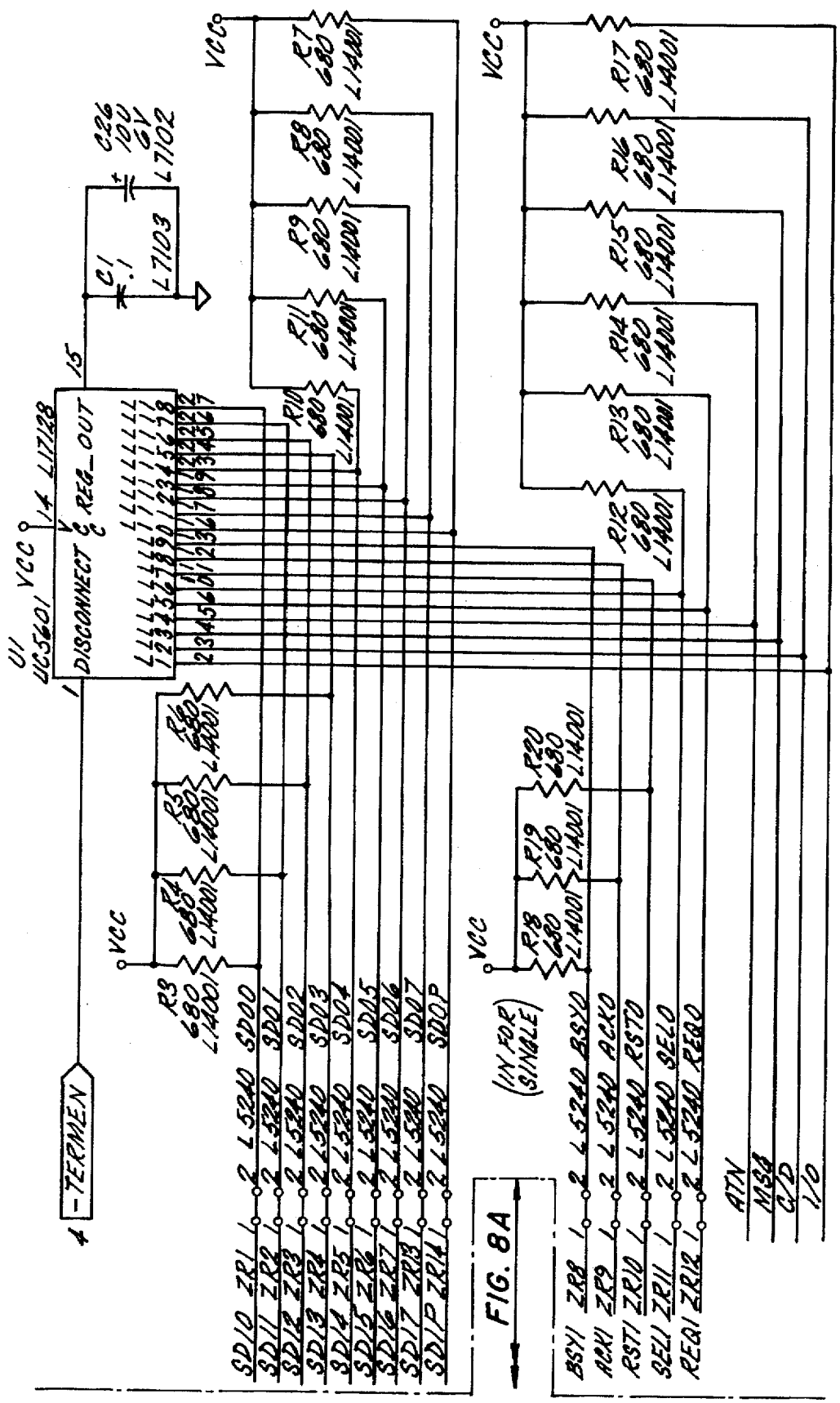
Figure 8E:
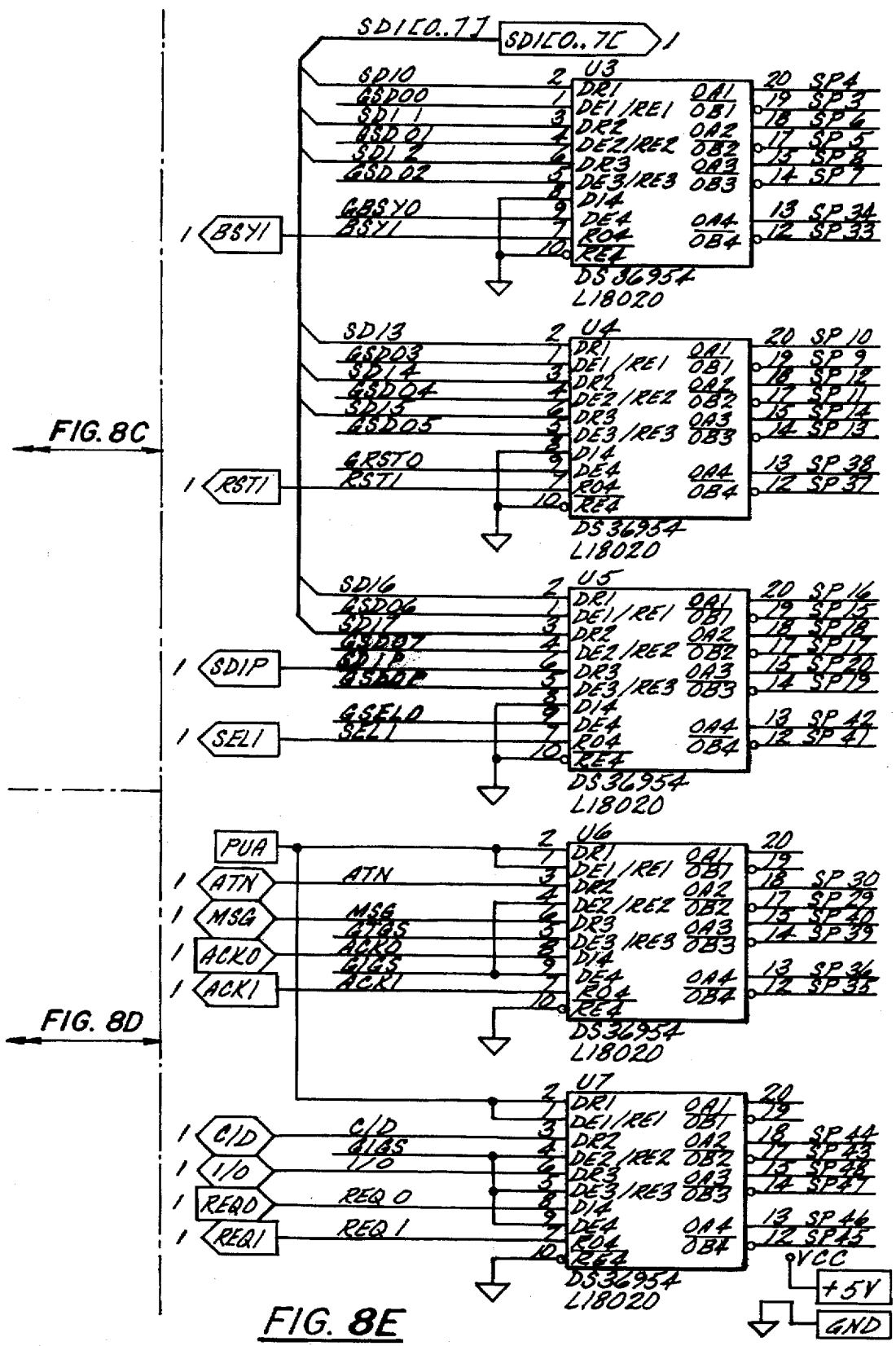
Figure 8F:
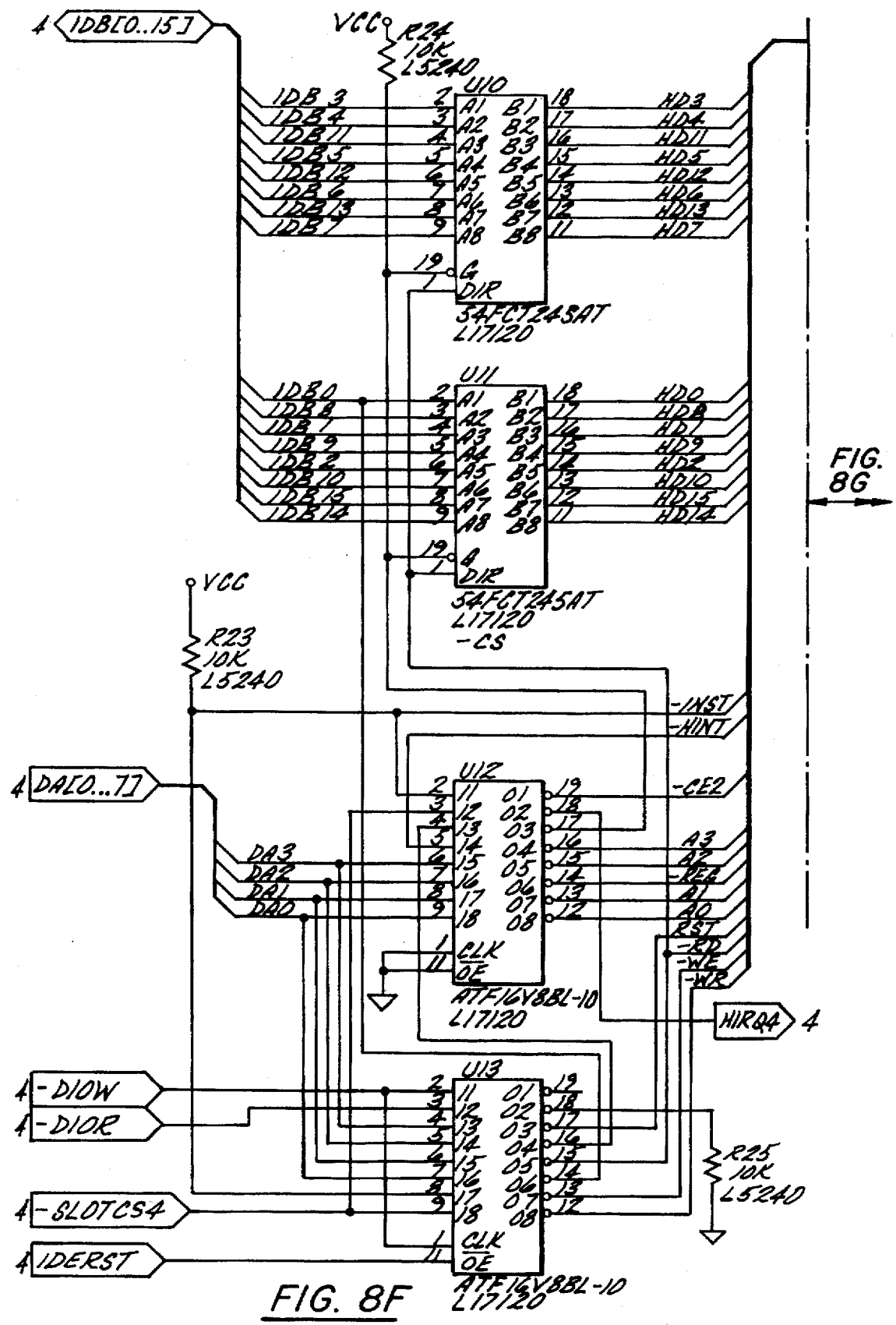
Figure 8G:
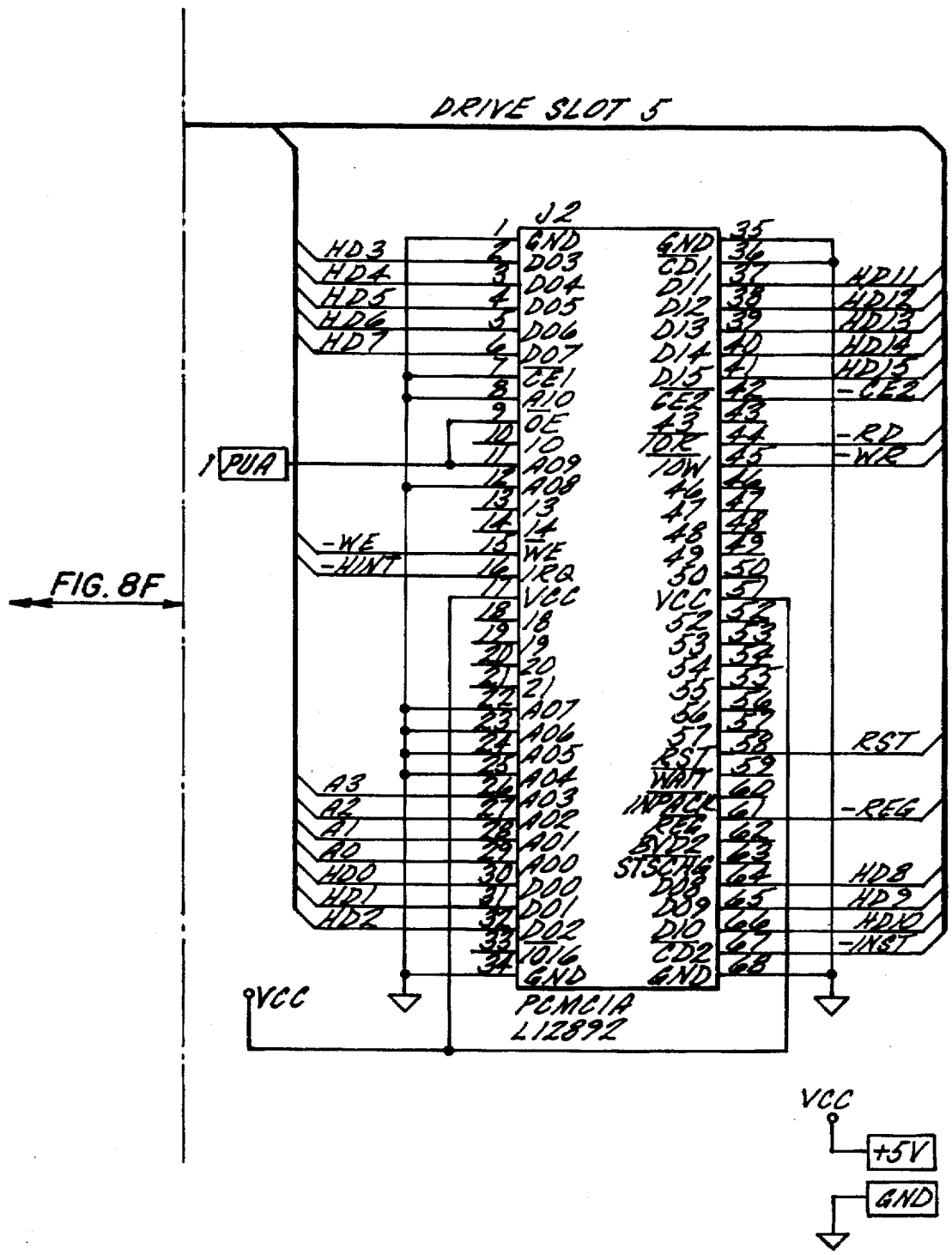
Figure 8H:
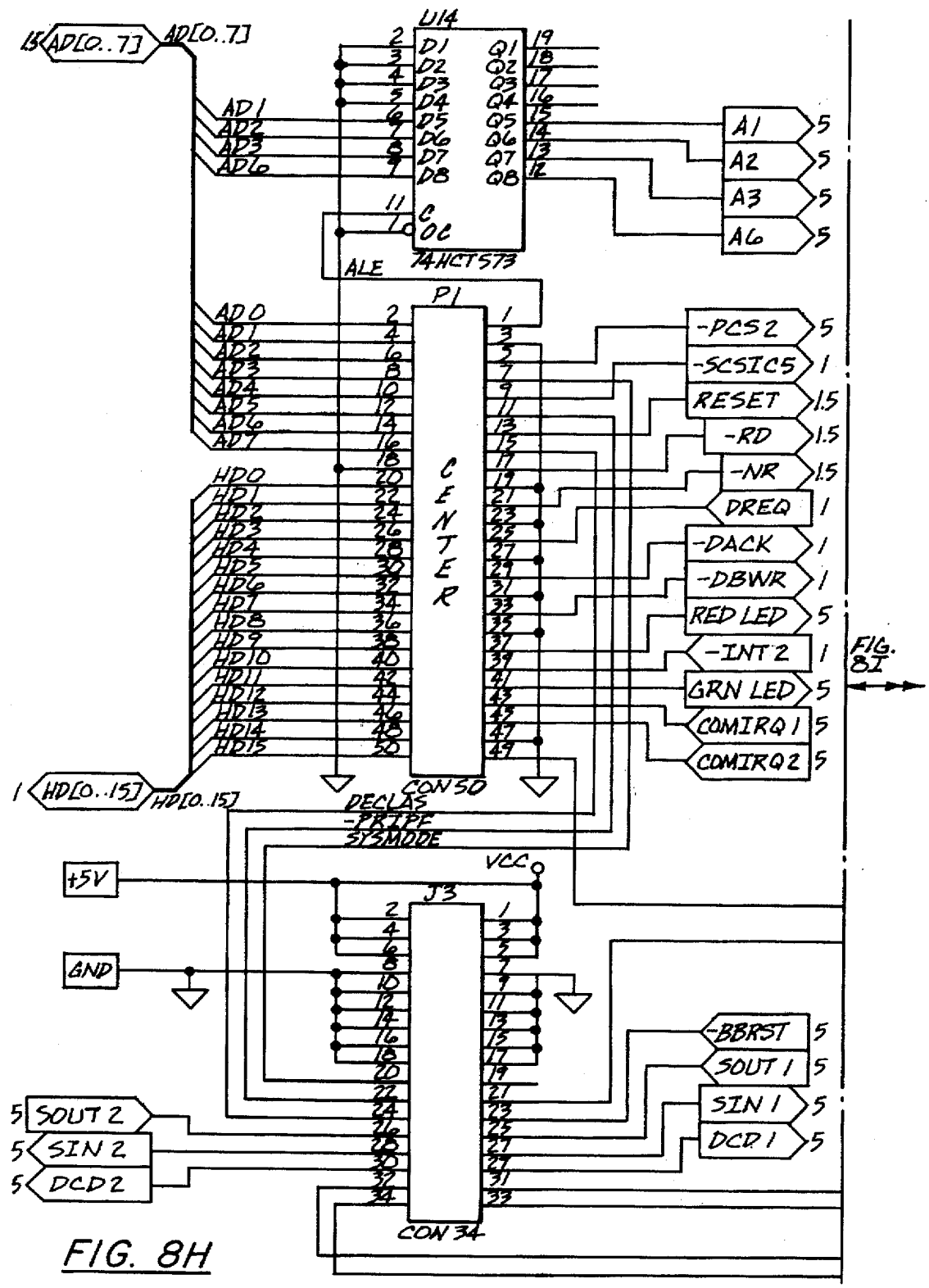
Figure 8I:
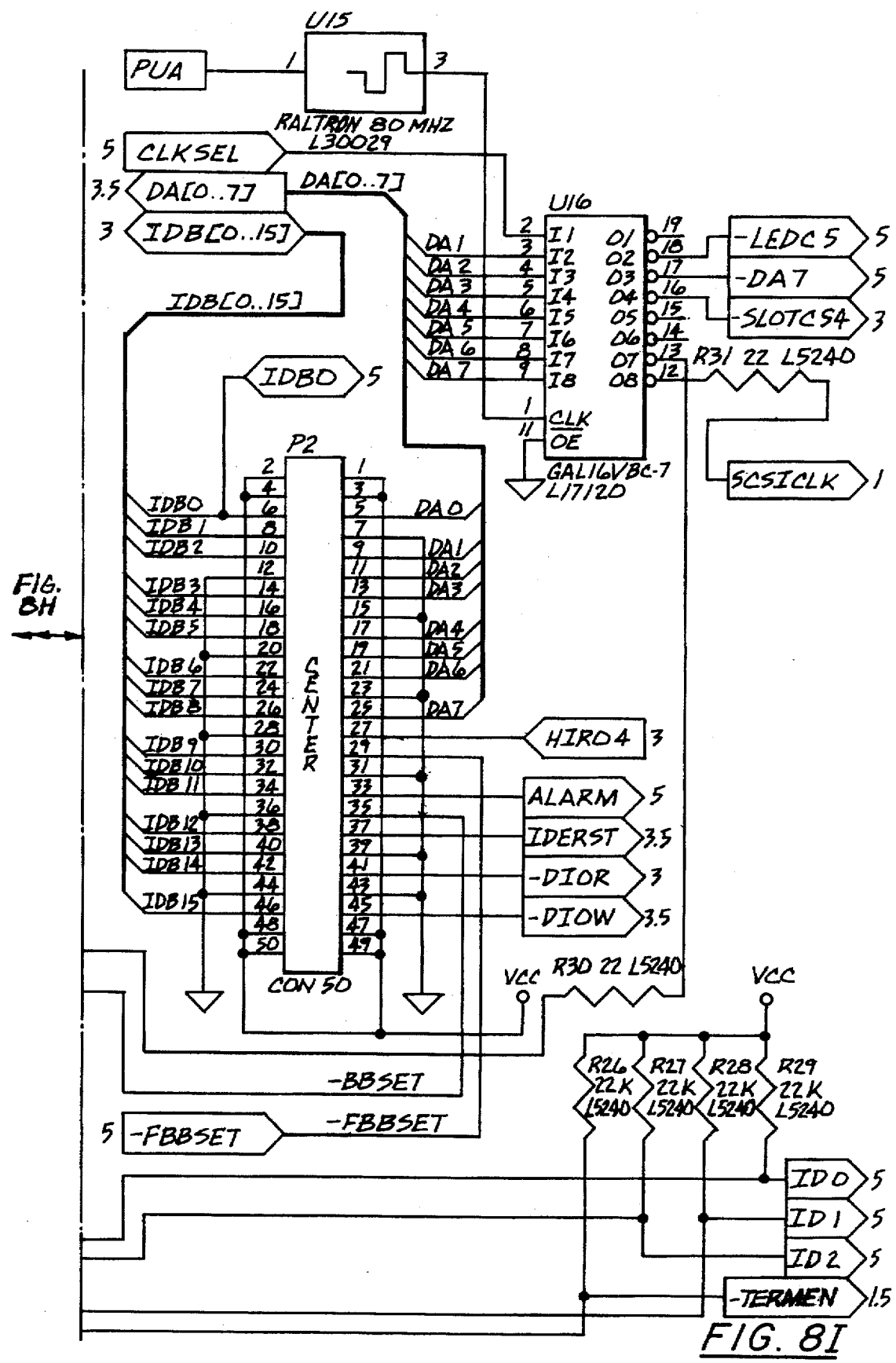
Figure 8J:
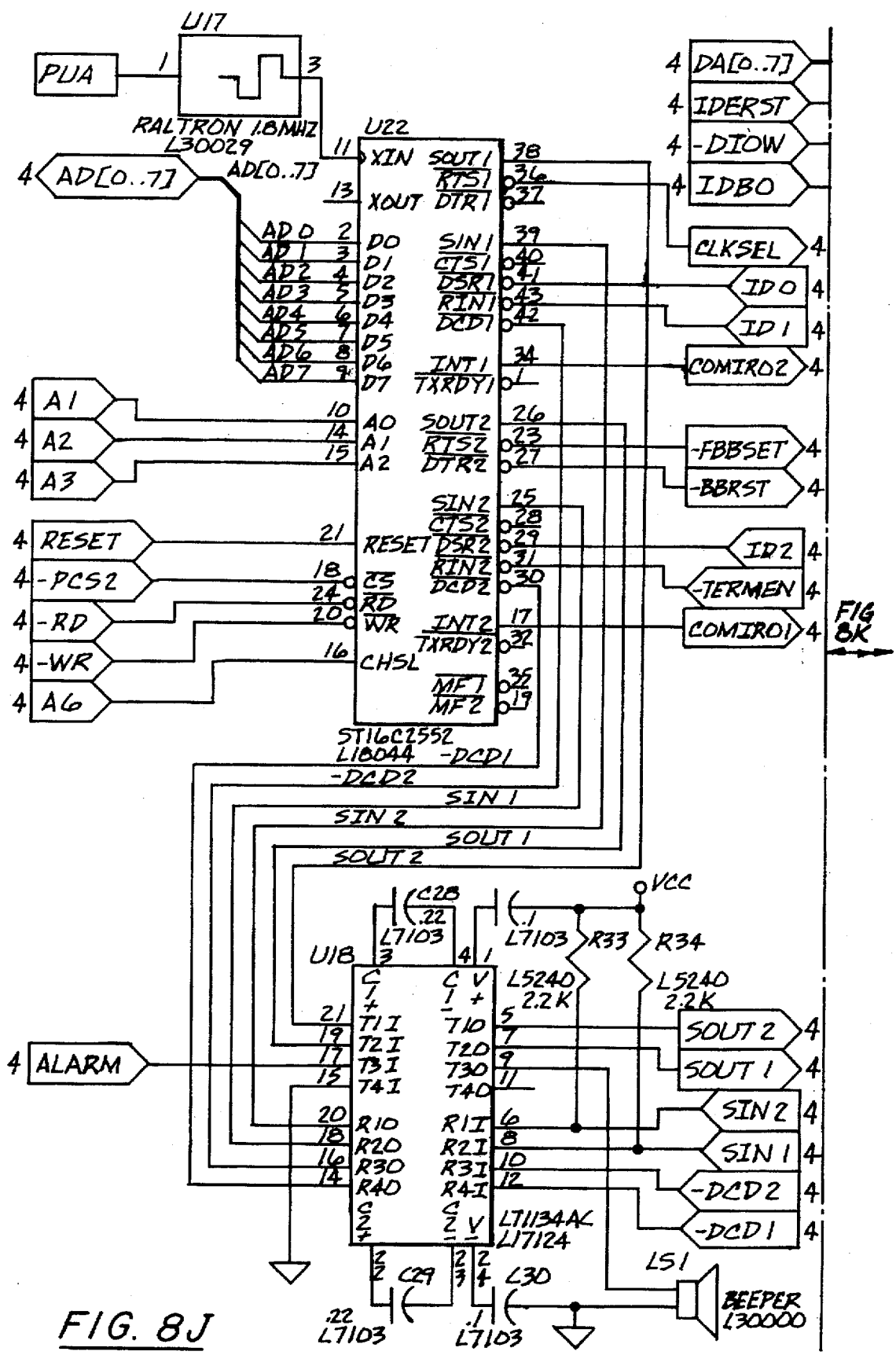
Figure 8K:
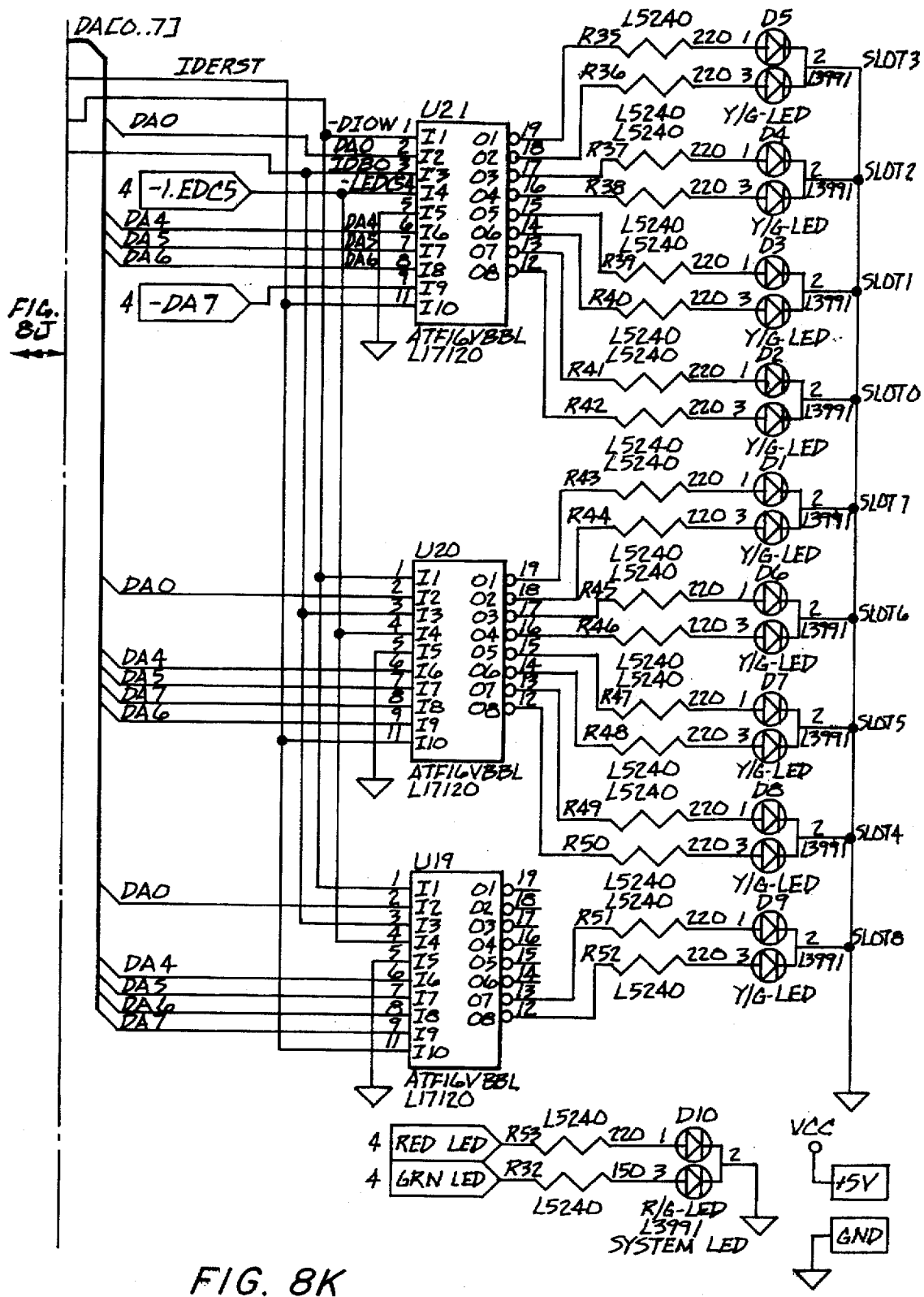
Figure 8L:
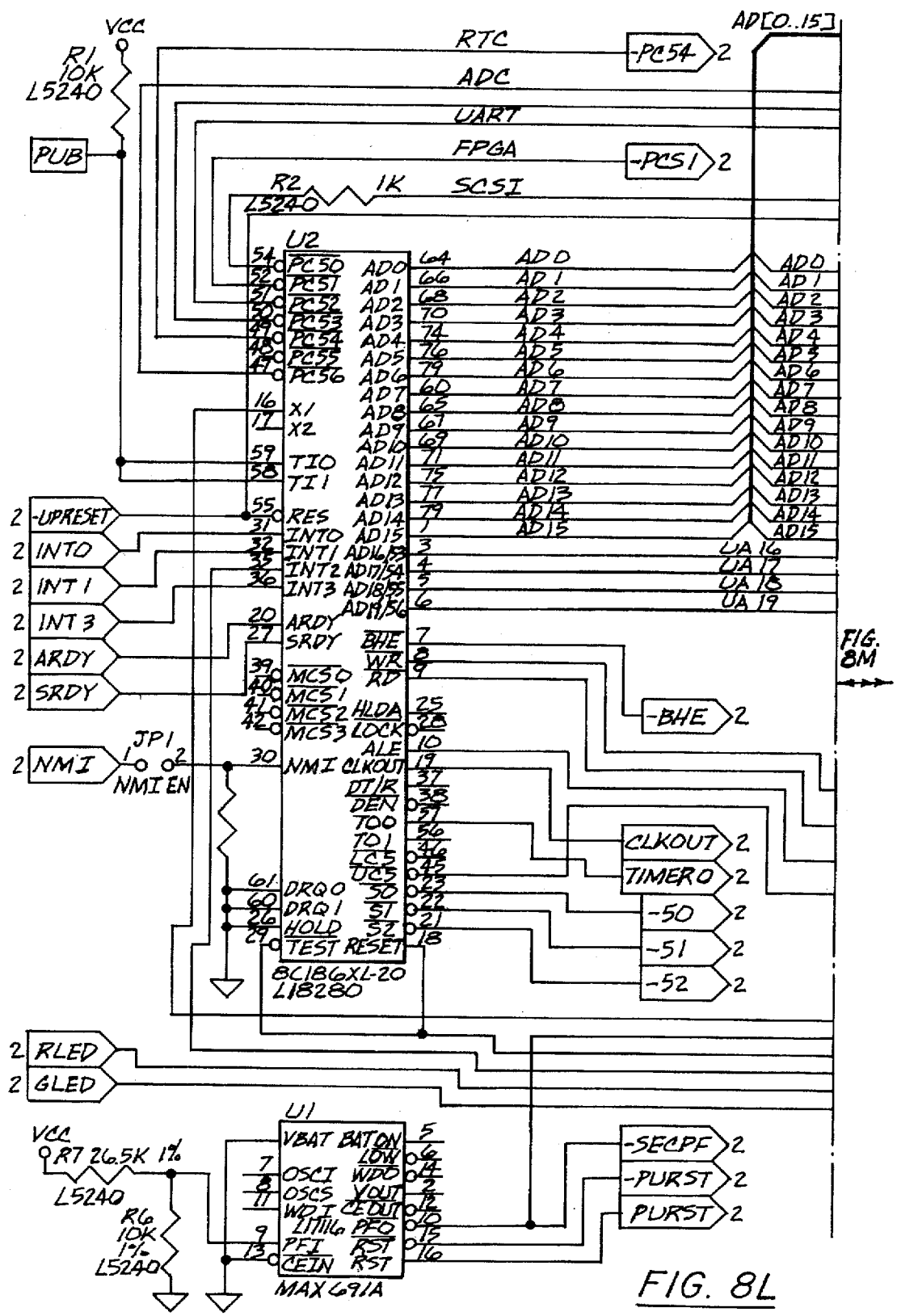
Figure 8M:
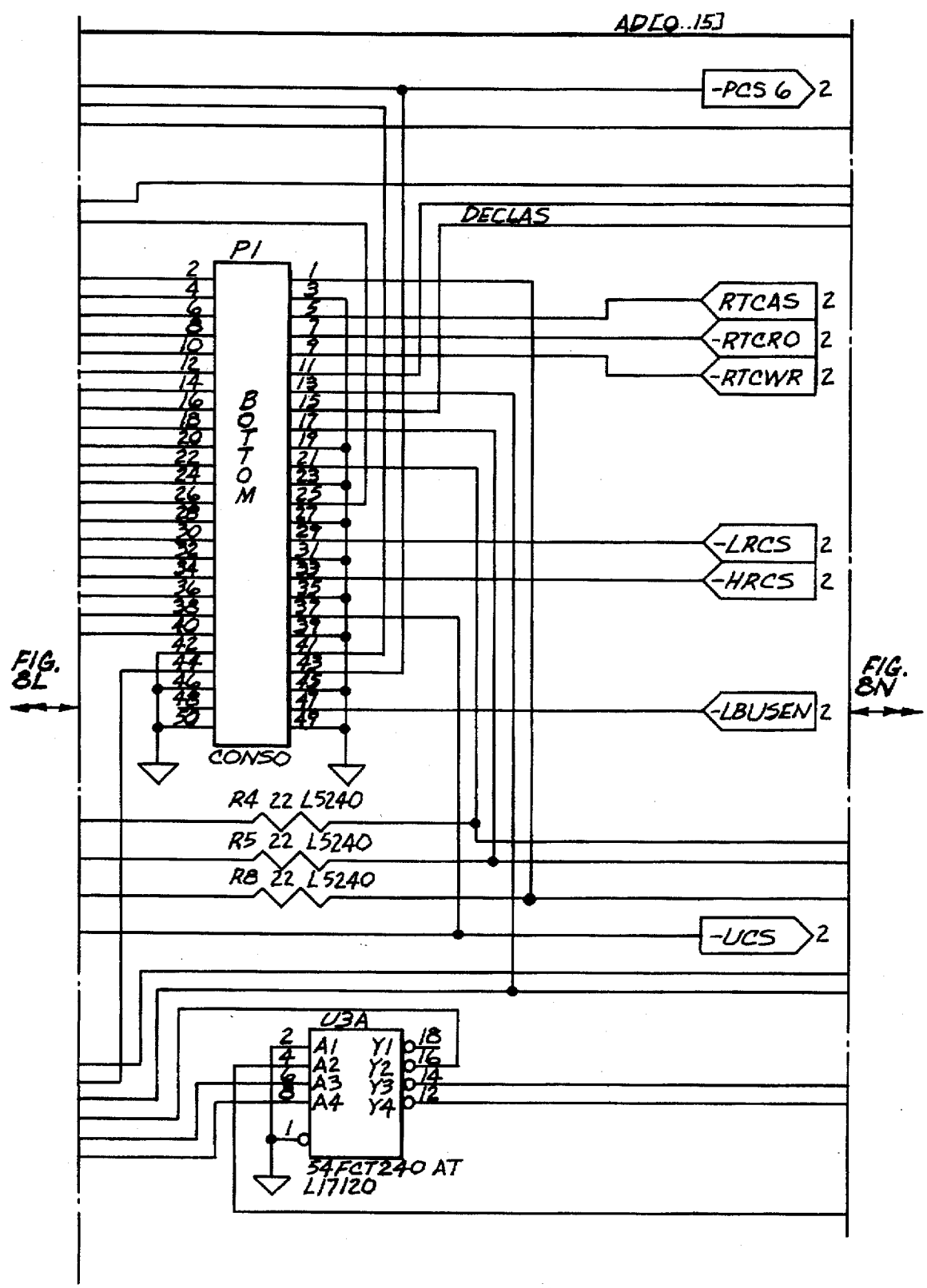
Figure 8N:
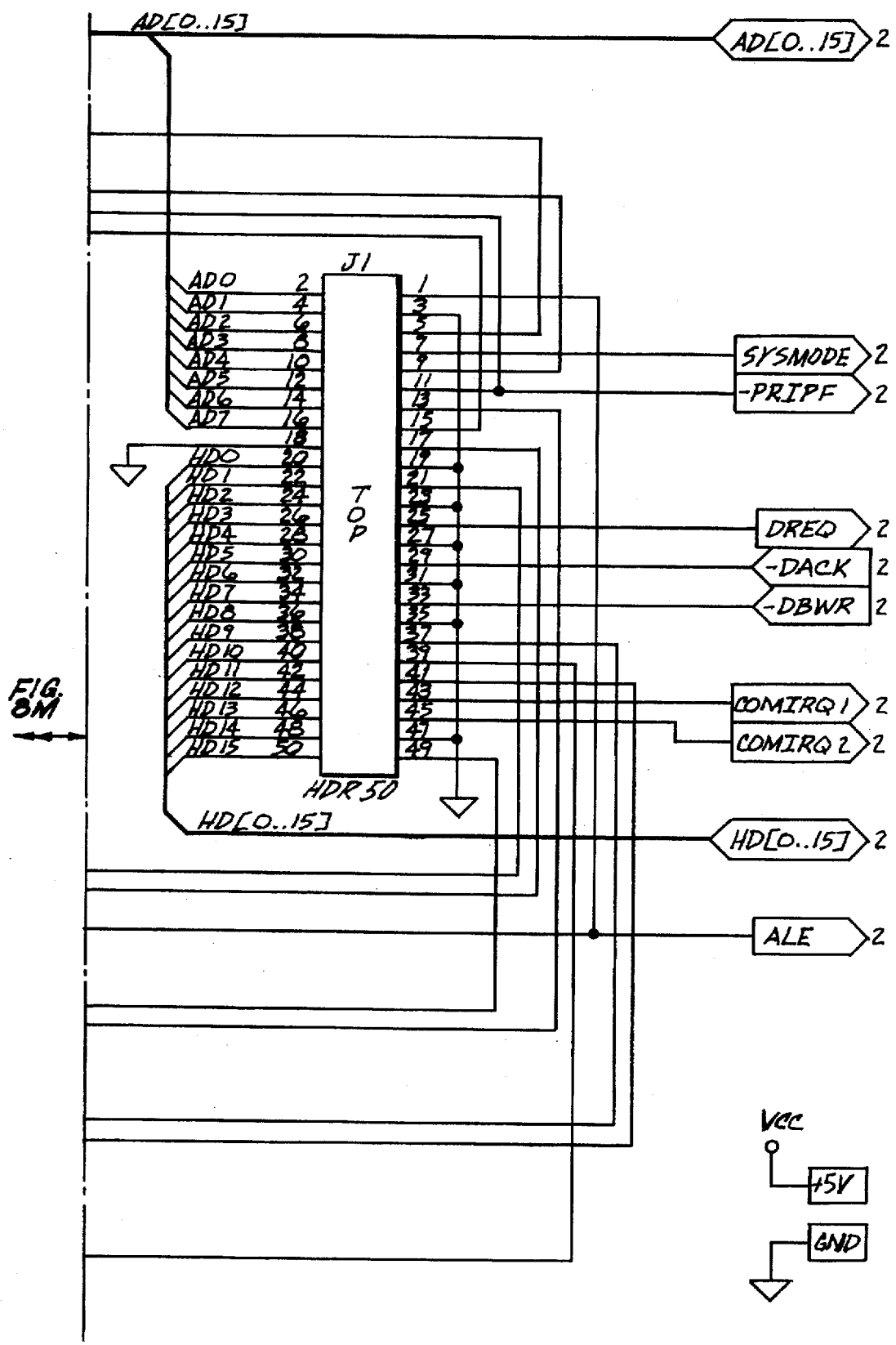
Figure 8Q:
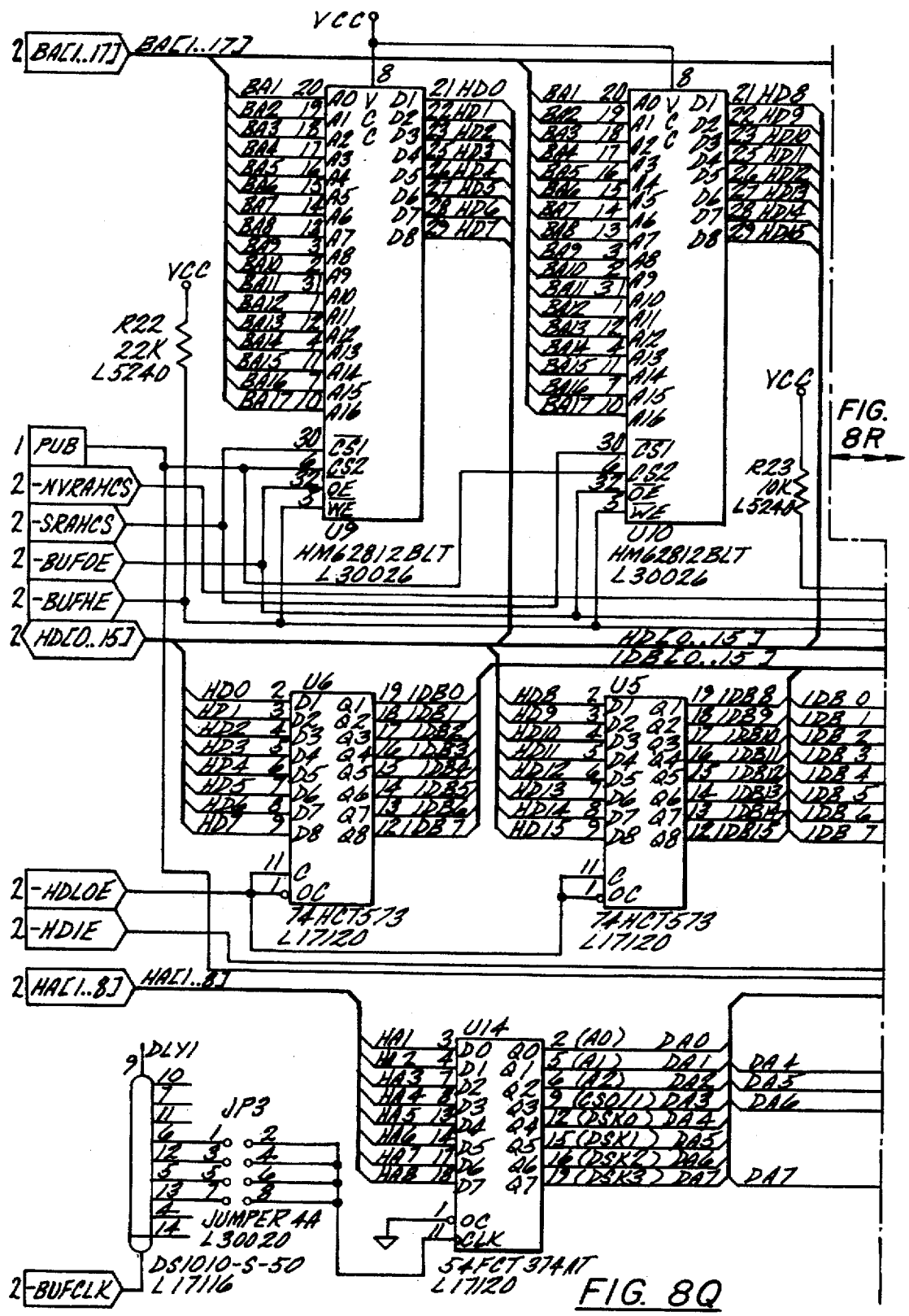
Figure 8R:
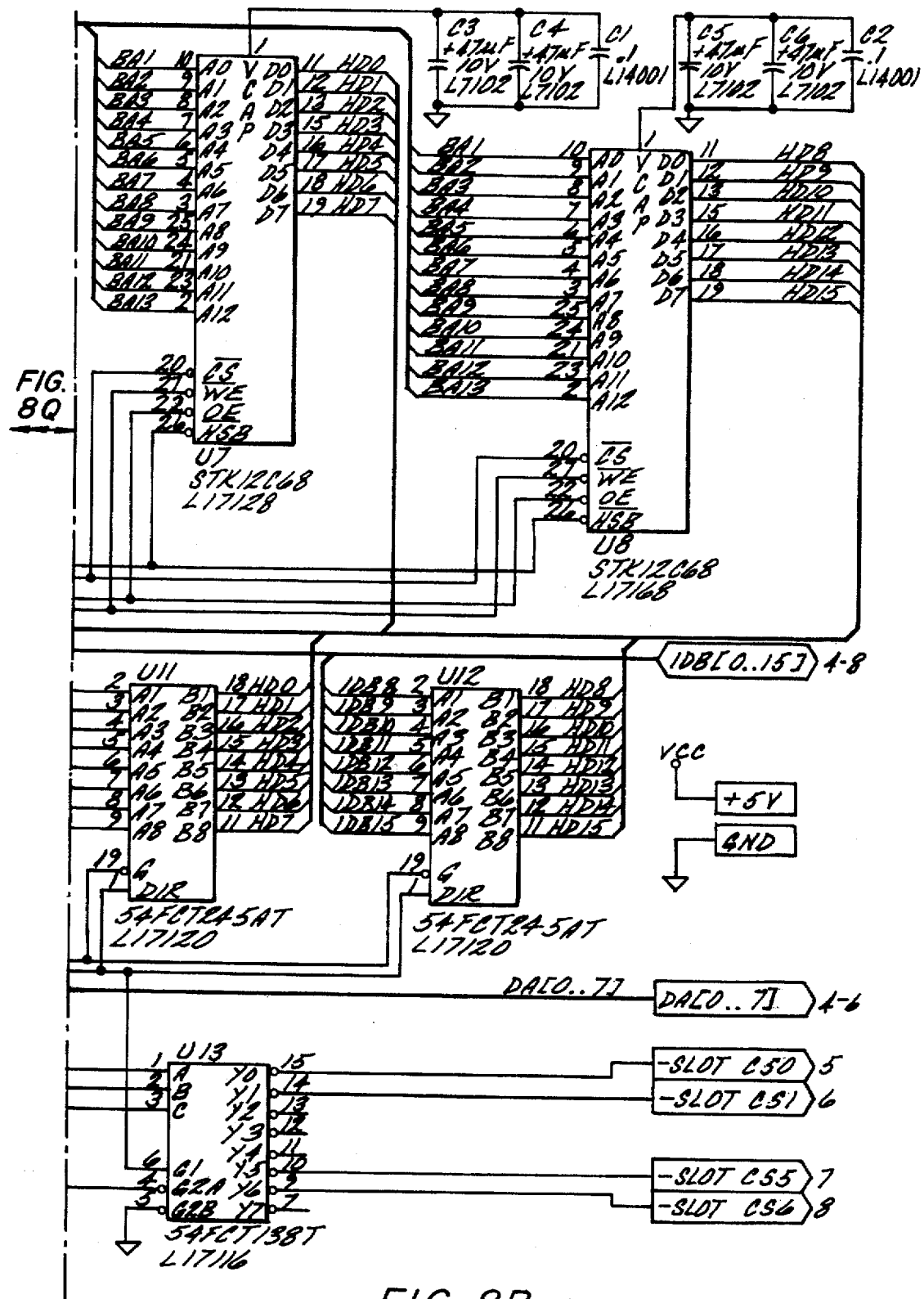
Figure 8S:
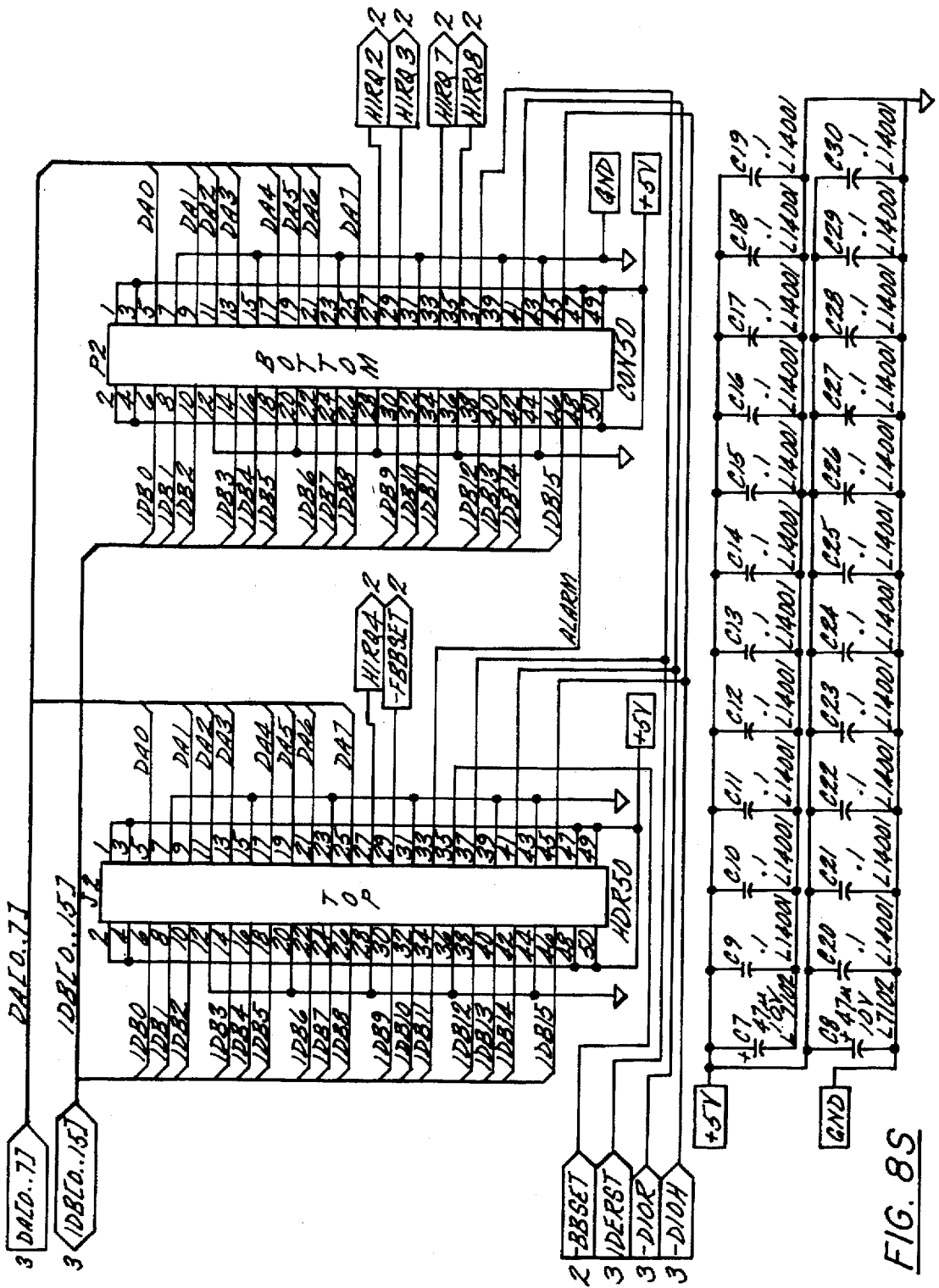
Figure 8T:
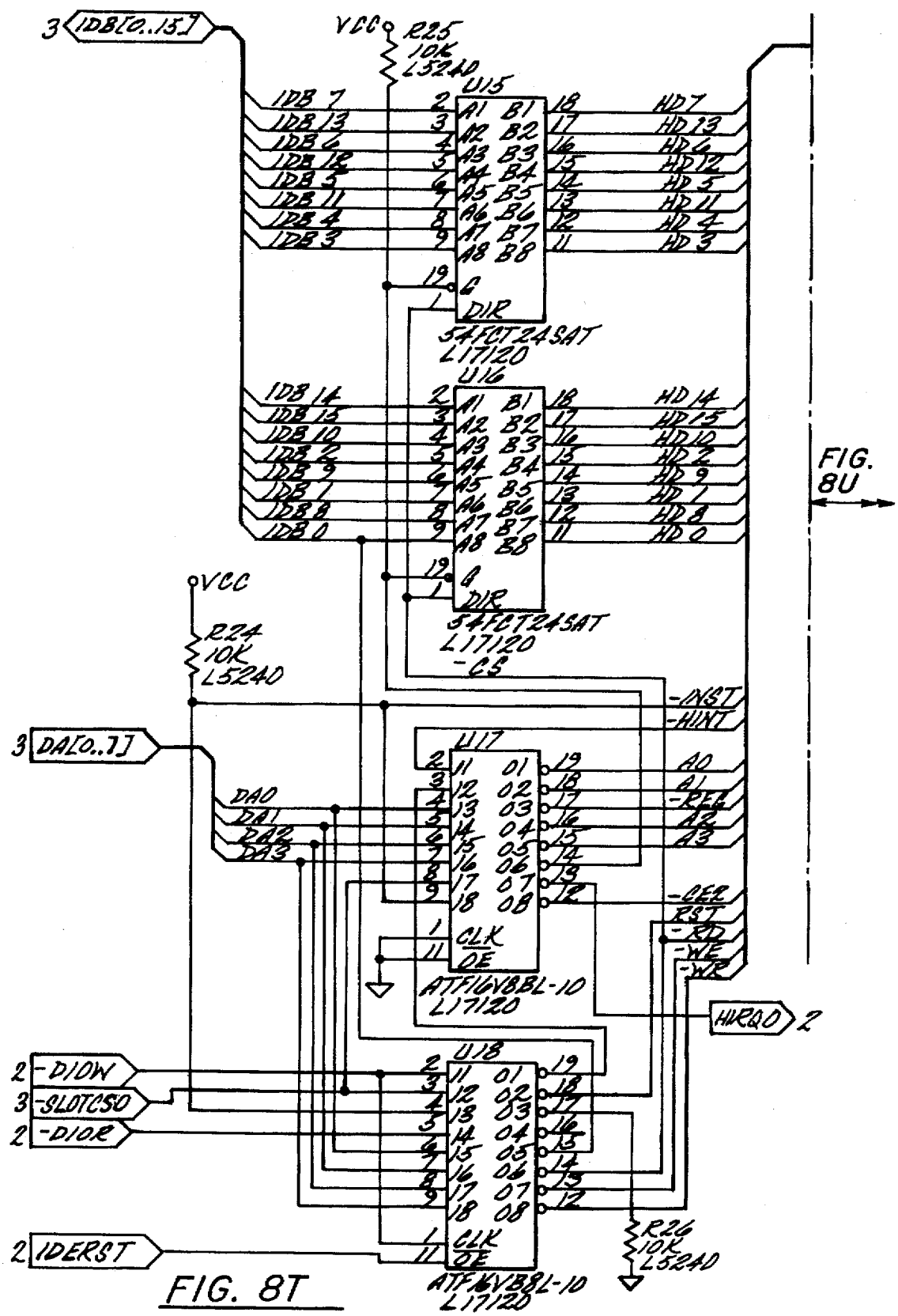
Figure 8U:
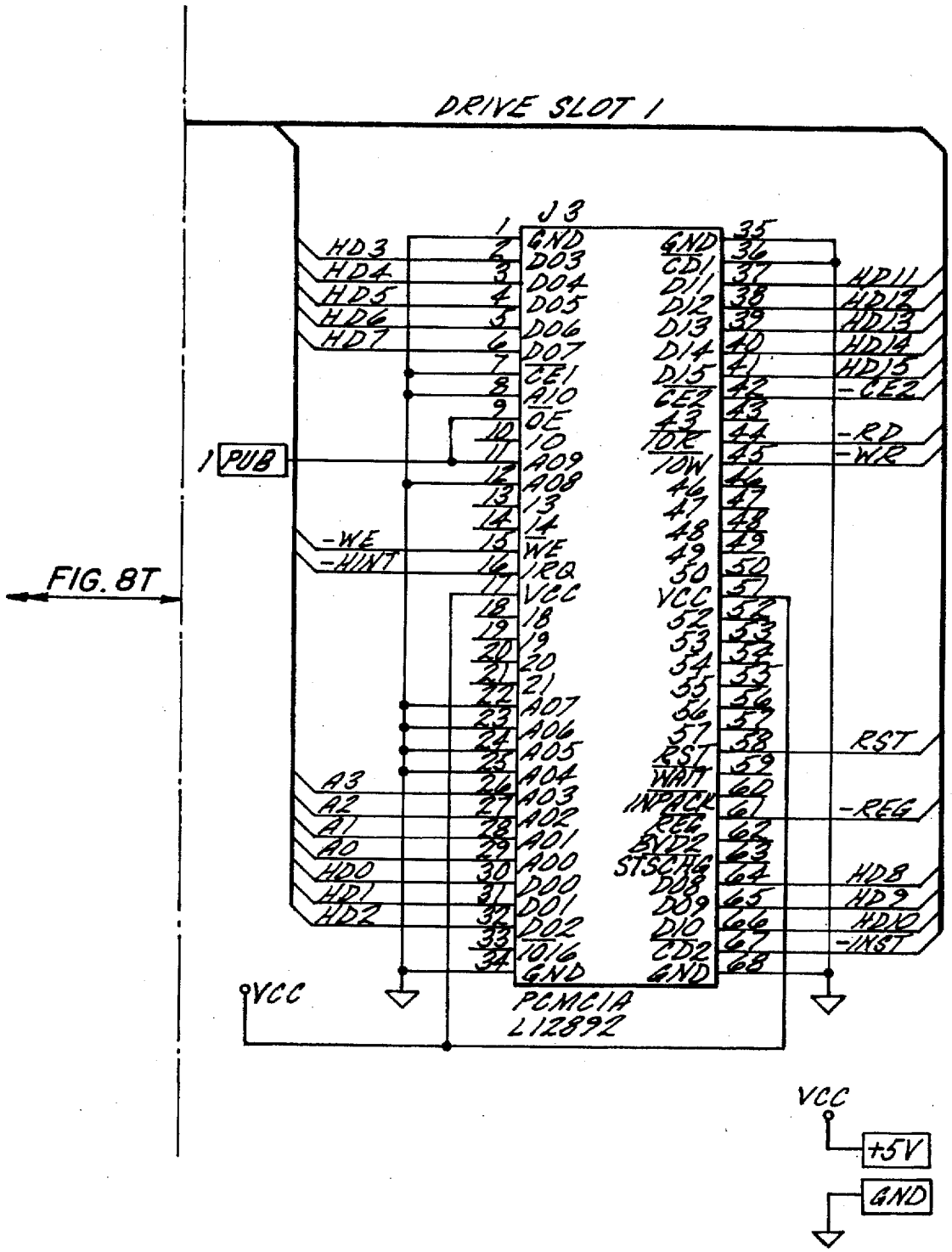
Figure 8V:
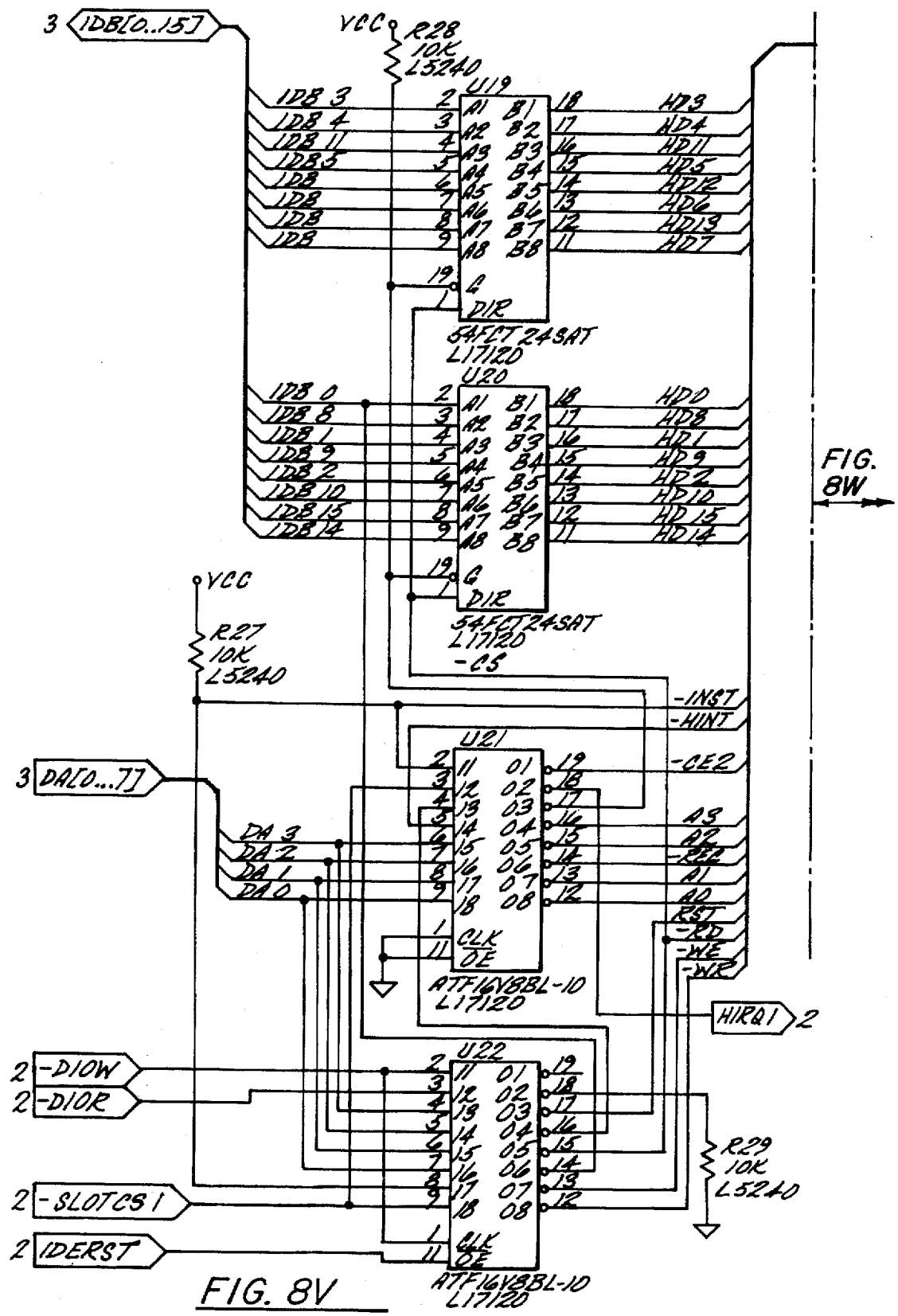
Figure 8W:
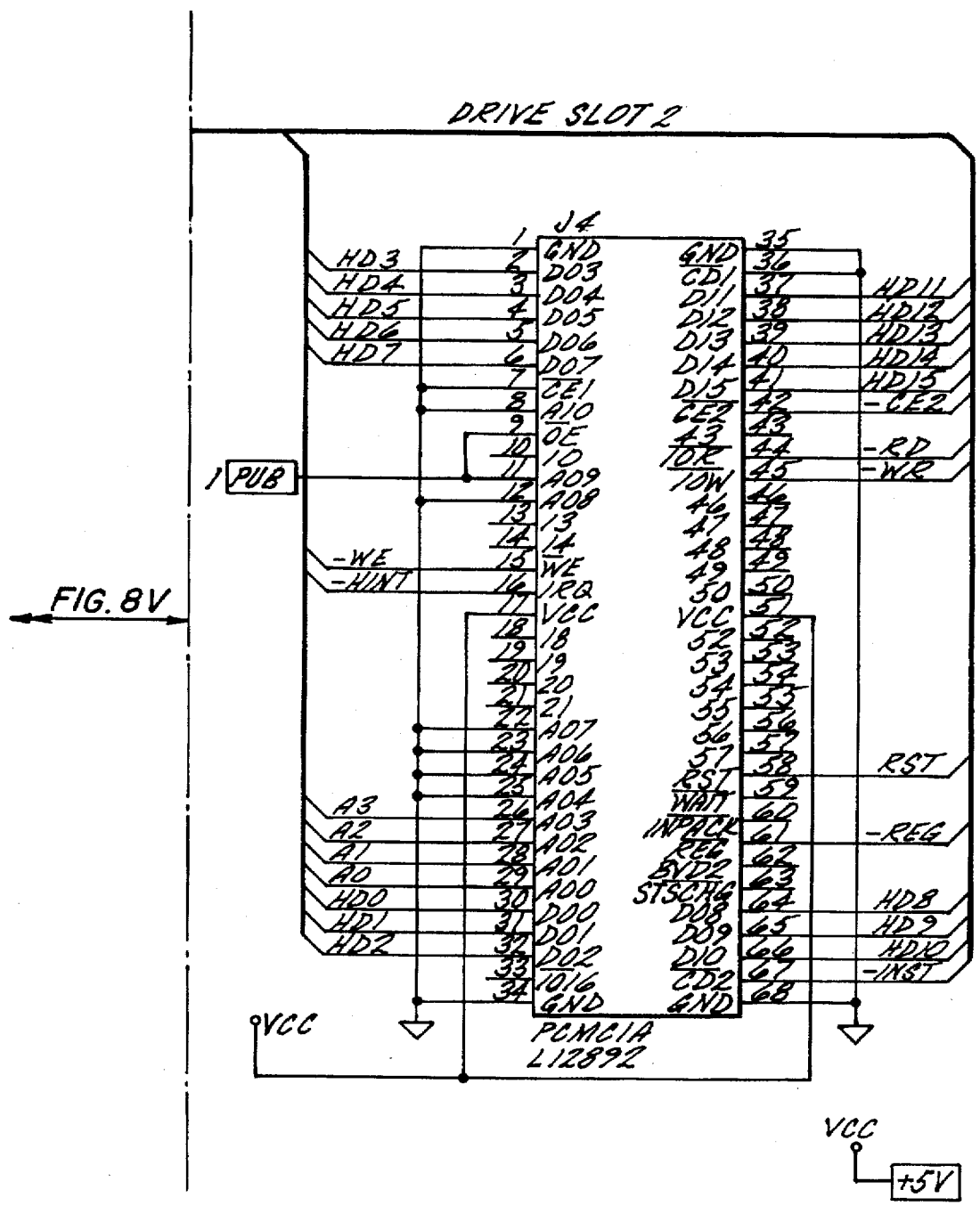
Figure 8X:
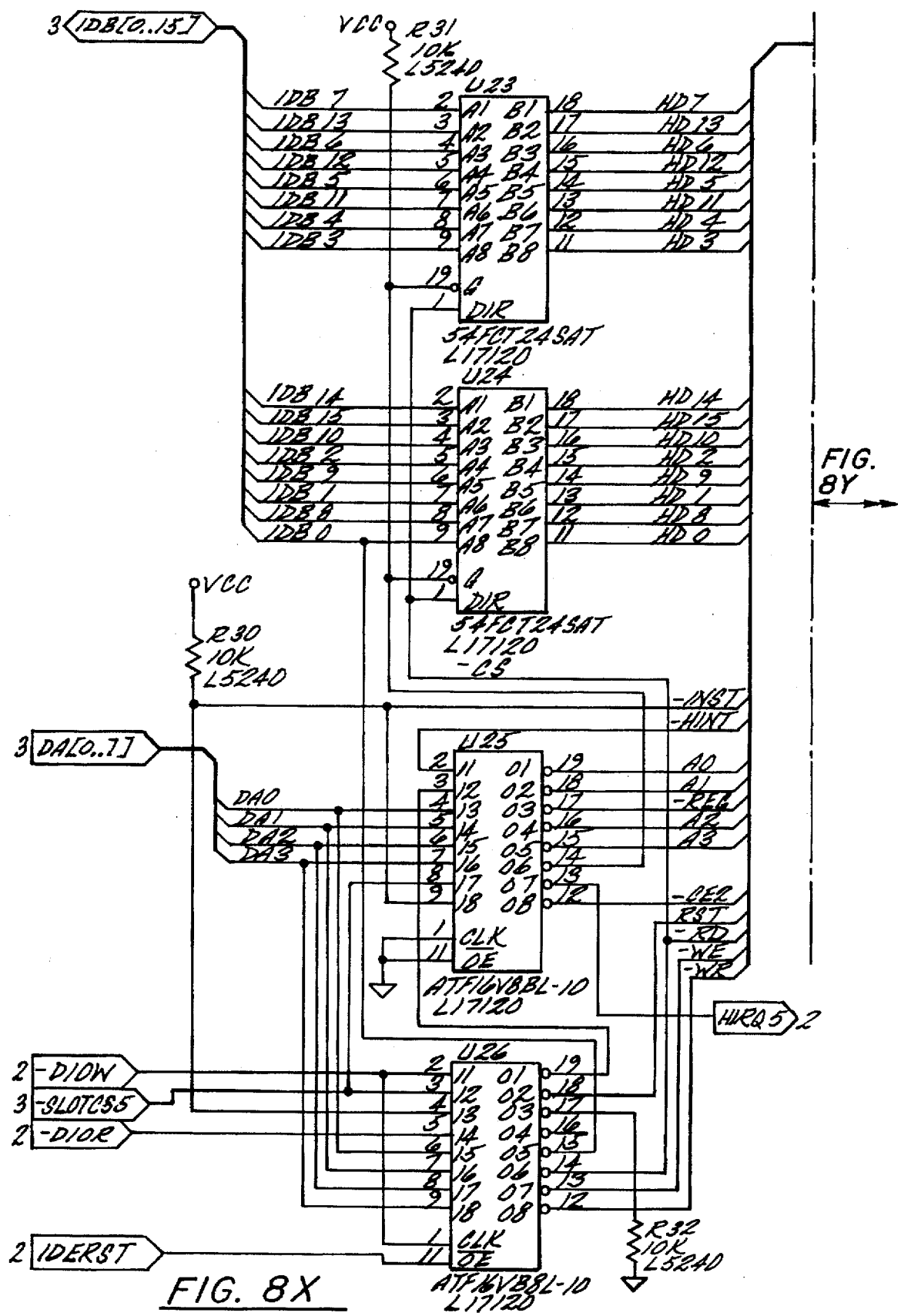
Figure 8Y:
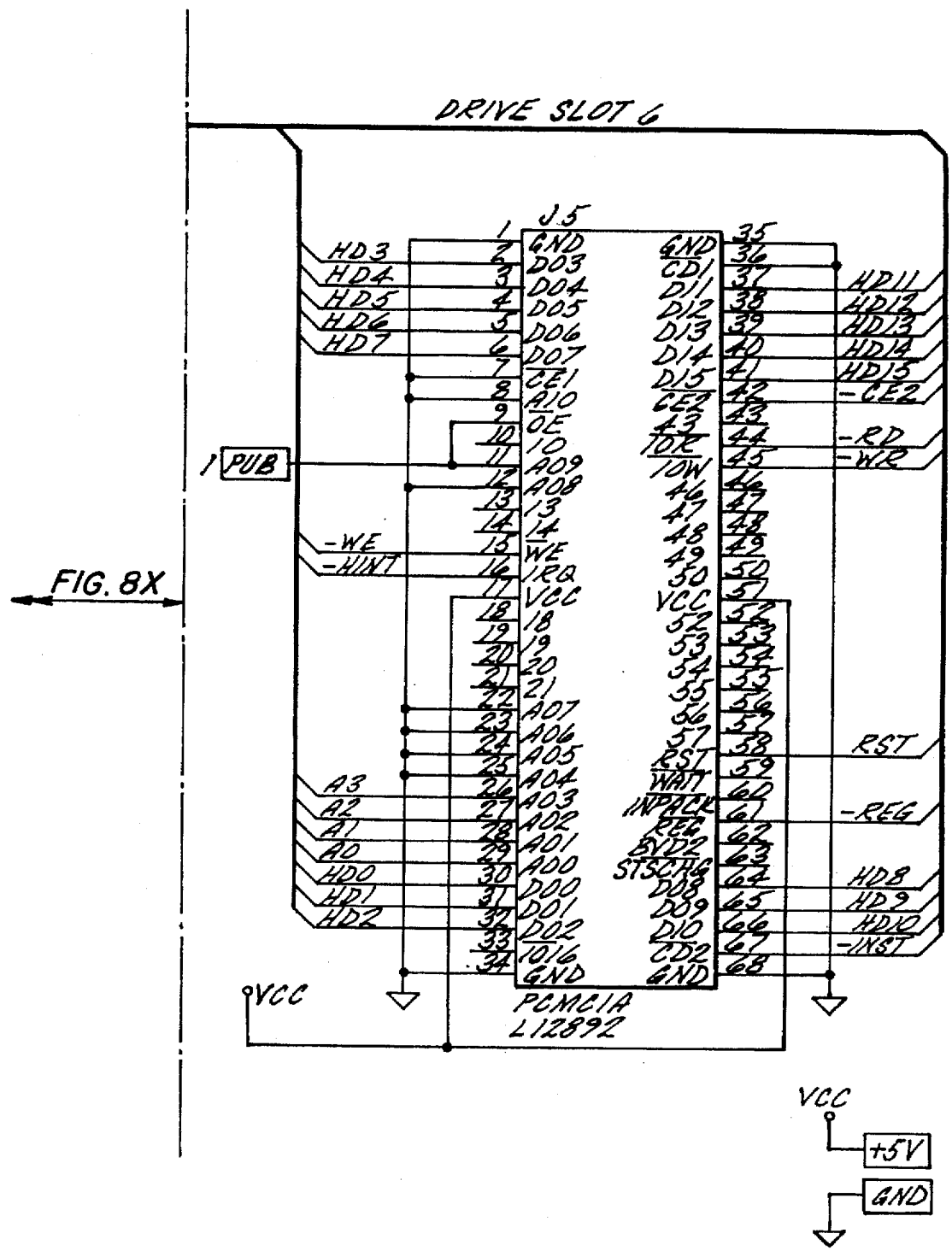
Figure 8Z:
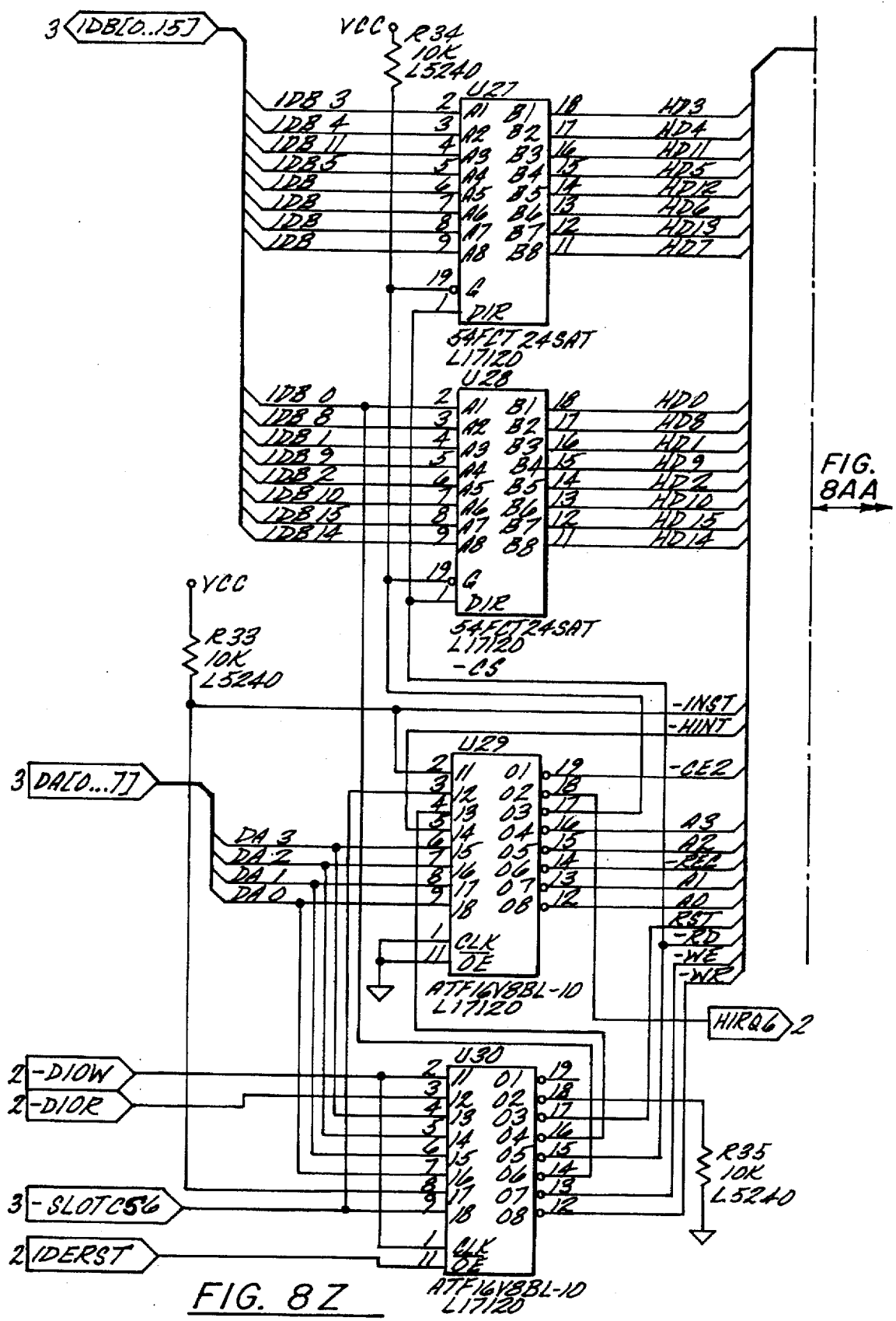
Figure 8A:
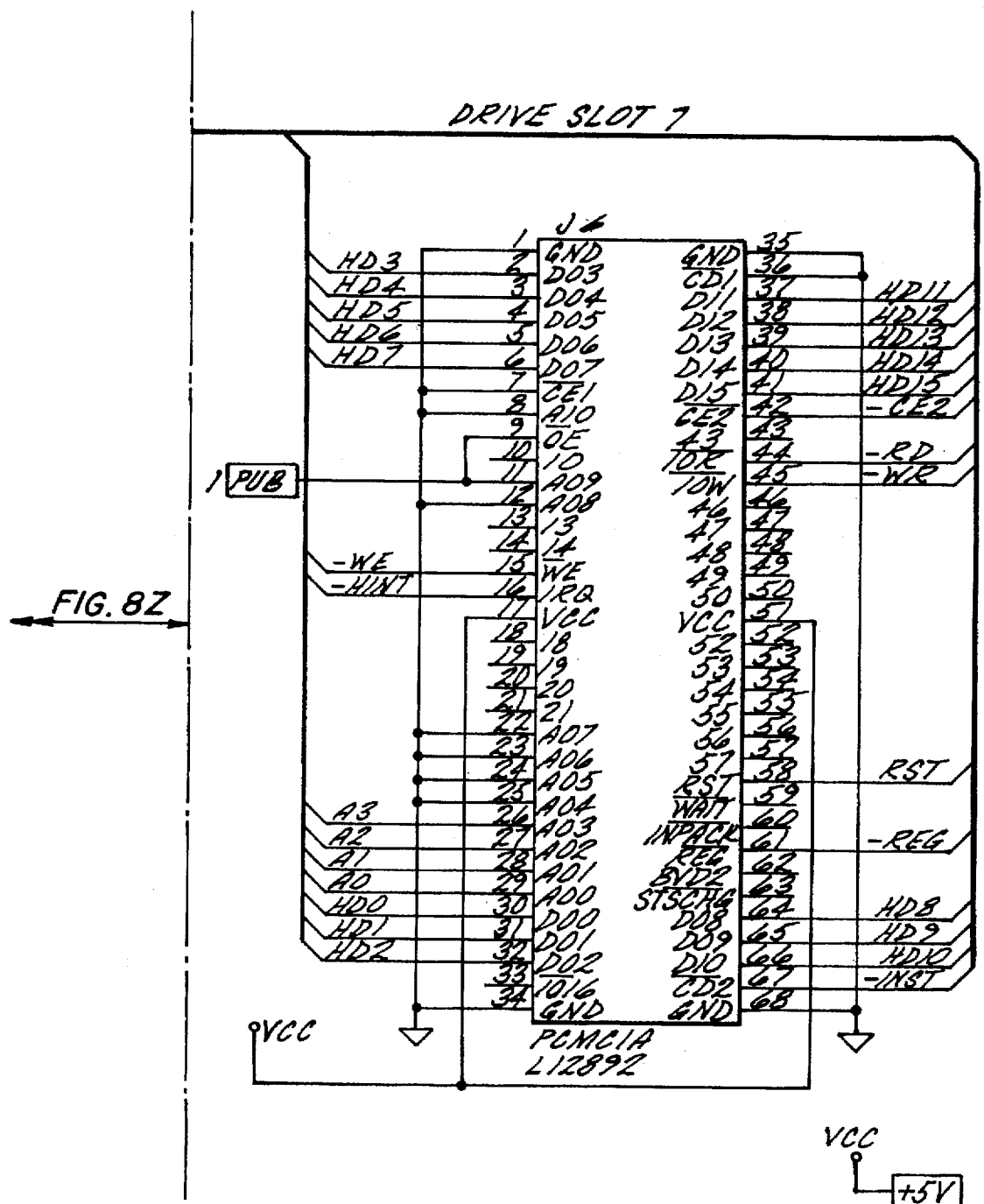
Figure 8B:
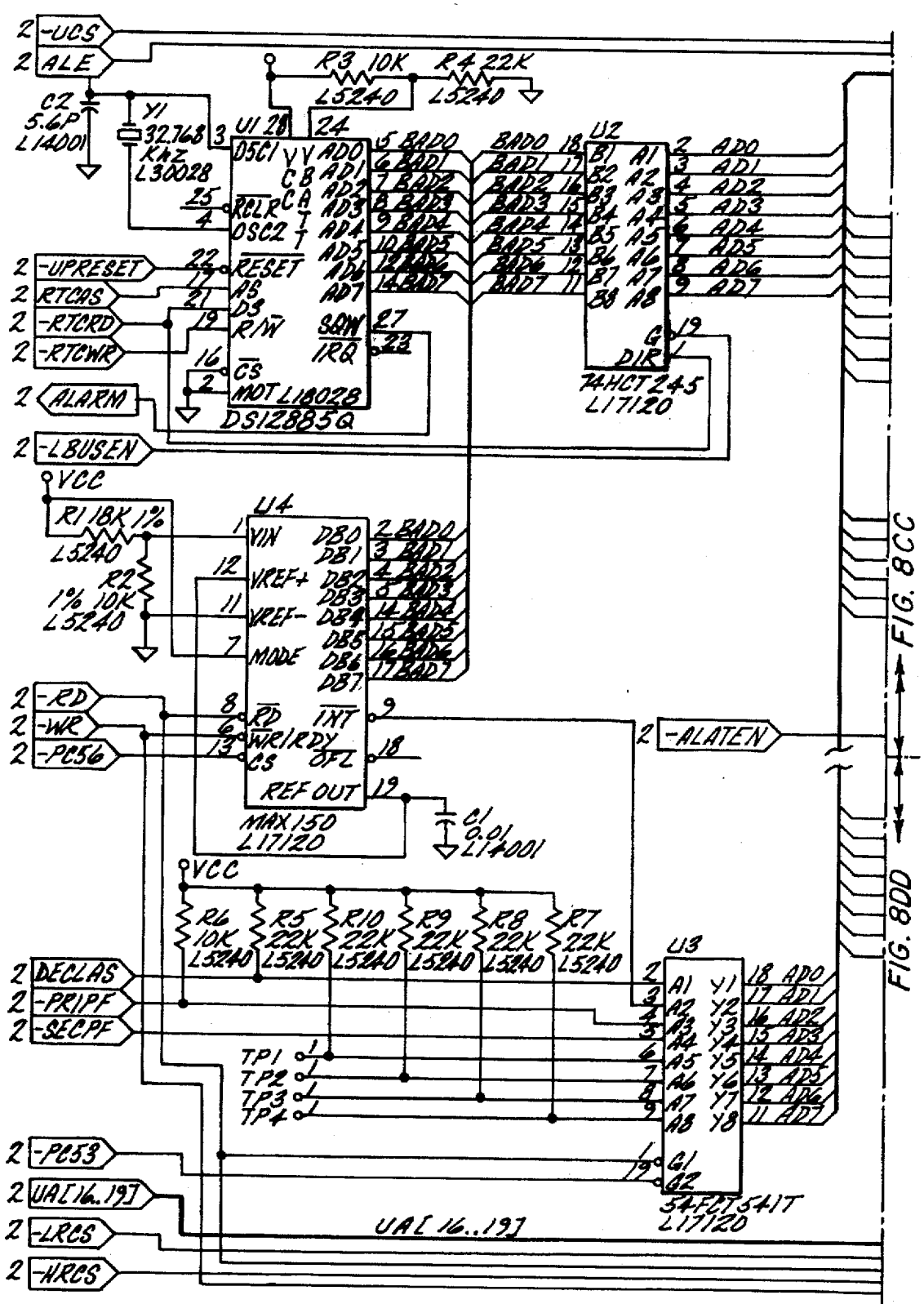
Figure 8C:
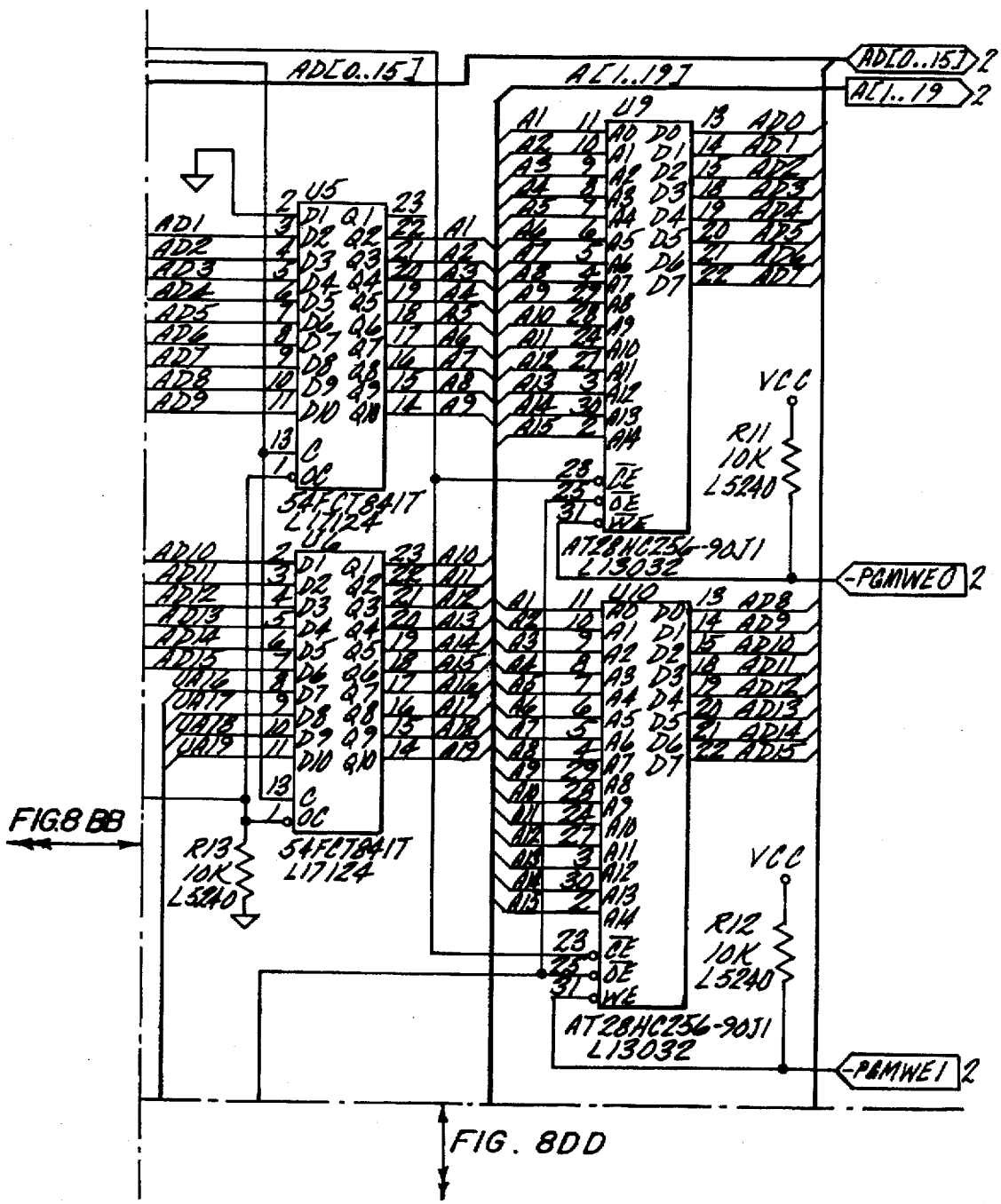
Figure 8D:
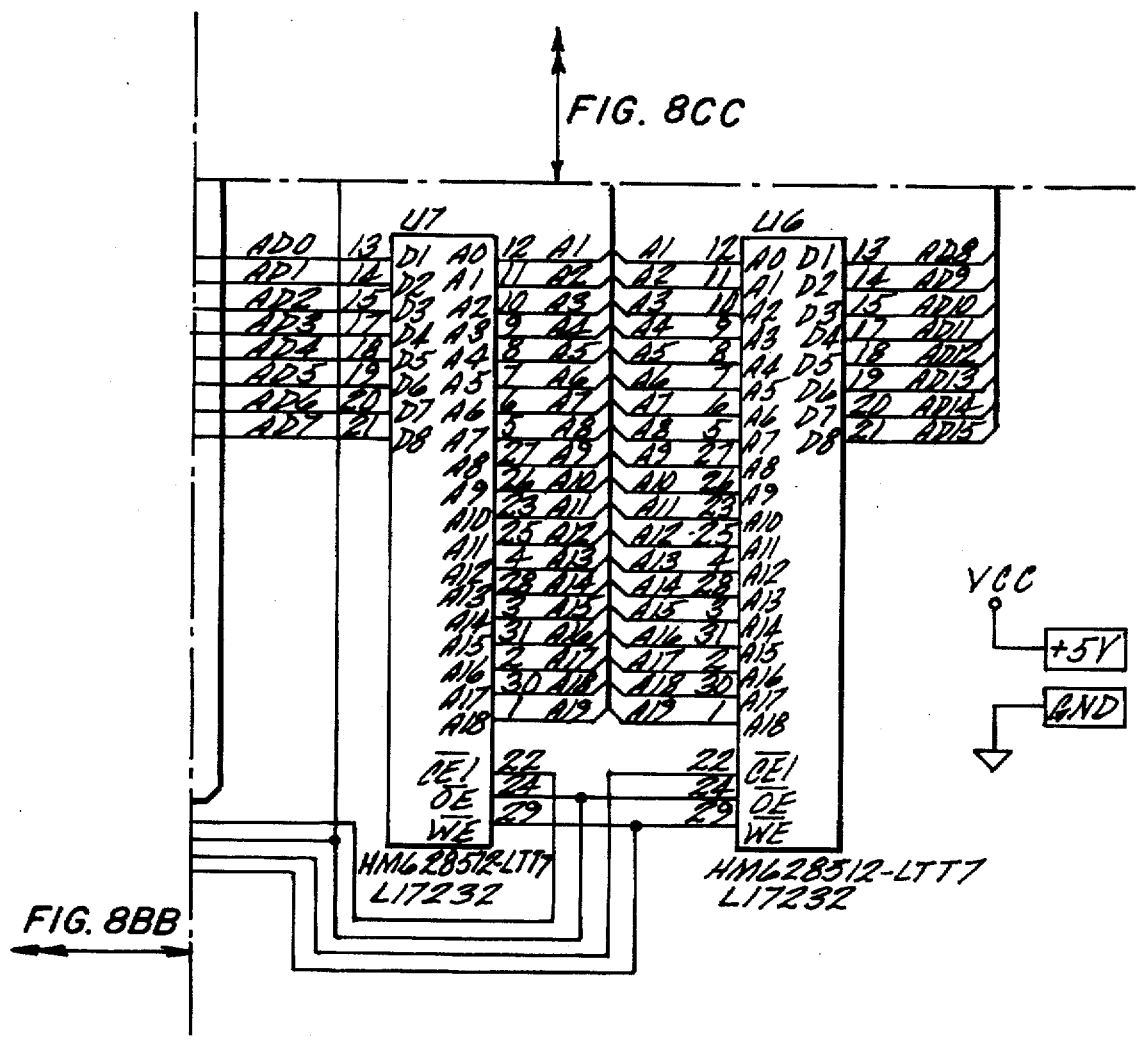
Figure 8E:
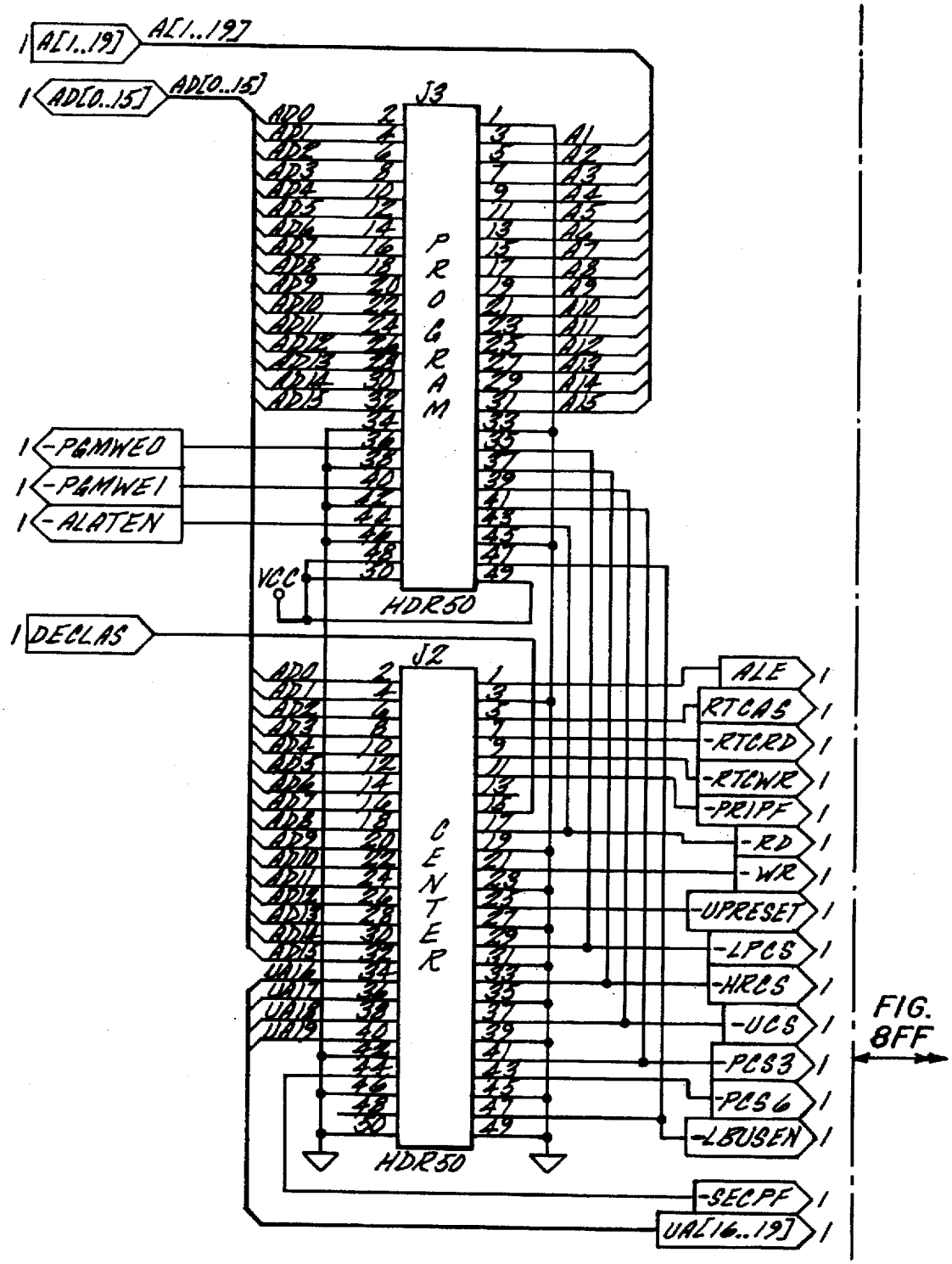
Figure 8F:
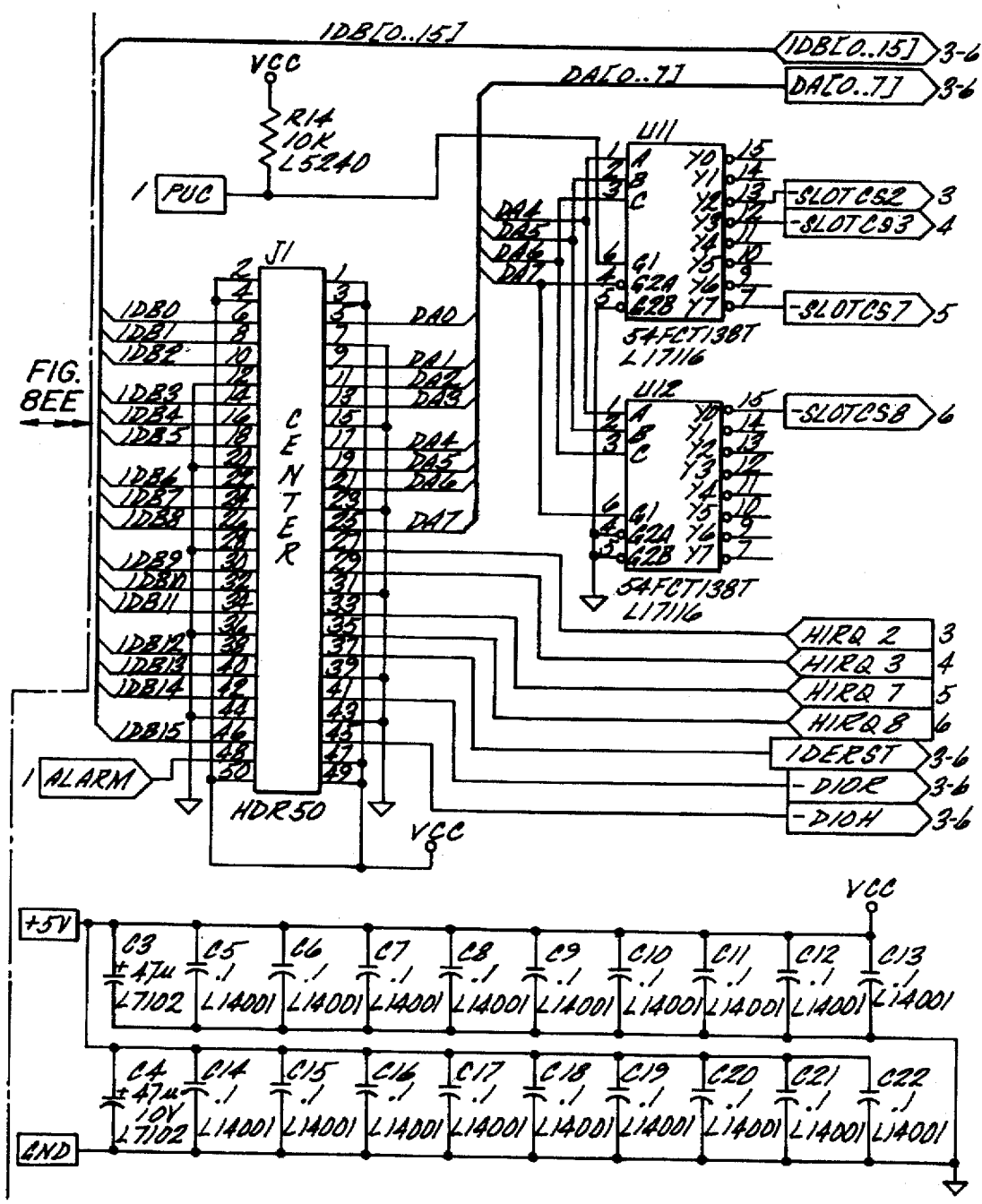
Figure 8G:
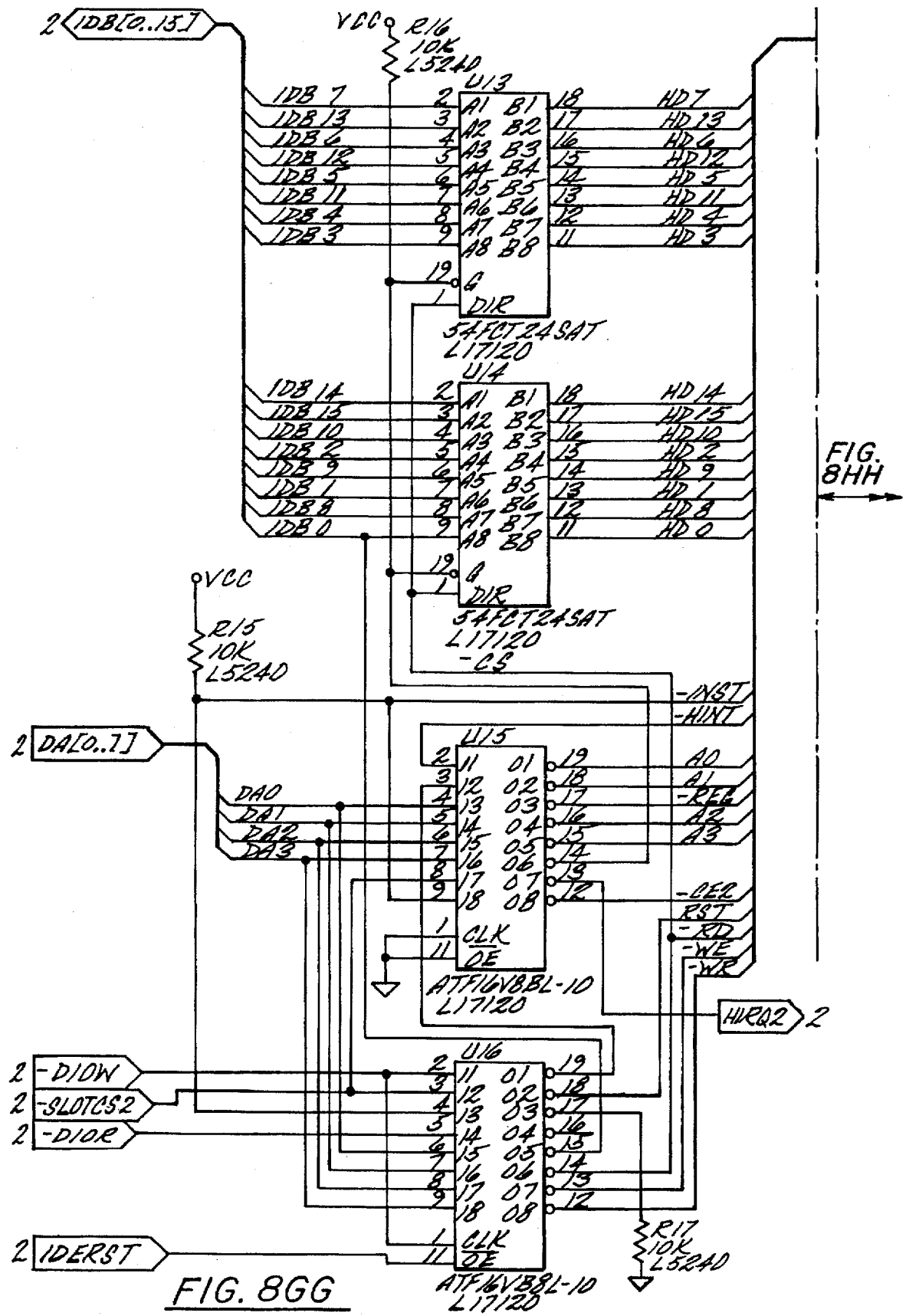
Figure 8I:
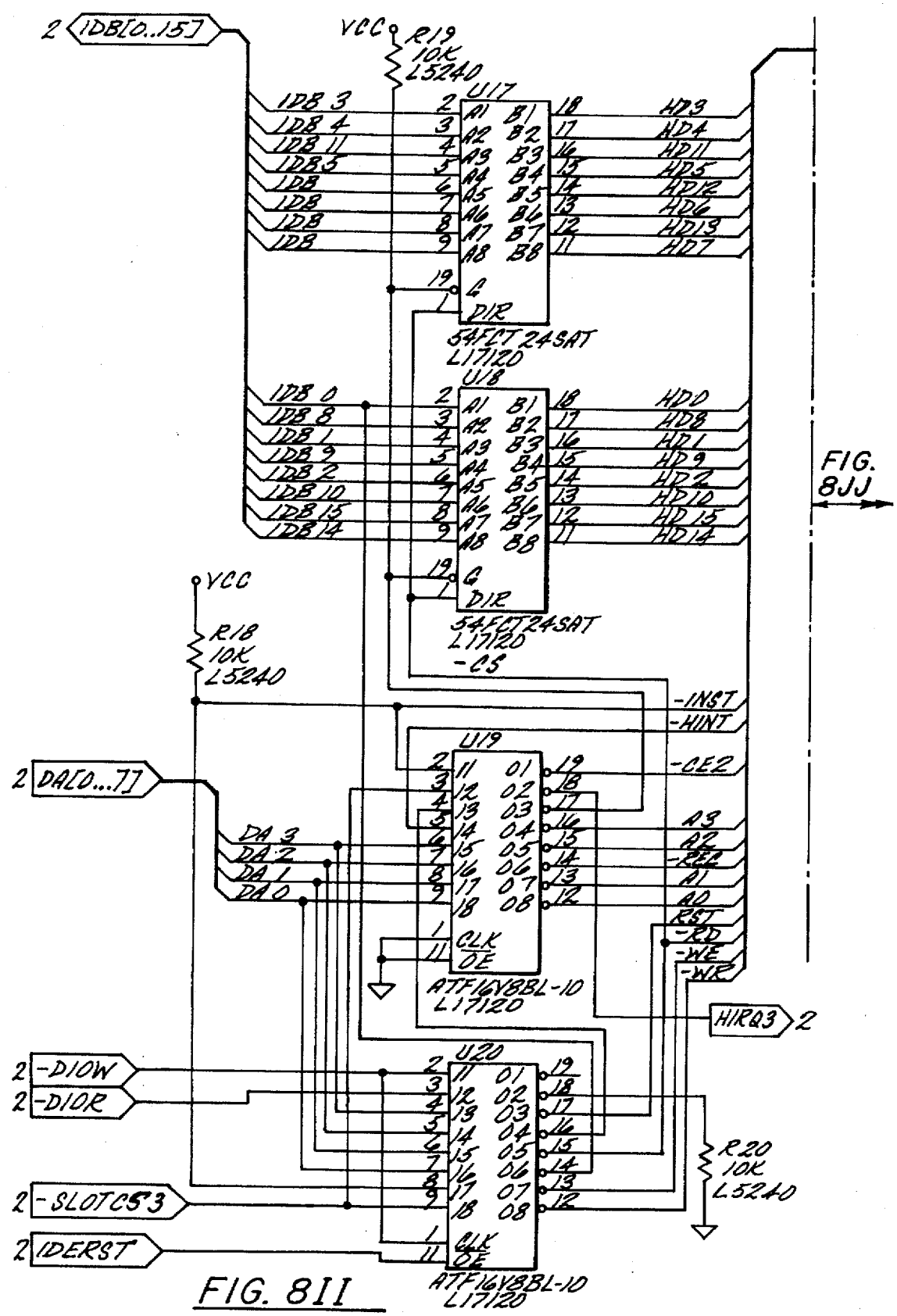
Figure 8K:
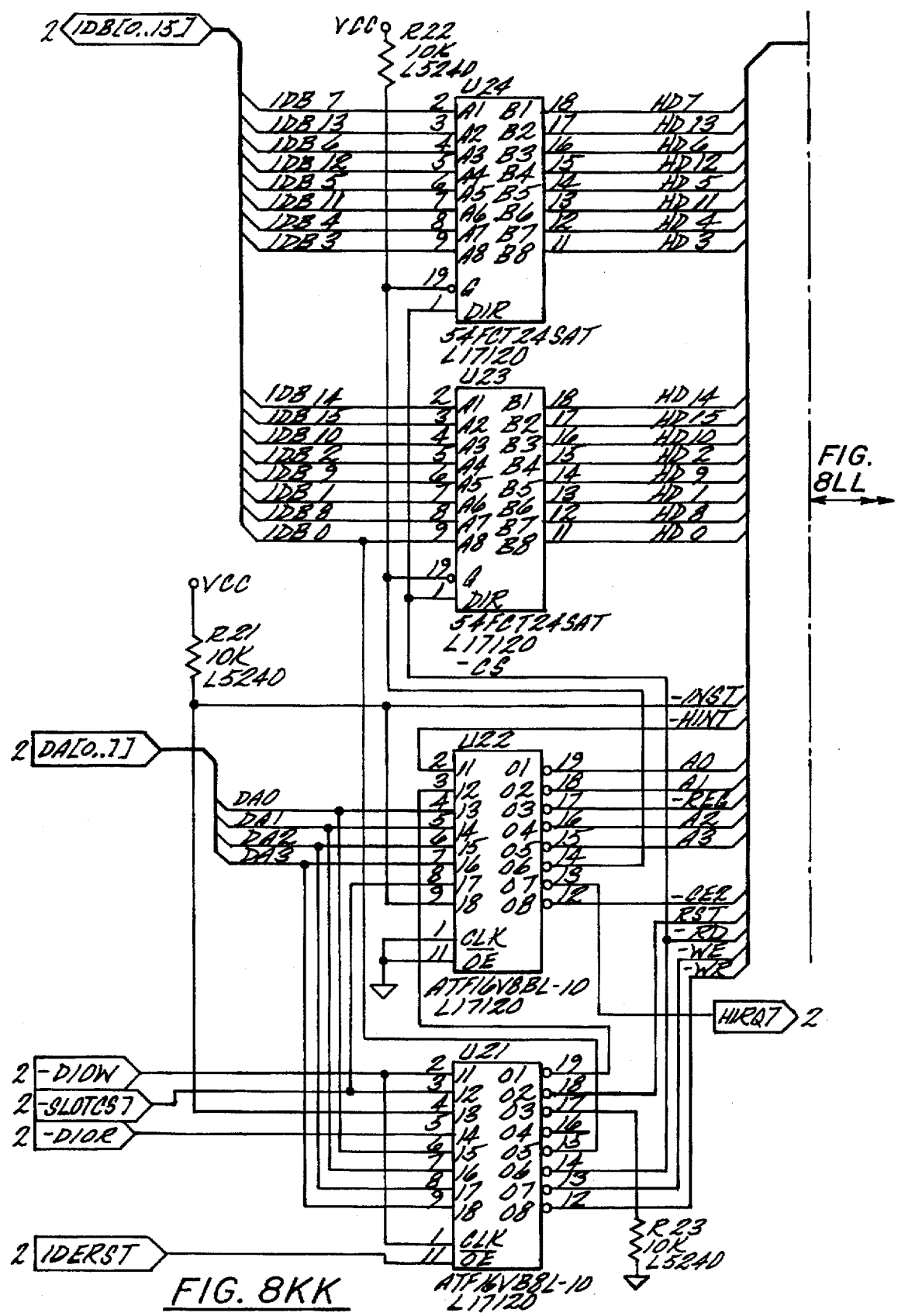
Figure 8M:
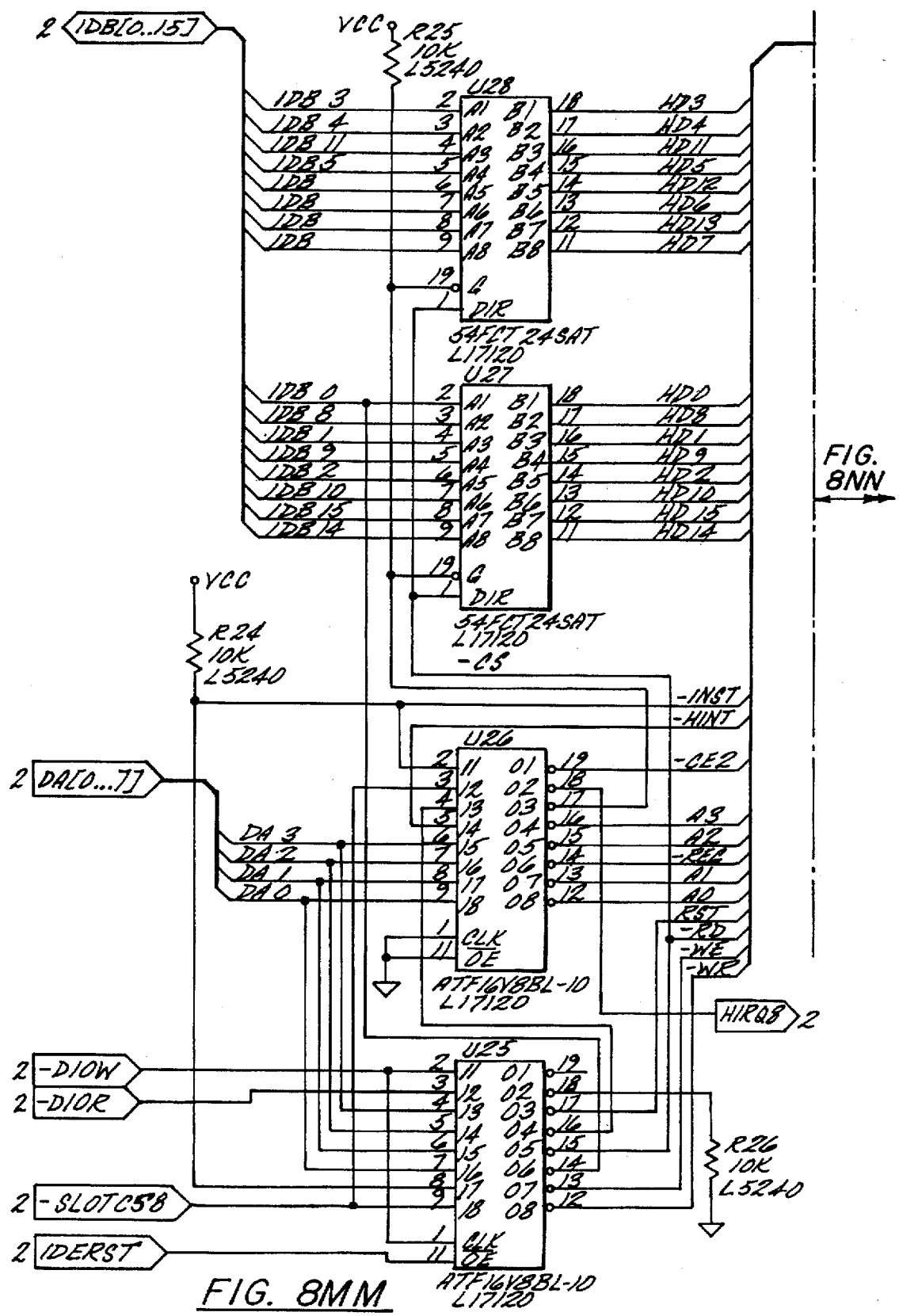

Referring to FIGS. 8A–S, schematics of the redundant array electronics are provided. This circuitry was described above with reference to a block diagram thereof (FIG. 6). This detailed schematic is readily understood and appreciated by one of ordinary skill in the art. It will also be appreciated that this schematic is only exemplary and not intended to limit the scope of the present invention as other circuit configurations may be apparent to one of ordinary skill in the art.

Figure 9:
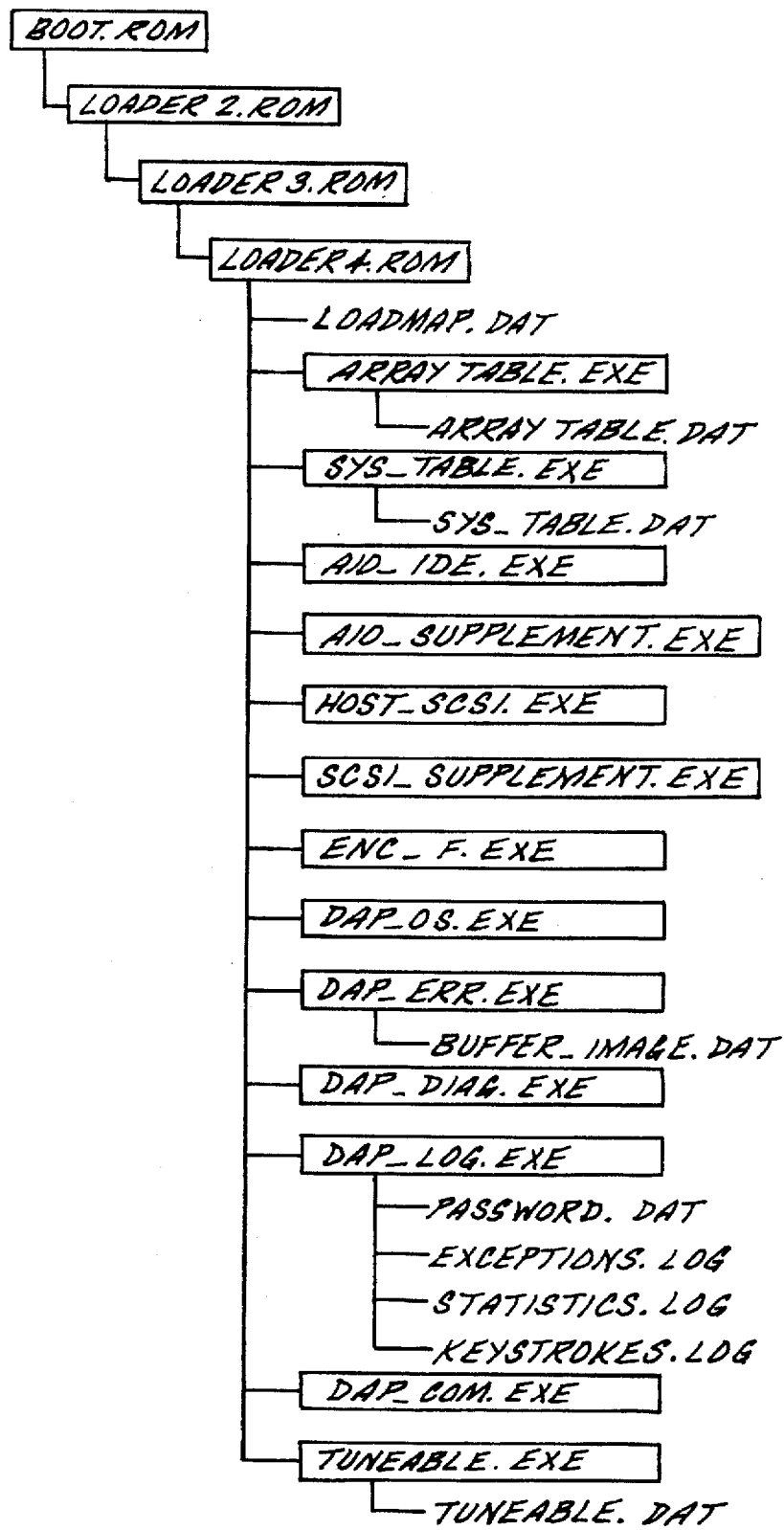
FIG. 9 is a software hierarchy chart of the software employed by the device of FIG. 1.

Referring to FIG. 9, a software hierarchy chart of the software employed by the present invention is shown. The boot room routine, stored at EPROM 128, includes: a bring-up code which initializes the hardware, runs diagnostics and loads loader2.rom; software interrupt services limited to the read and write capability of the cards, provides limited Uart services, and busy and limited command services for the SCSI port; and a debugger. The loader2.rom routine reads the directory on the card from which it was loaded, locates loader3.rom, loads this loader to RAM 126 and starts the execution of loader3.rom. This loader includes a data parameter block which is used to specify data relating to partitioning information. The loader3.rom routine determines from which card to load loader4.rom. The loader4.rom routine loads the file loadmap.dat from the card it was loaded from to the lowest available RAM area and then loads each program in the sequence specified in loadmap.dat into memory. Once all of the programs have been loaded, loader4.rom perform background tasks. Next loader4.rom issues init__1–6 software interrupts as specified by loadmap.dat. Following init__6 the main system interrupt is enabled. Thereafter, the idle__bit routine updates the loadmap.dat's ram image.

The array table.exe routine keeps track of the array and builds tables to define array sets and checks the cards for proper array__table.dat data file, reads the file and cross references the contents with all other cards. If no discrepancies are detected, the card is added to the array. The sys__table.exe provides a global data structure containing system wide parameters. This table is obtained, at boot time, as determined by ROM and loader services. The sys__table.dat routine present on all cards keeps track of system dependent parameters. The aio__ide.exe routine provides interface and timer services. The aio__supplement.exe routine provides support services by preprocessing commands.

The host__scsi.exe routine provides the host SCSI-2 interface. The scsi__supplement.exe routine manages the buffer area which is divided into pages. The eng__if.exe routine parses commands generated and collected by dap__com.exe, generates commands based on start-up and performs other housekeeping functions. The dap__os.exe routine provides services such as transfers, read/write of file from the cards to memory, compares files, copies files and others. The dap__err.exe routine creates an error table at buffer__image.dat and has a checksum across the data at all times. If a checksum error is detected during operations, then the memory copy is refreshed from the buffer memory copy. The dap__diag.exe routine dispatches corrections and performs monitoring test. The dap__log.exe routine services and logs password commands and updates password.dat and other files. The dap__com.exe routine process incoming data. The tuneable.exe routine reads the tuneable.dat file and makes adjustments accordingly.

Figure 12:
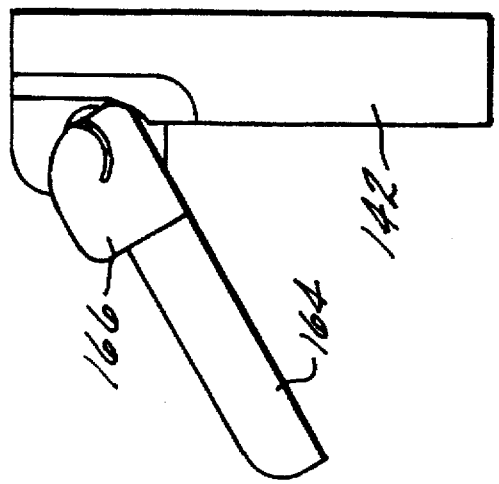
FIG. 12 is a side elevation view of the front cover panel of FIG. 11.
Figure 11:
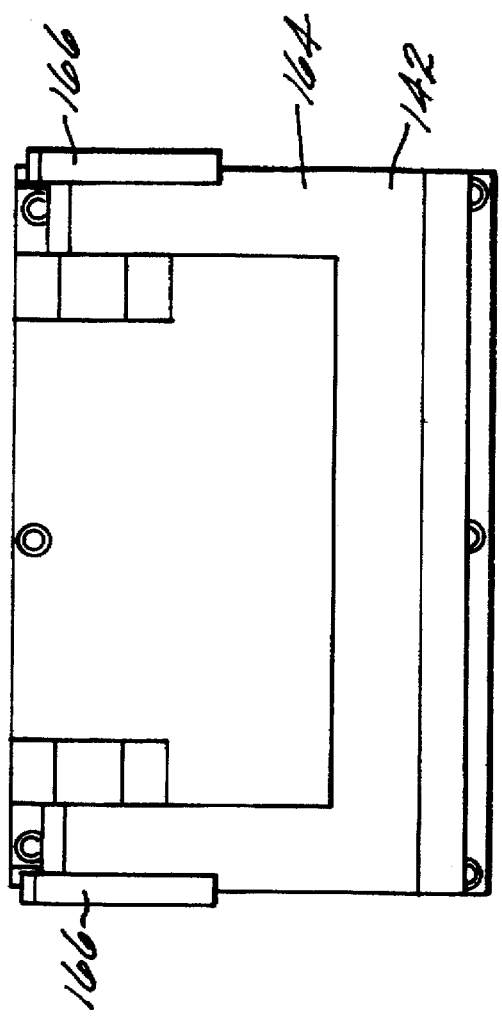
FIG. 11 is a front view of an alternate embodiment of the front cover panel for the device of FIG. 10.

Referring now to FIG. 10, an alternate embodiment of the present invention is shown. In accordance with this alternate embodiment, a housing 140 which fits into a standard rack, such as is common in military applications, includes a front cover panel 142 and a rear cover panel 144. Rear cover panel 144 includes military type connectors, a SCSI-2 connector, two RS-232 connectors and a power connector, each of which is connected to a connector 146. Connector 146 is connected to a backplane (not shown) which is connected to circuit board assemblies 148, 150 and 152 mounted within housing 140. A plurality of solid state memory device, in this example 5-40 Mbyte flash memory PCMCIA cards 154-161 (e.g., part no. SPD5A-40, commercially available from SunDisk Corp., Santa Clara, Calif.) which is electronically connected to a backplane in communication with circuit boards 148, 150 and 152 via its standard 68 pin connector. Flash memory cards 154-161 are secured within housing 140 by corresponding grooves in the inside walls thereof. Referring to FIGS. 10 and 12, alternatively front cover panel 142 includes a handle 164 which is pivotable attached at 166.

An electrical schematic block diagram for this embodiment is the same as that shown in FIG. 6, with the electronics being interconnected by circuitry and mounted on circuit board assemblies 148, 150 and 152.

Figure 13A:
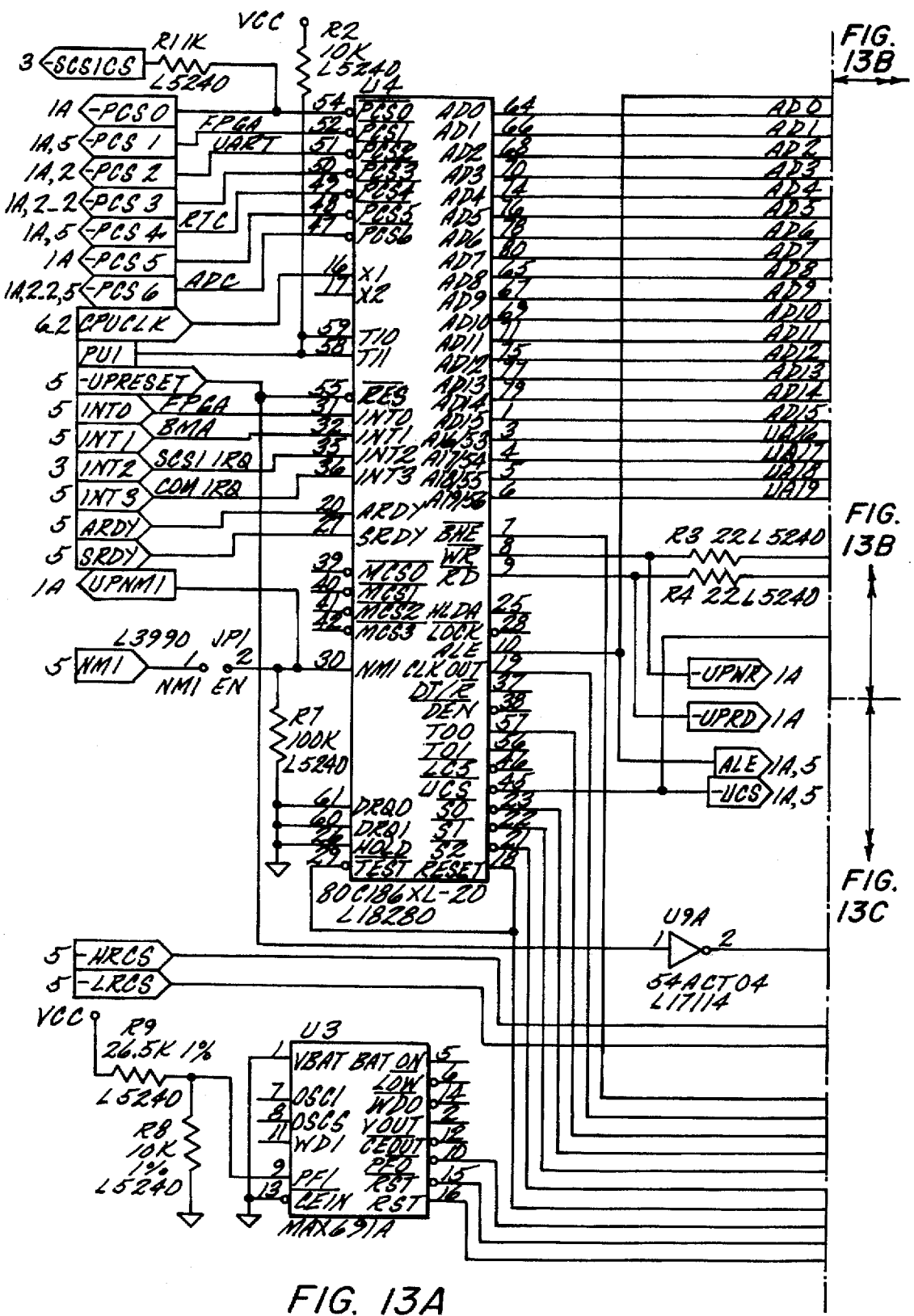
FIGS. 13A–13FF are schematic diagrams of the electronics of the device of FIG. 10.
Figure 13B:
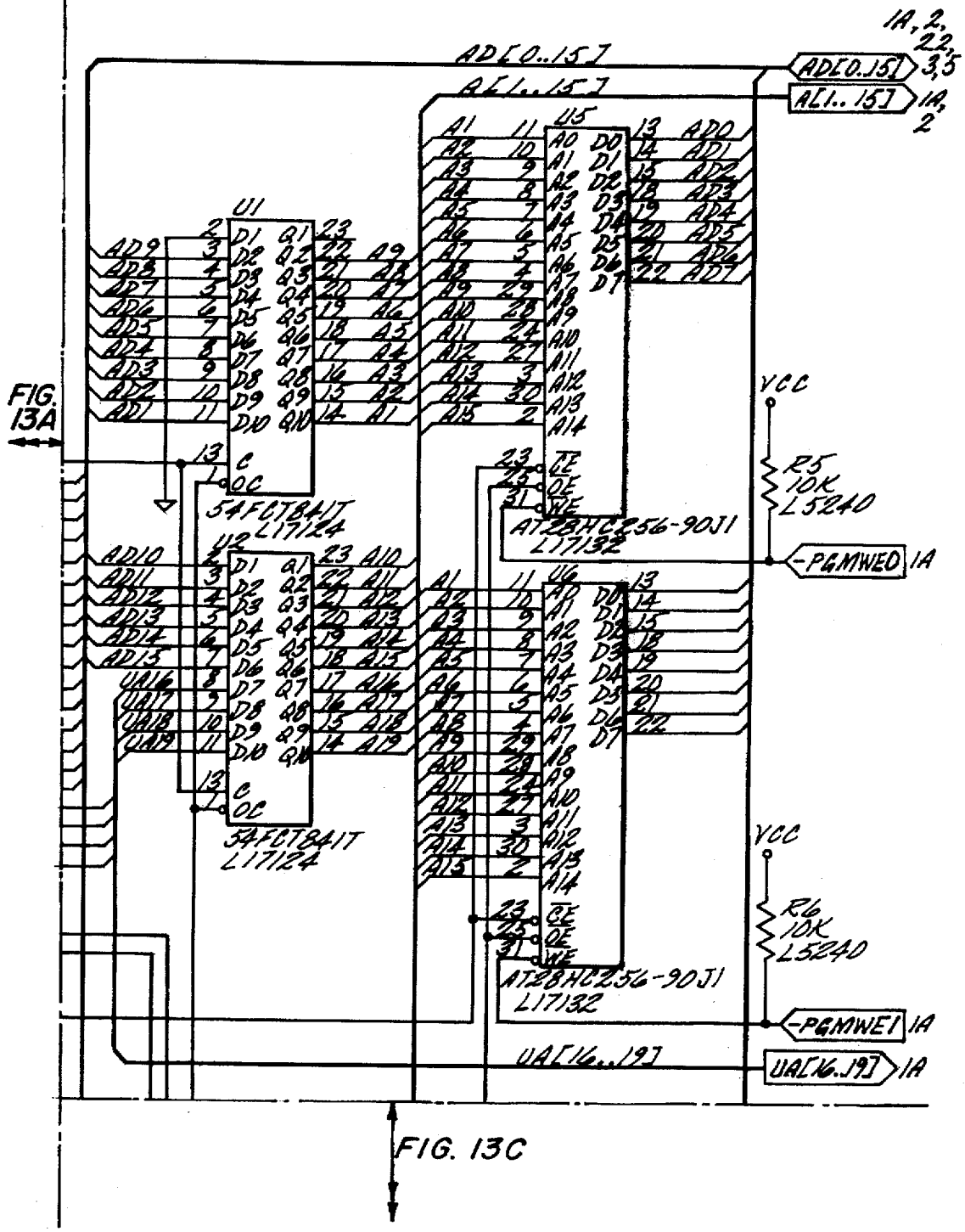
Figure 13C:
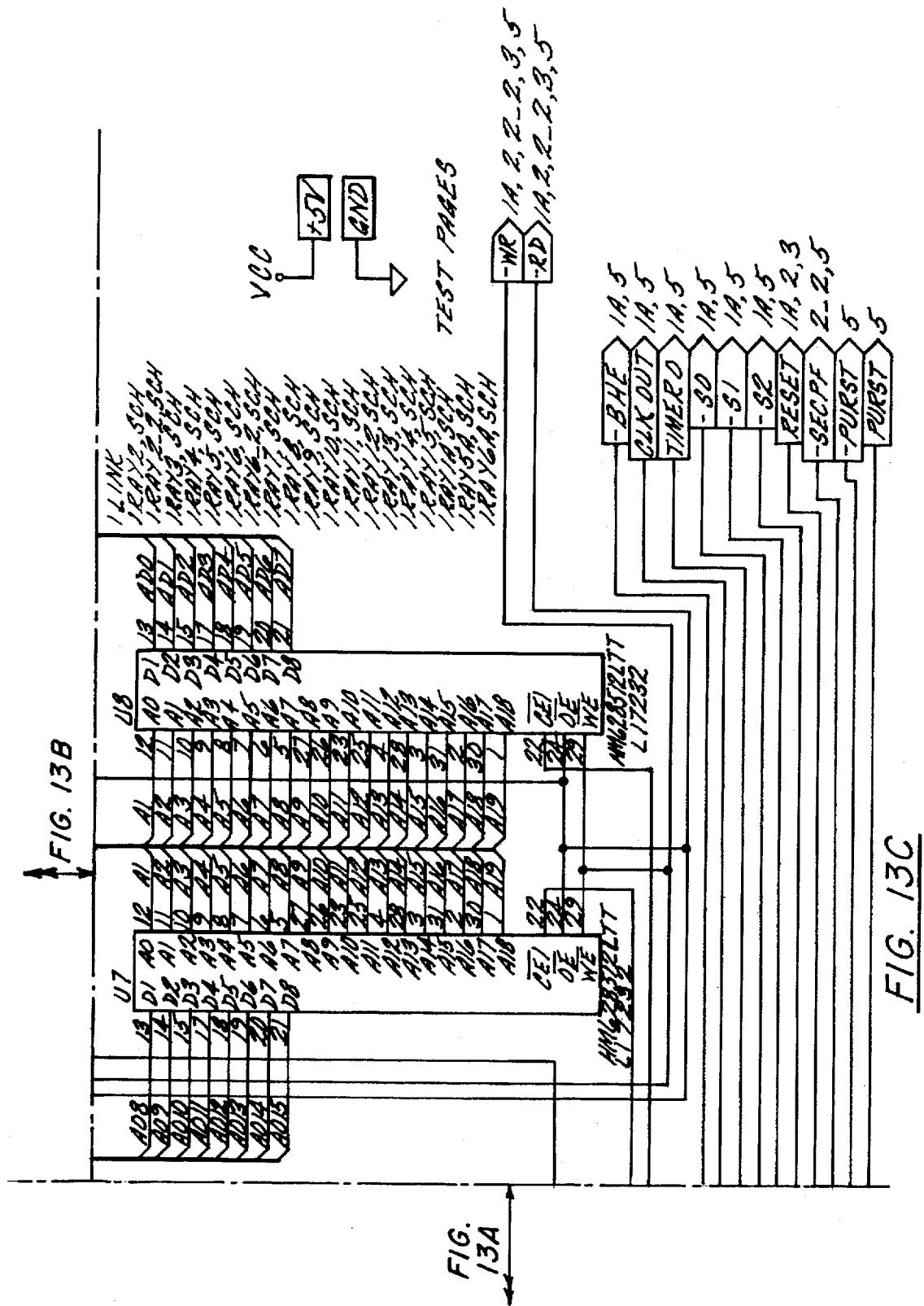
Figure 13D:
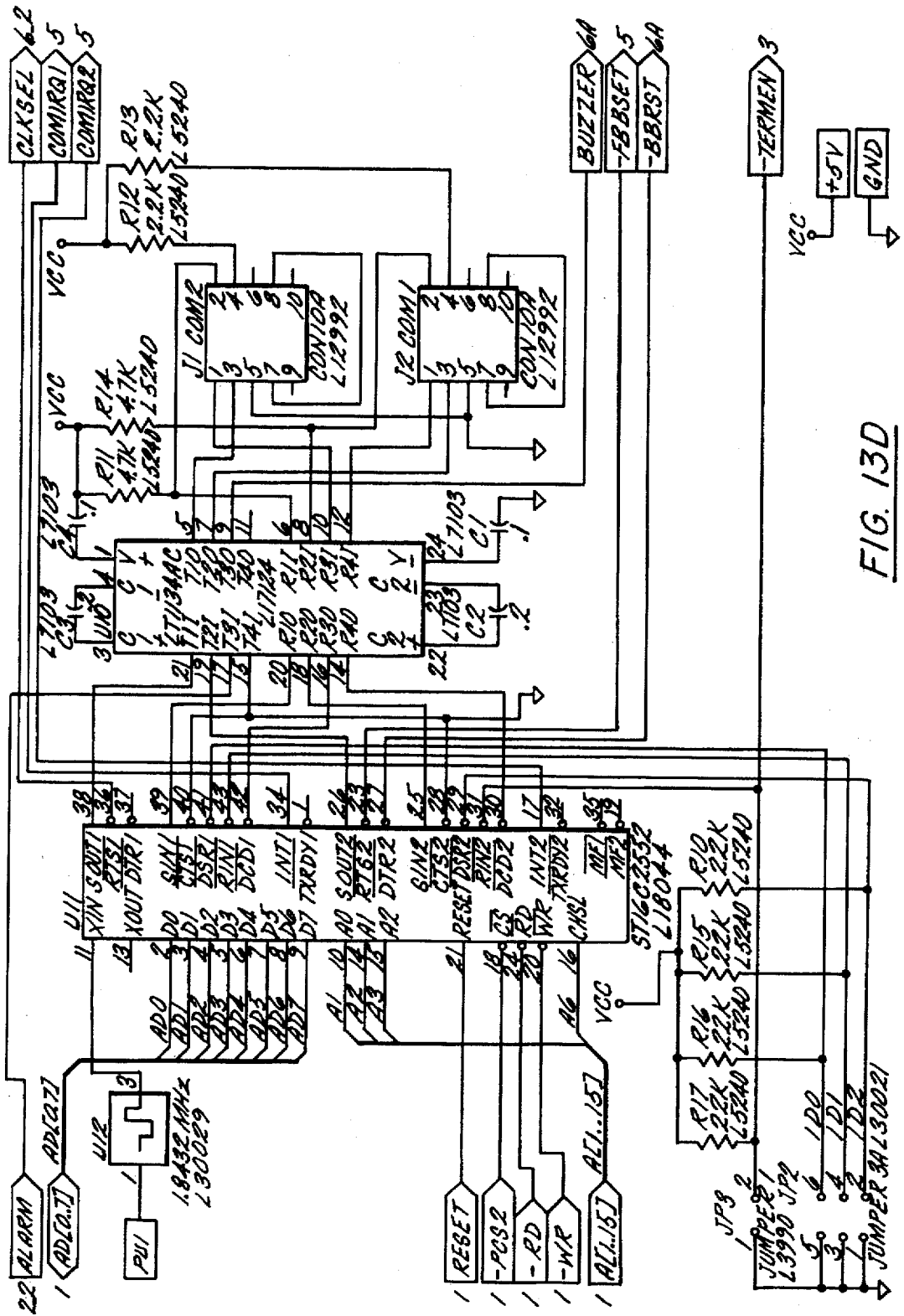
Figure 13E:
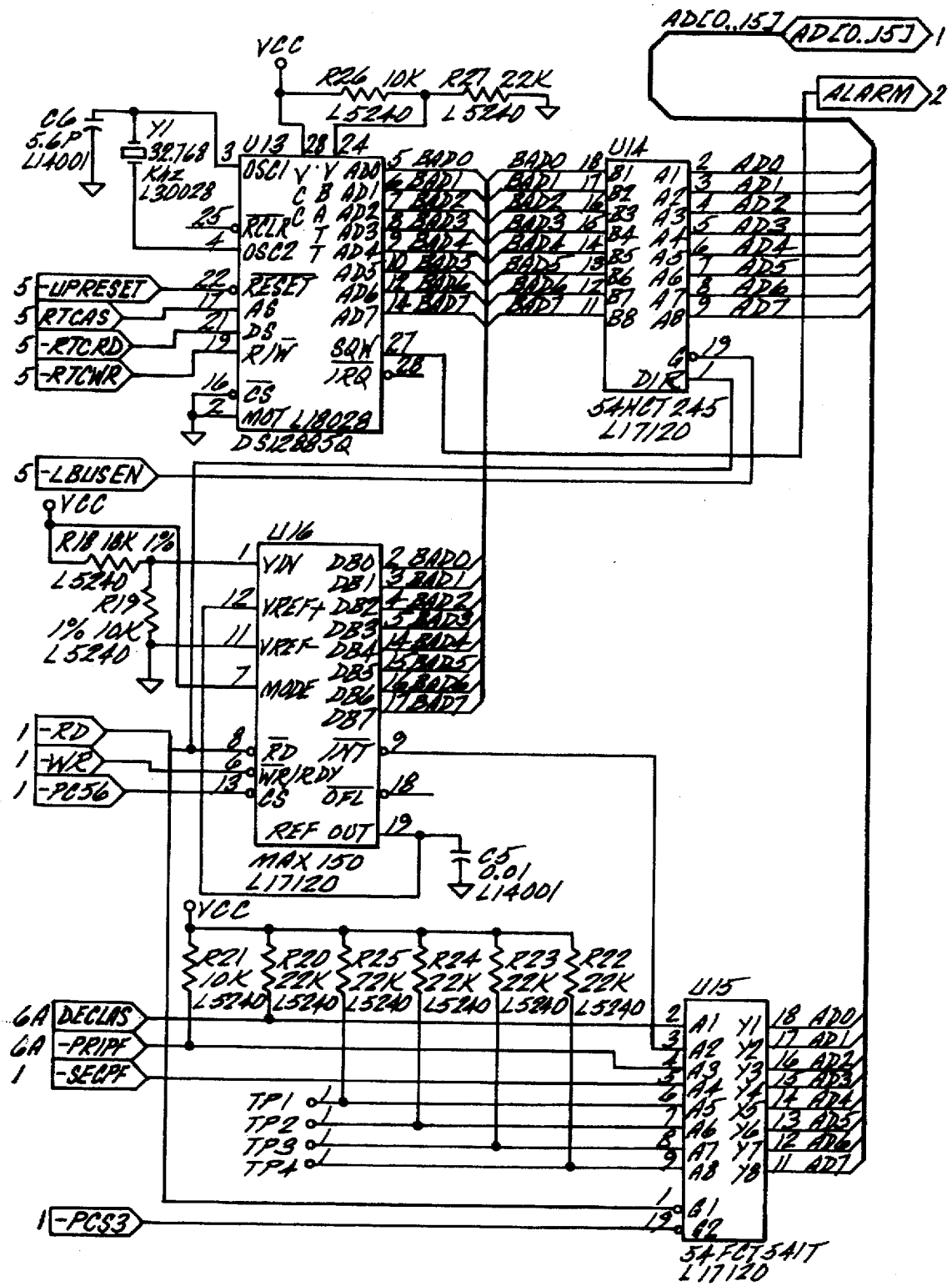
Figure 13F:
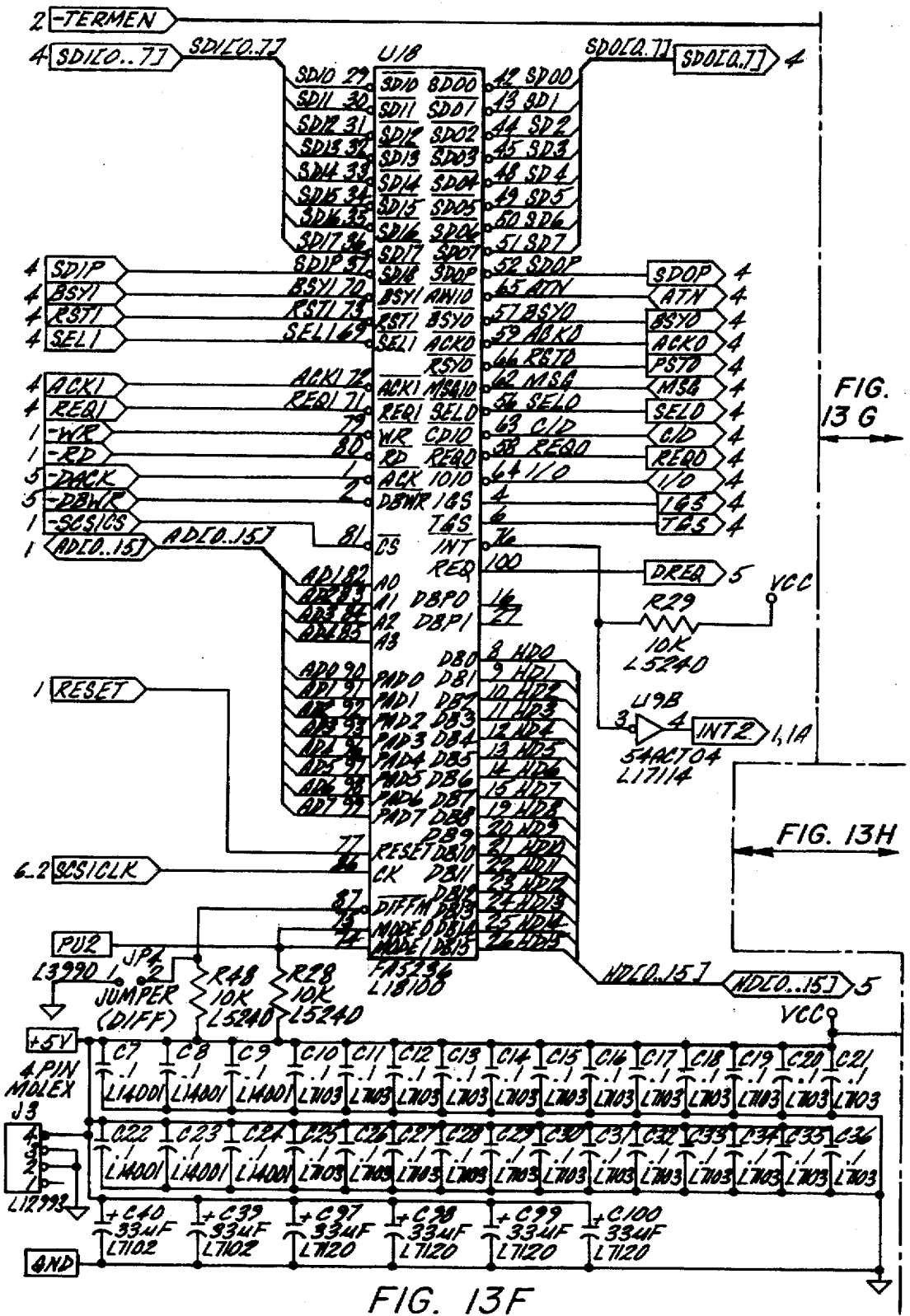
Figure 13G:
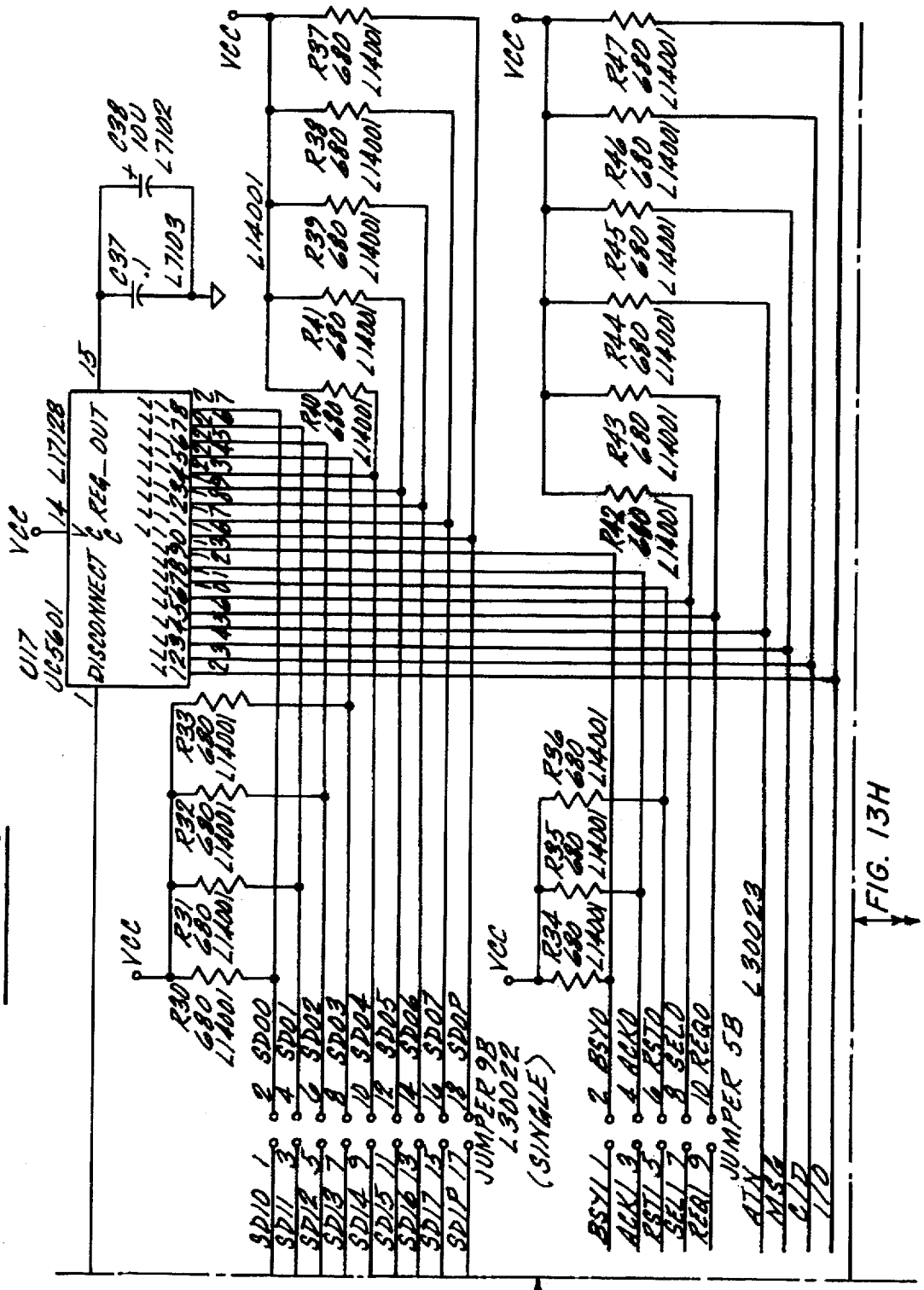
Figure 13H:
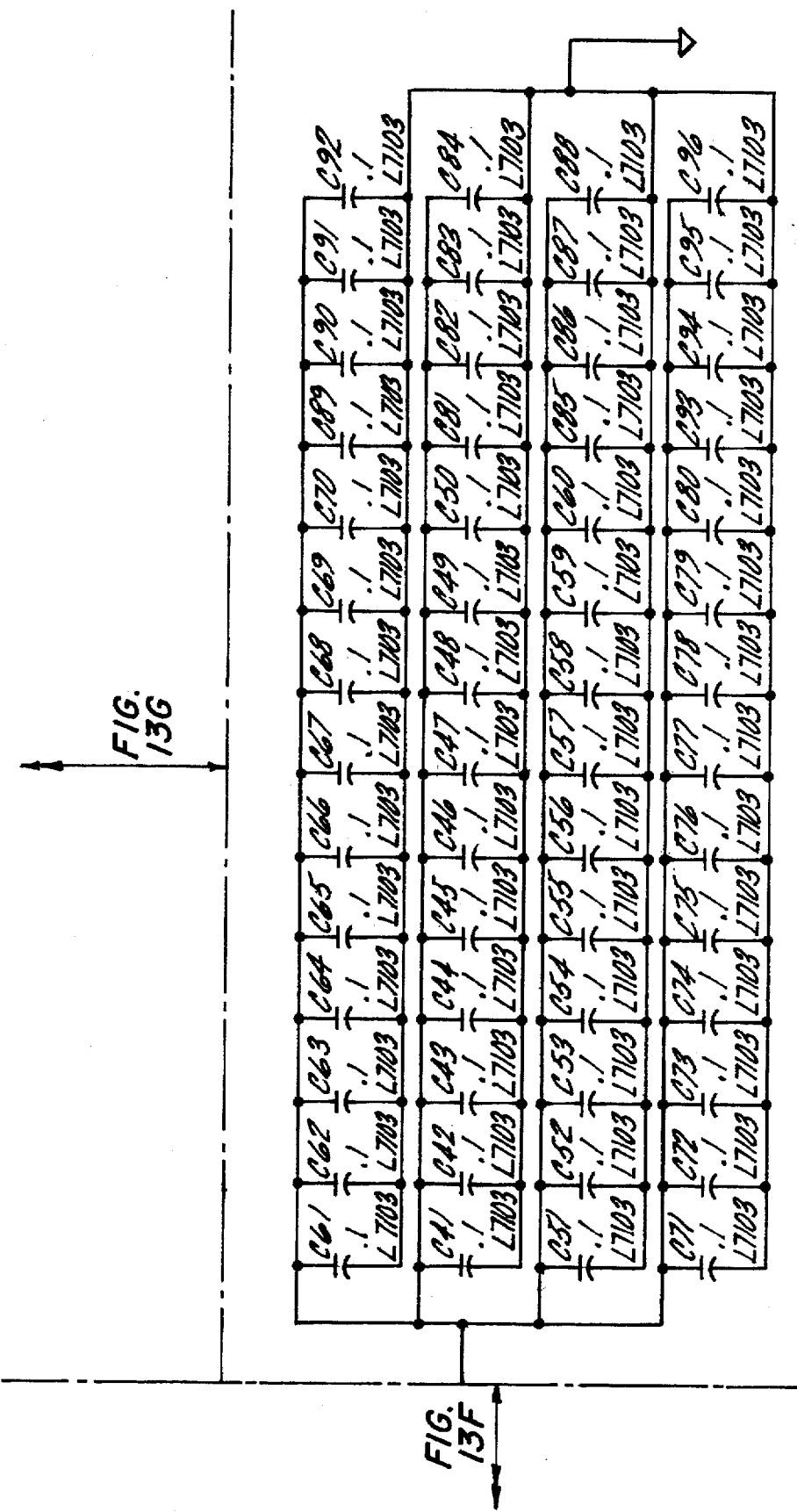
Figure 13J:
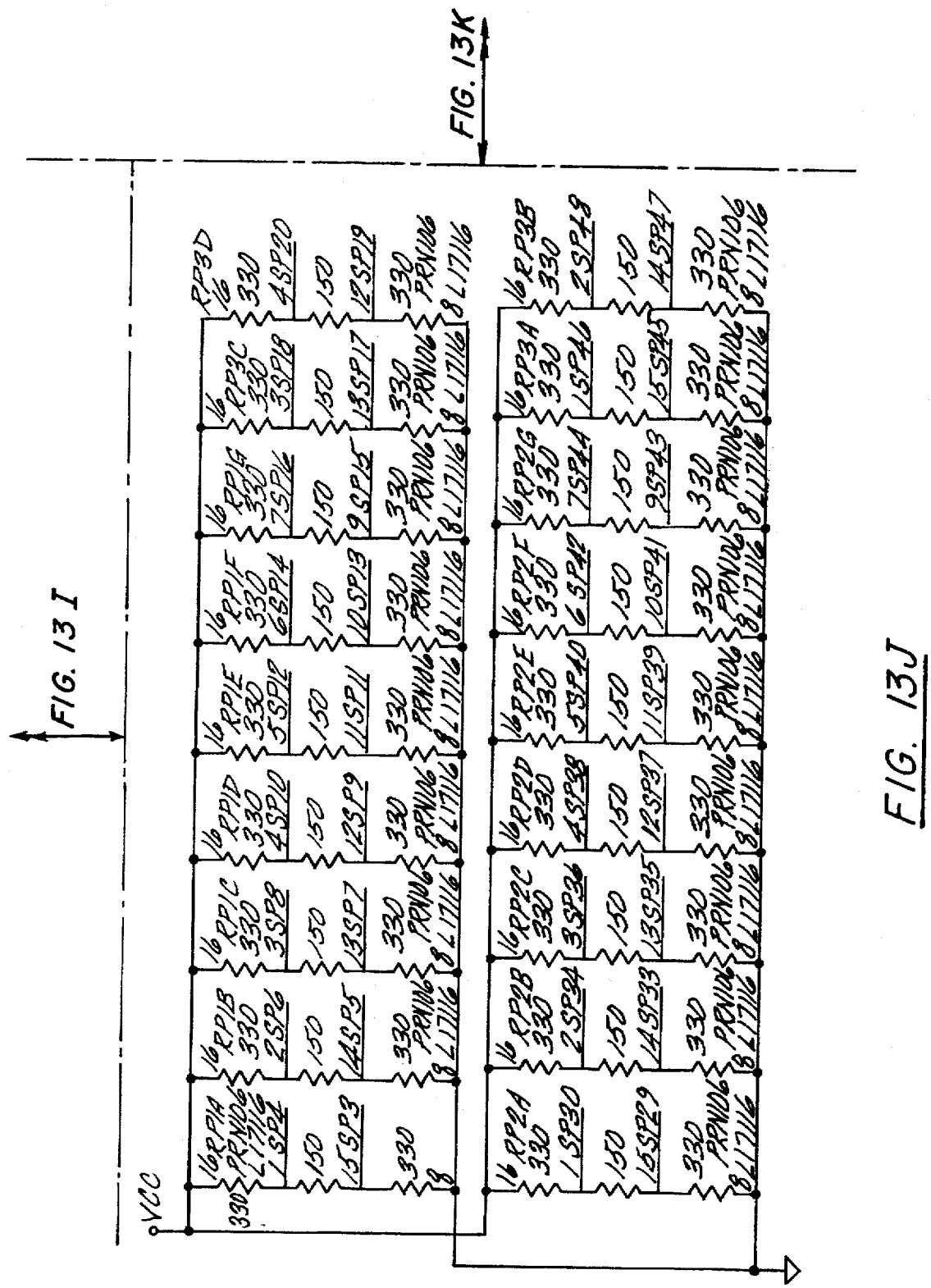
Figure 13M:
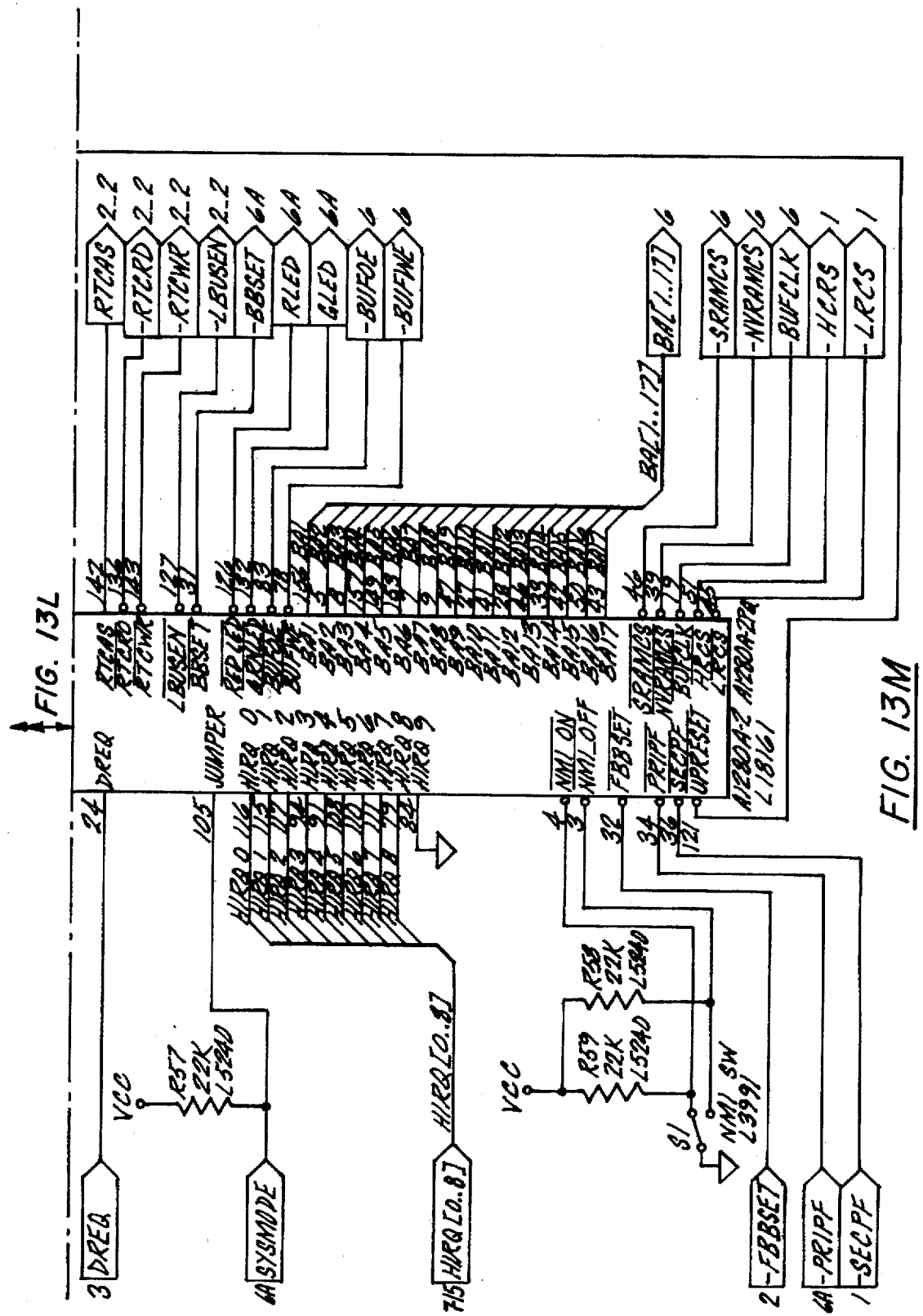
Figure 13N:
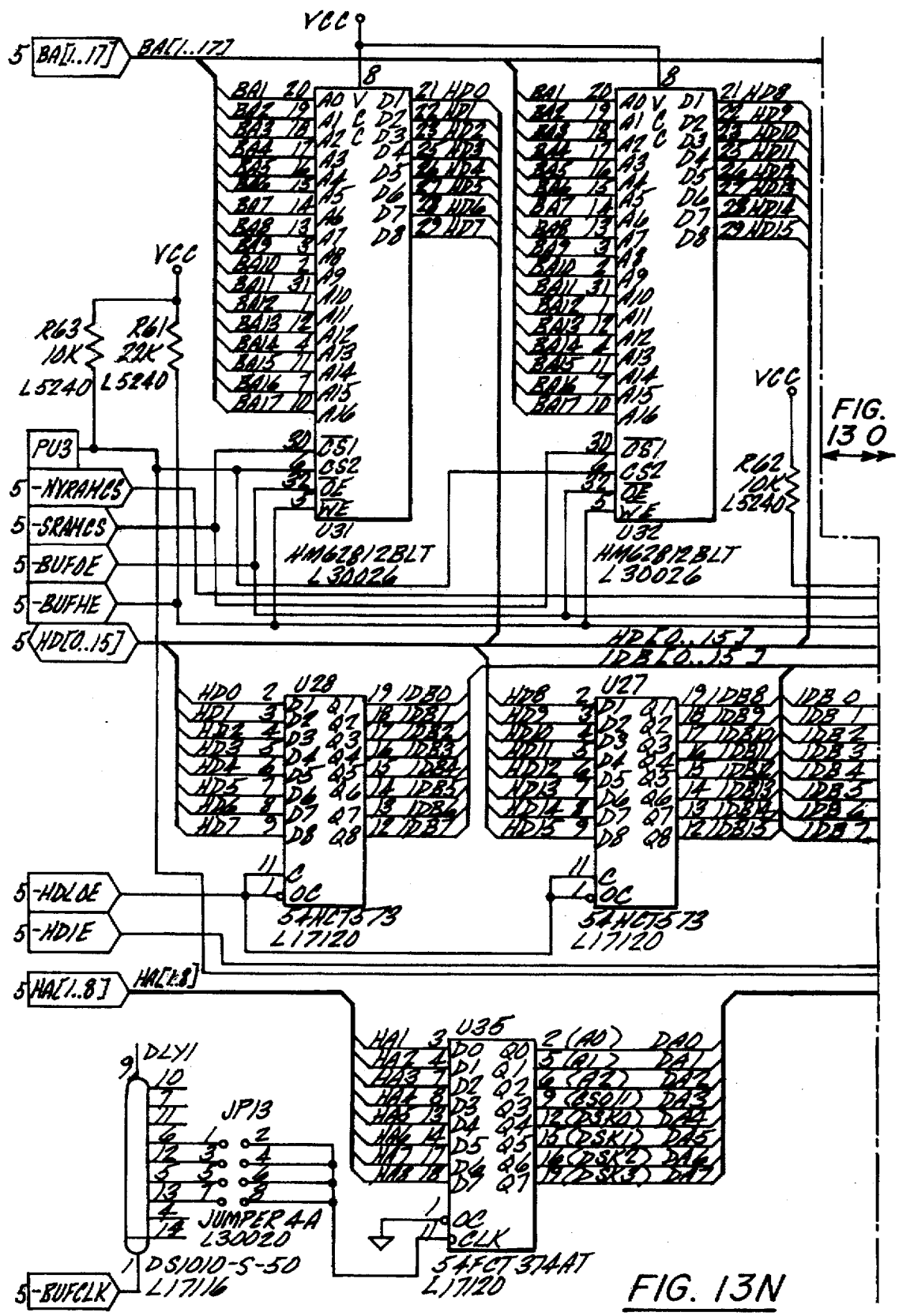
Figure 13:
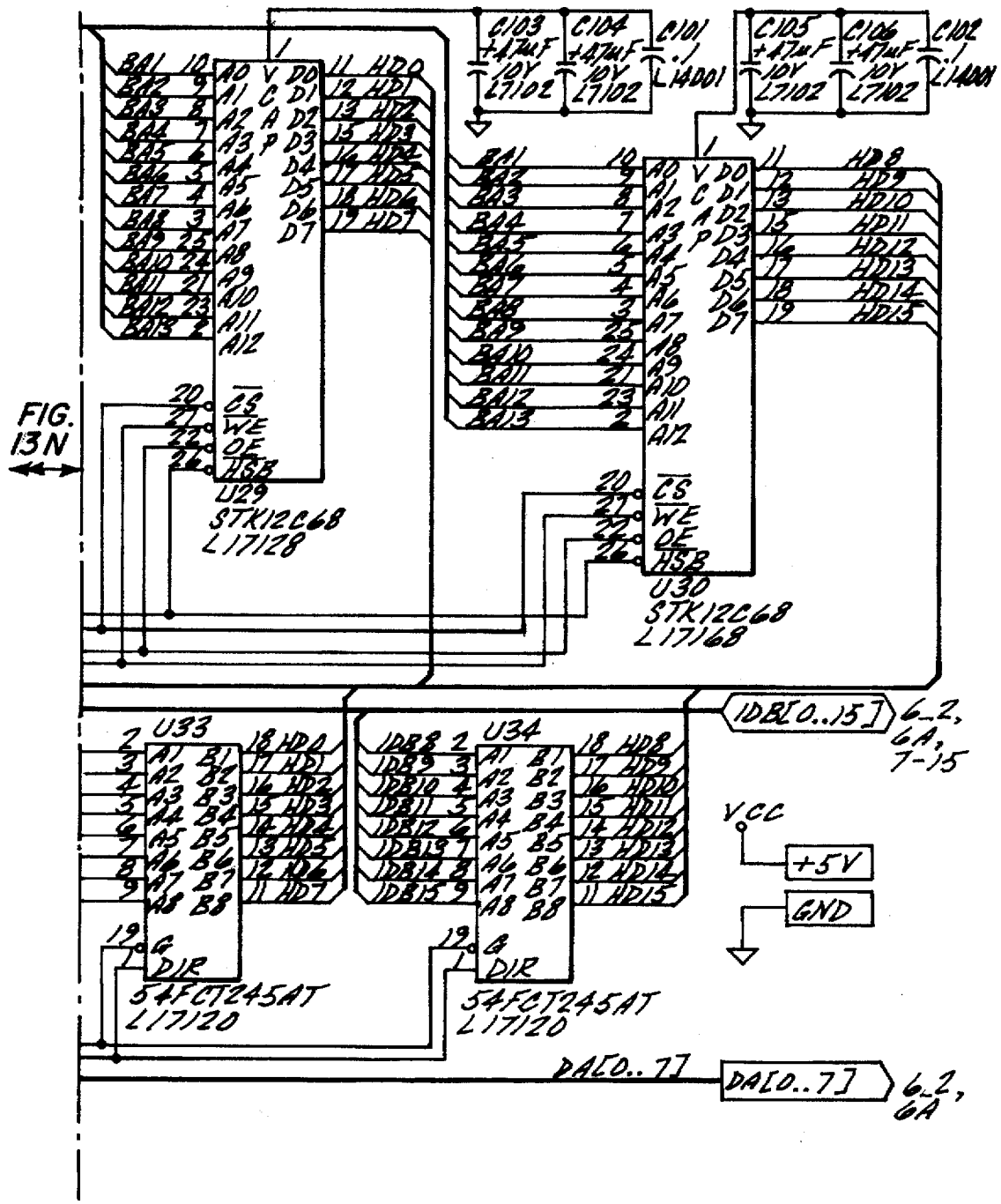
Figure 13P:
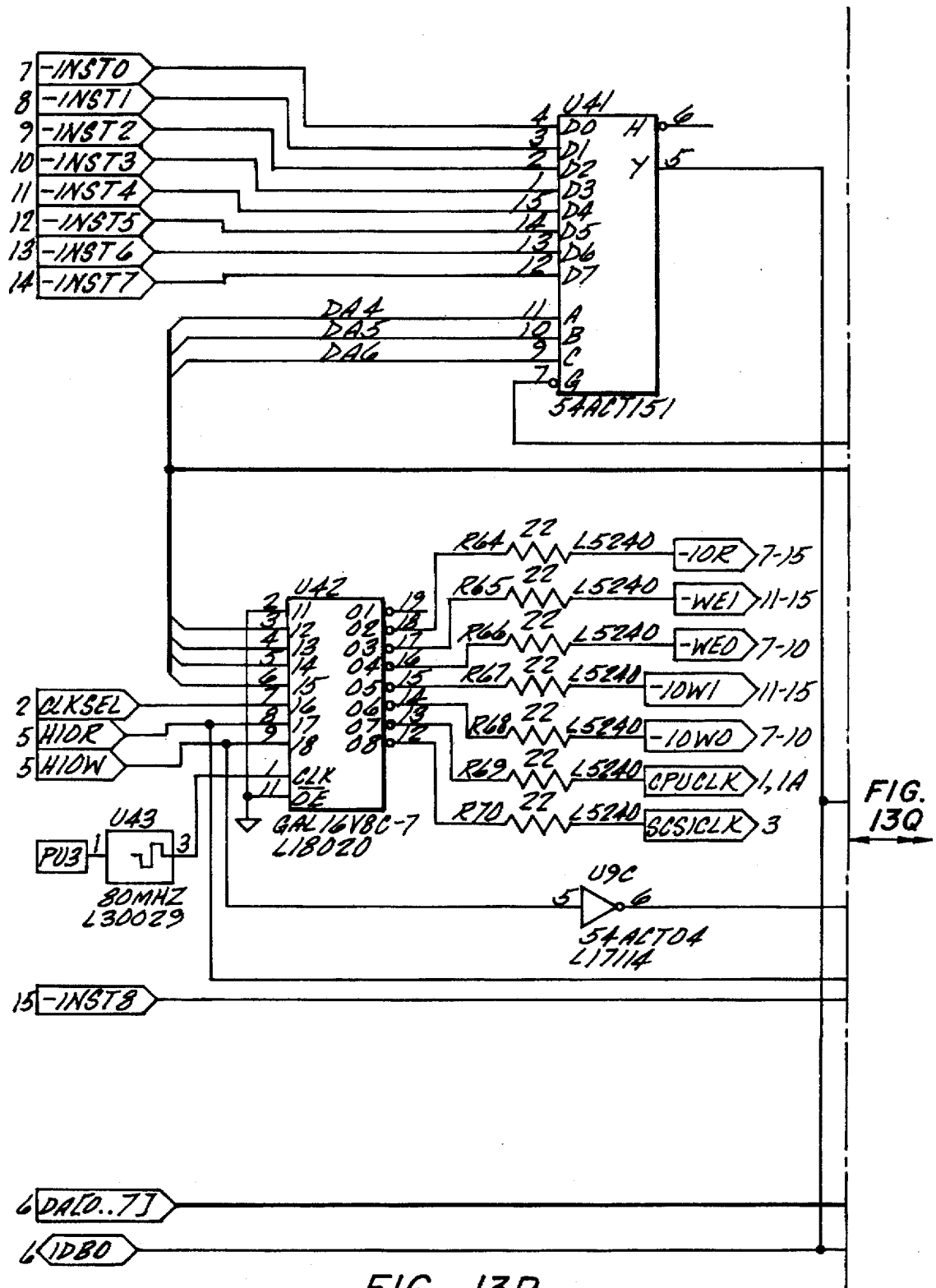
Figure 13:
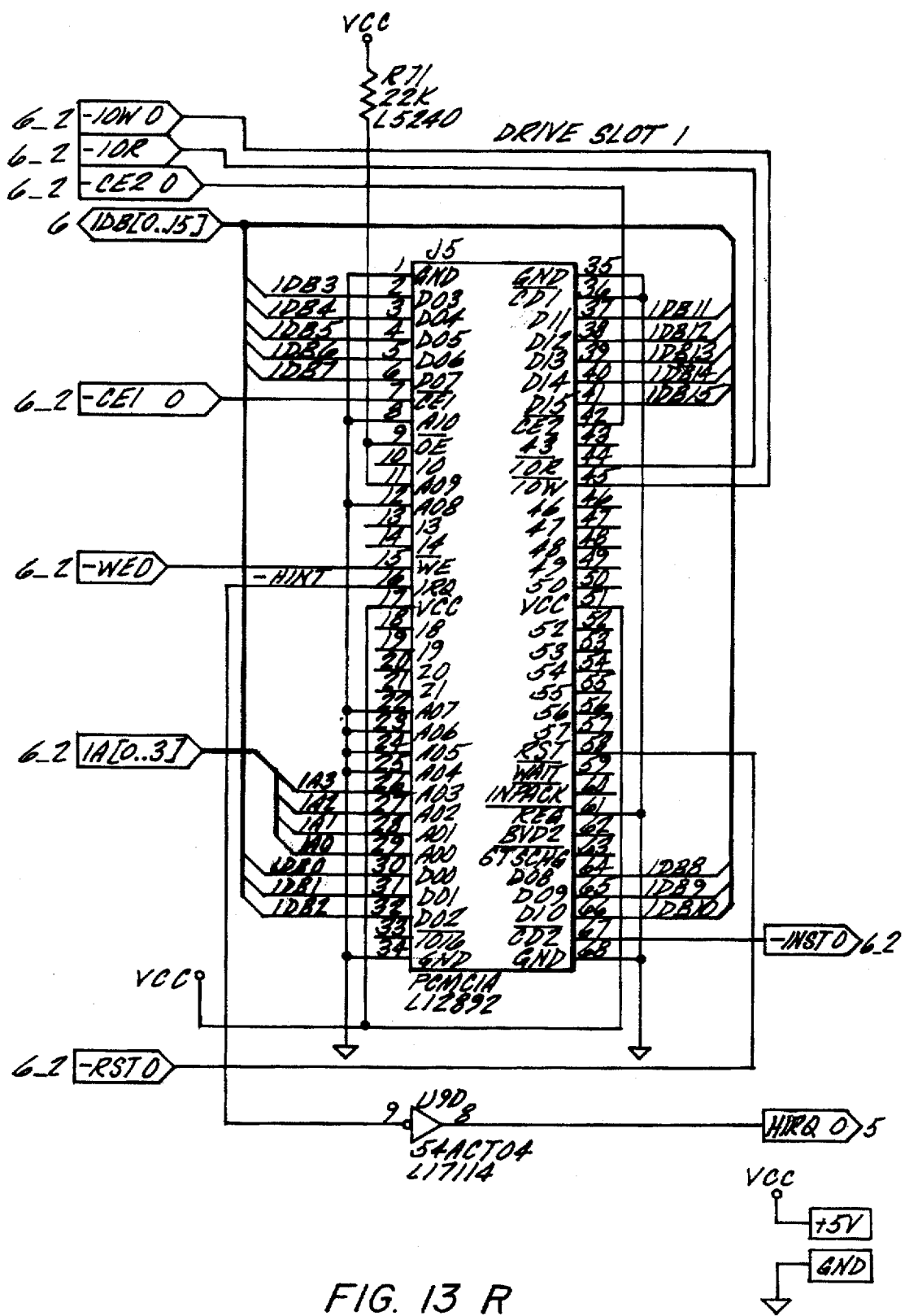
Figure 13:
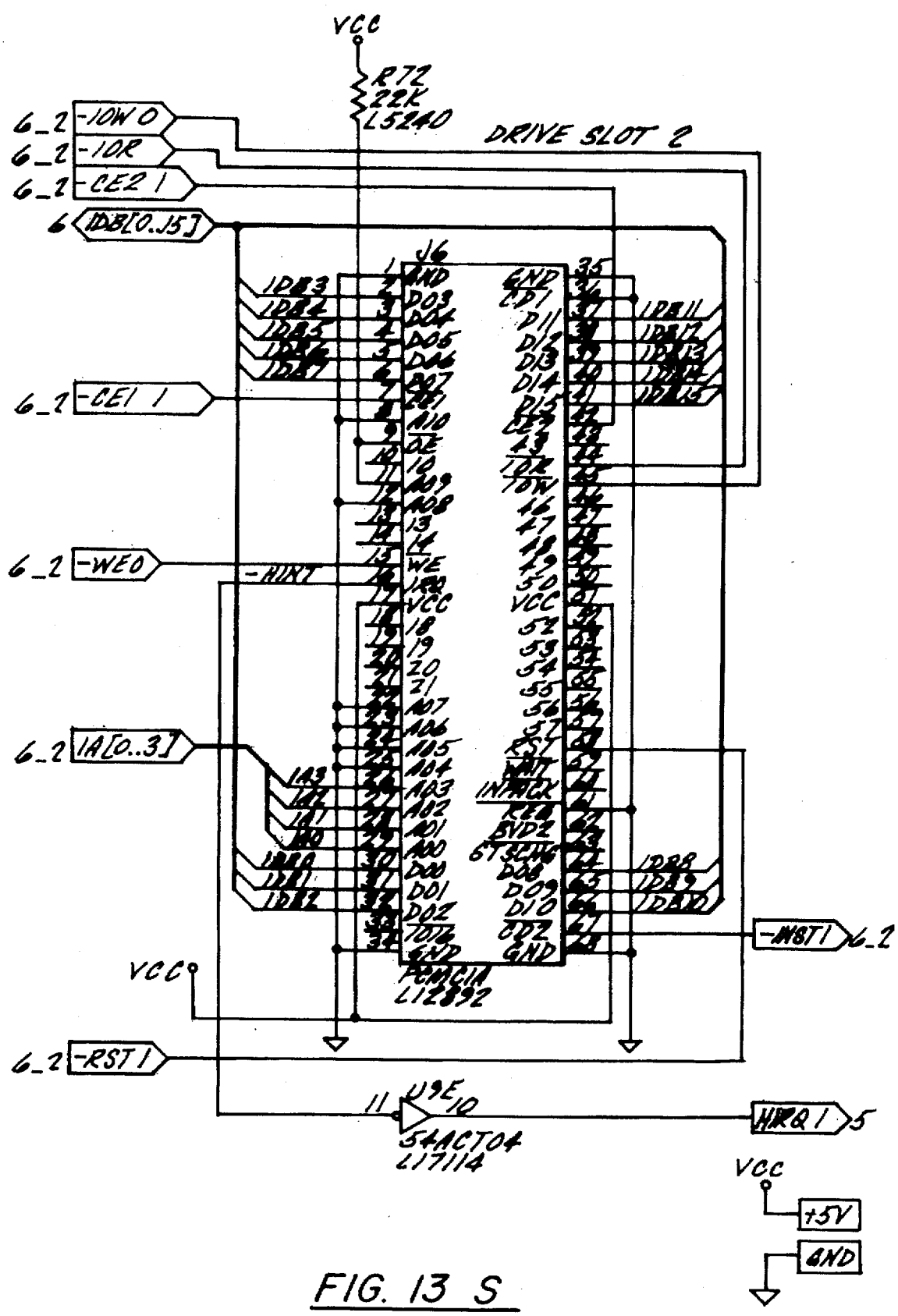
Figure 13:
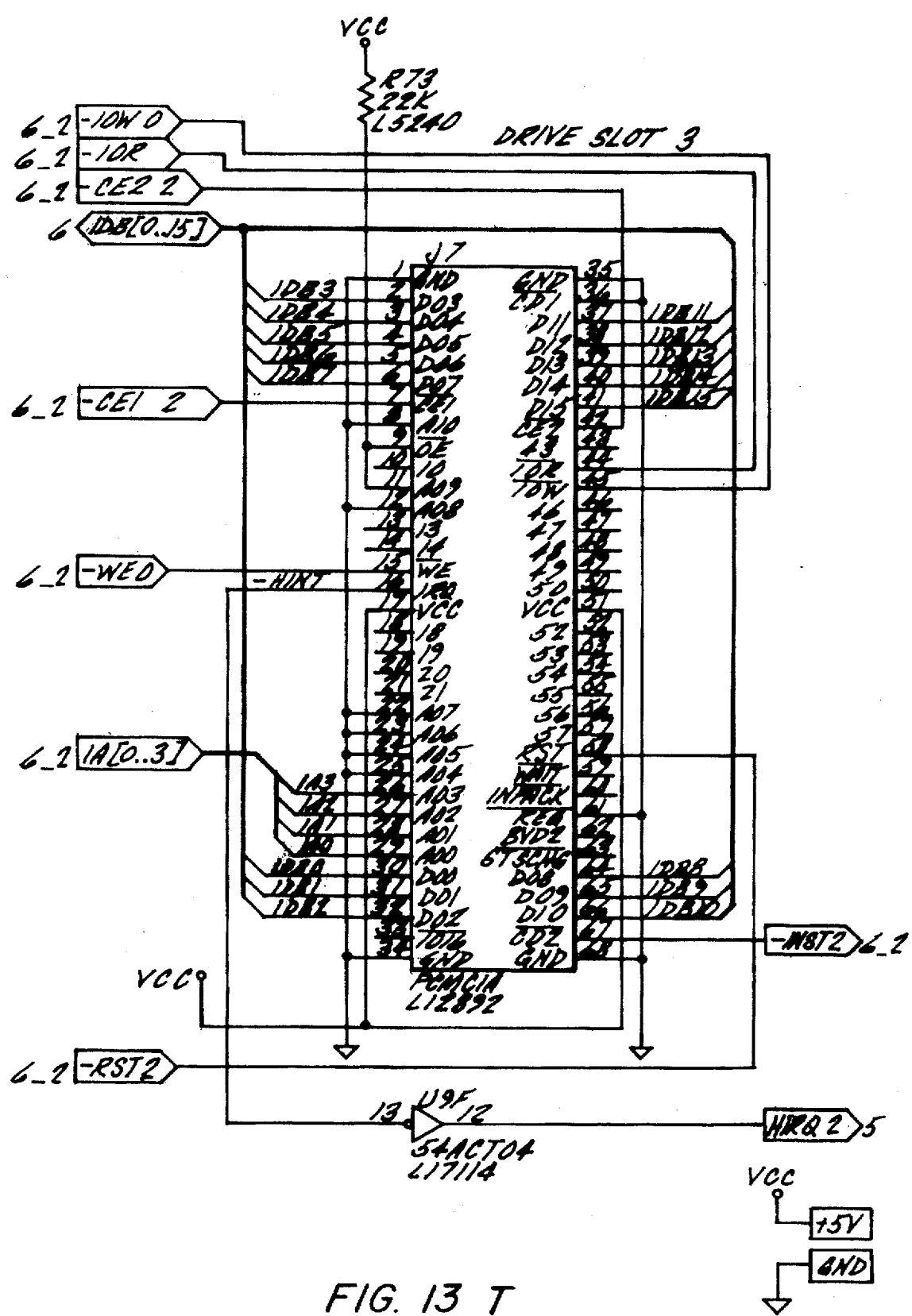
Figure 13:
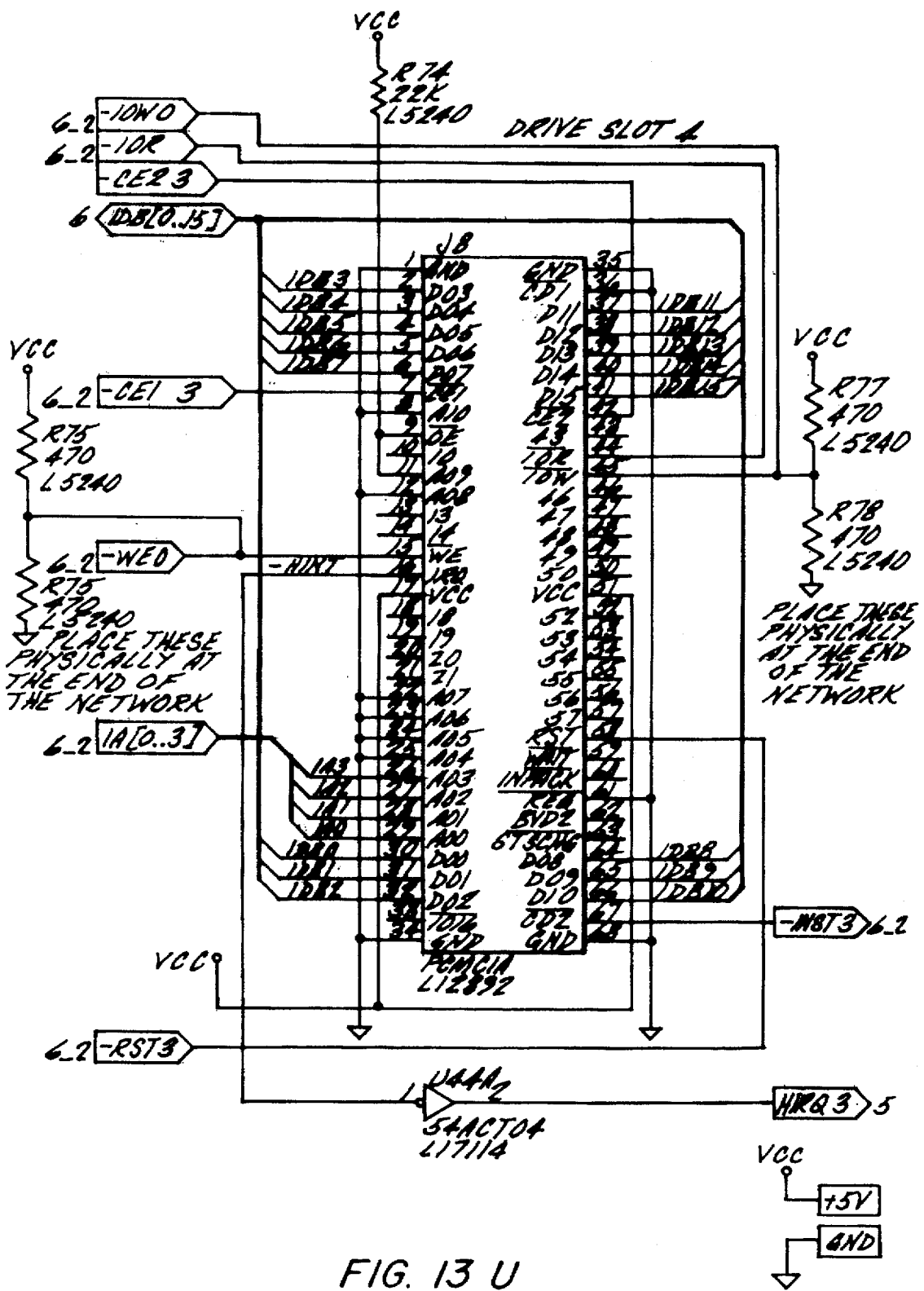
Figure 13:
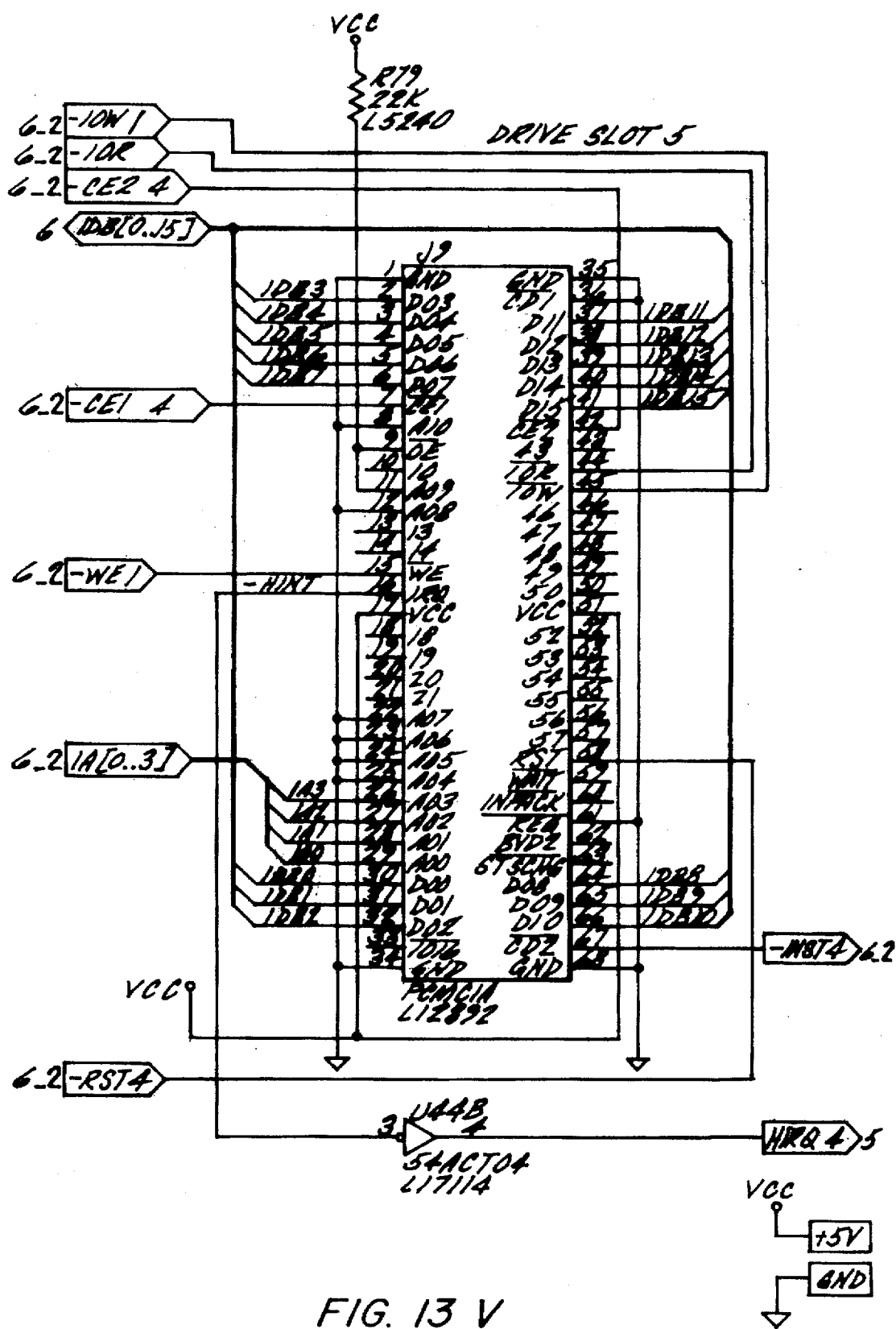
Figure 13W:
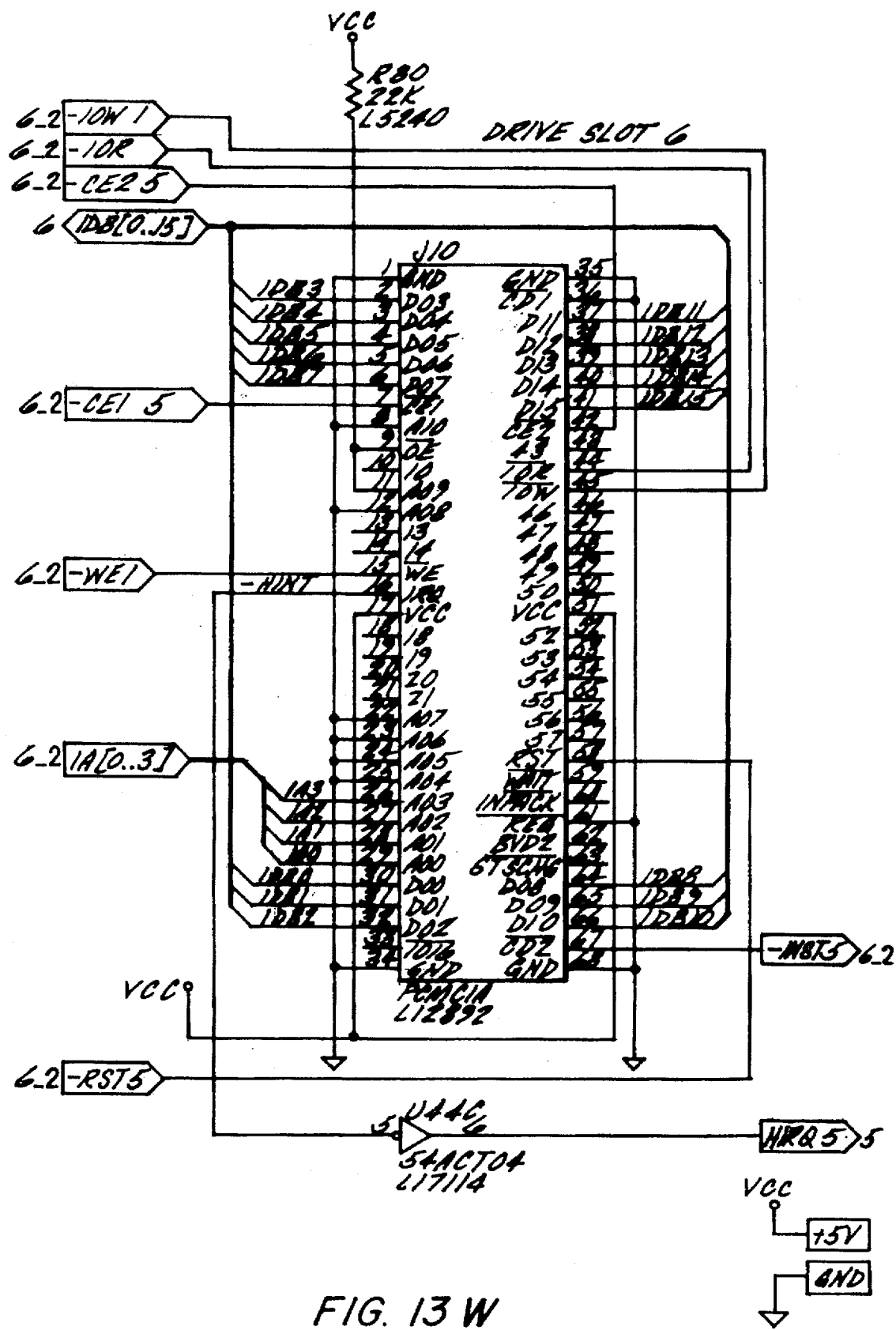
Figure 13:
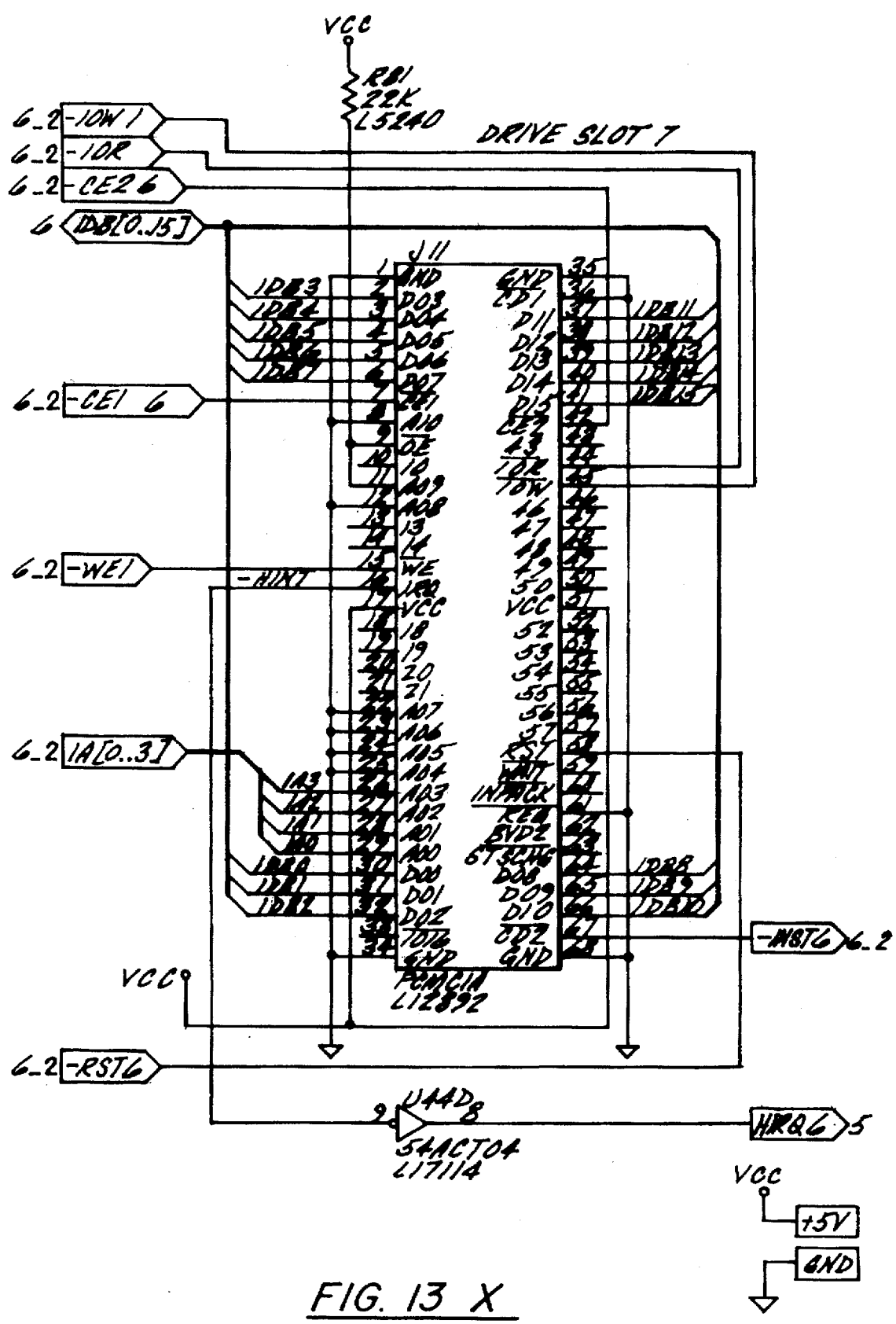
Figure 13Y:
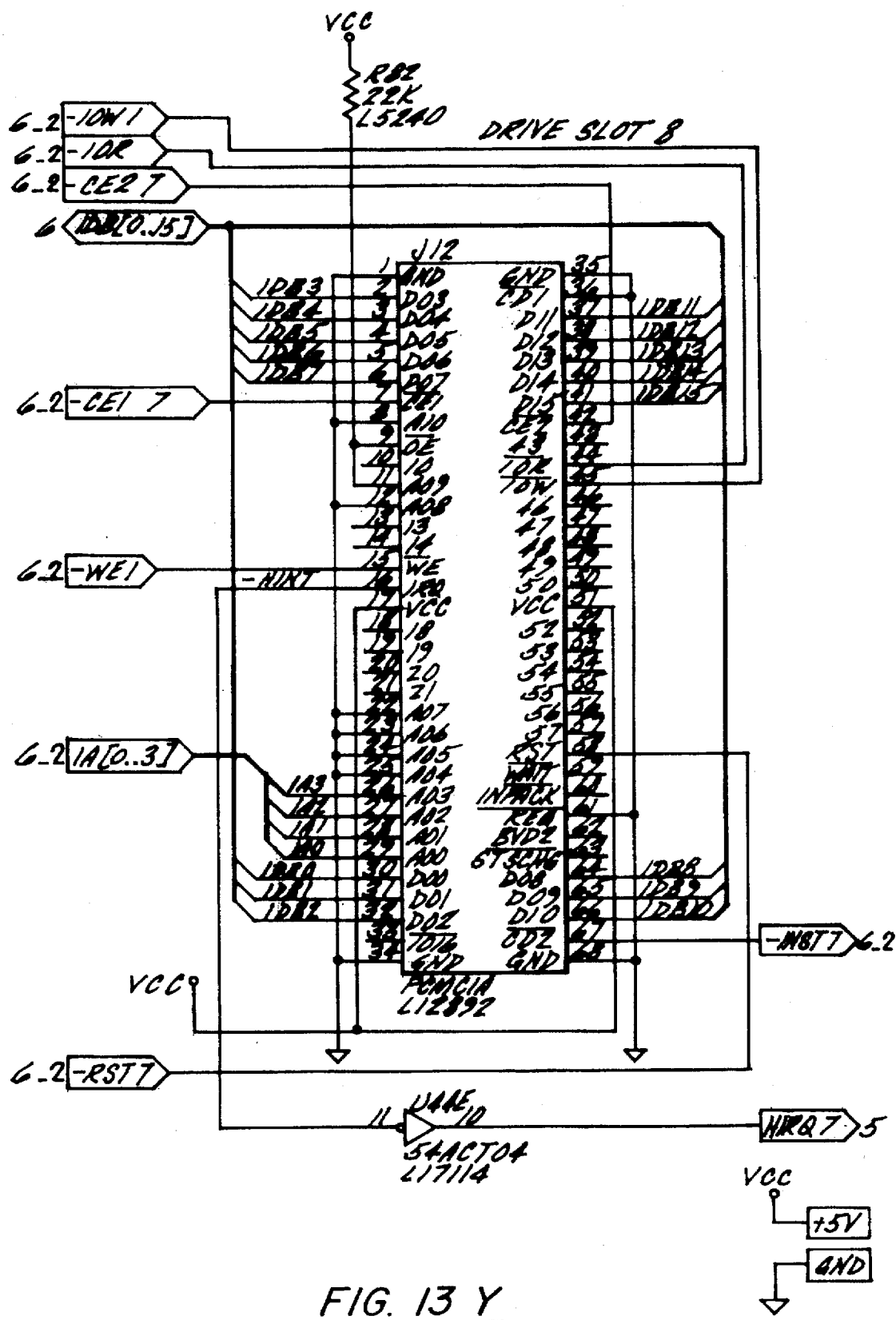
Figure 13:
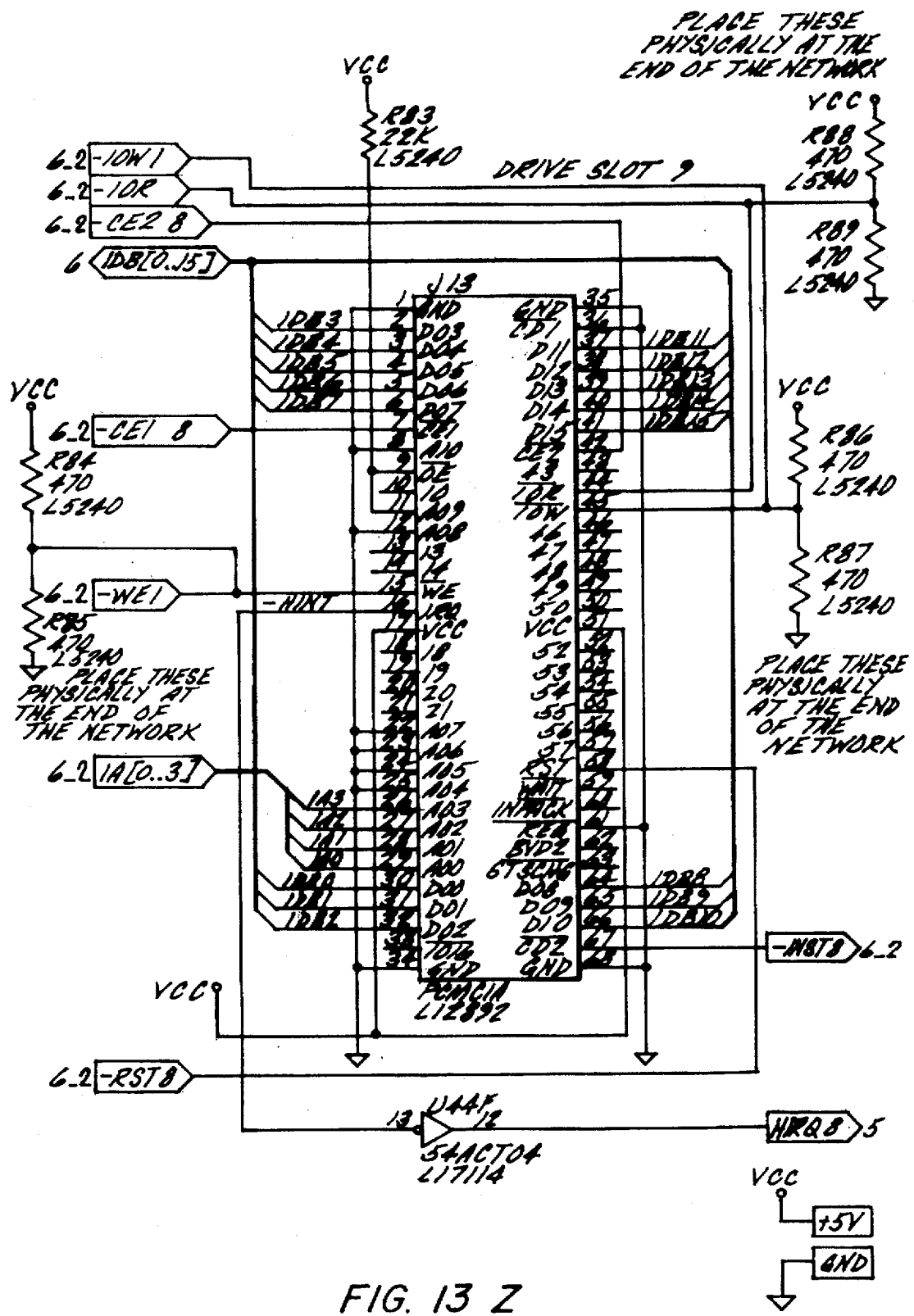
Figure 13A:
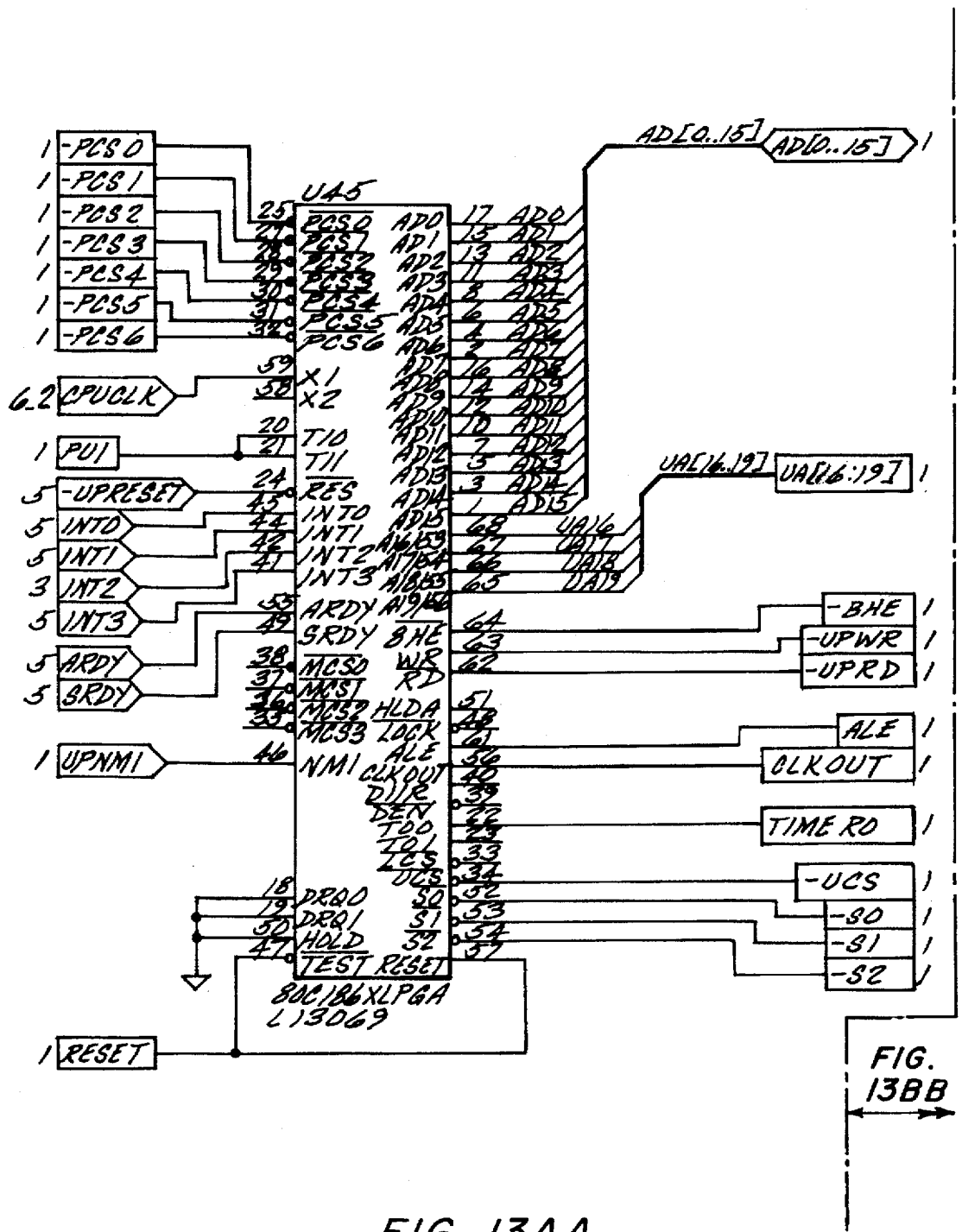
Figure 13B:
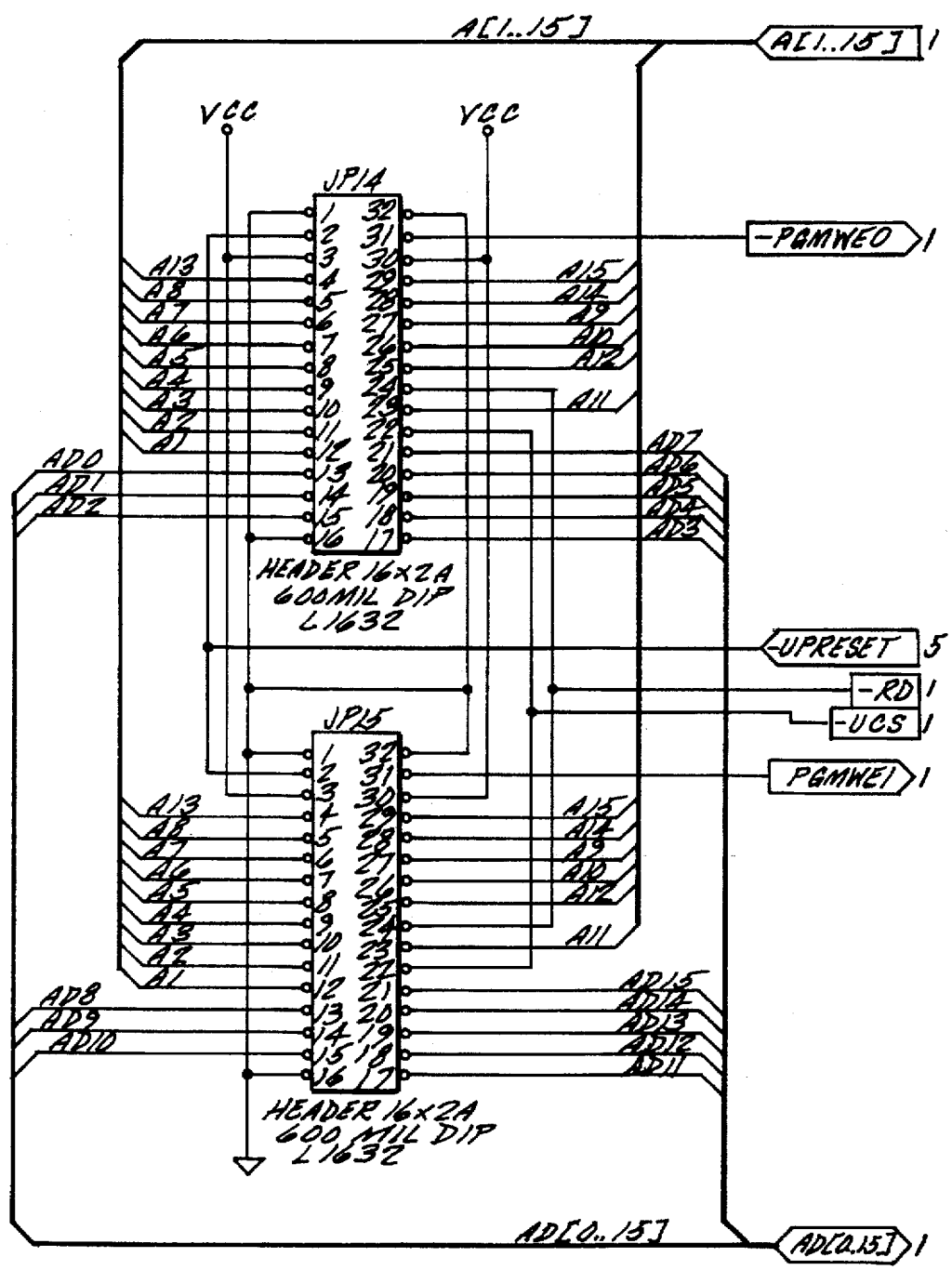
Figure 13C:
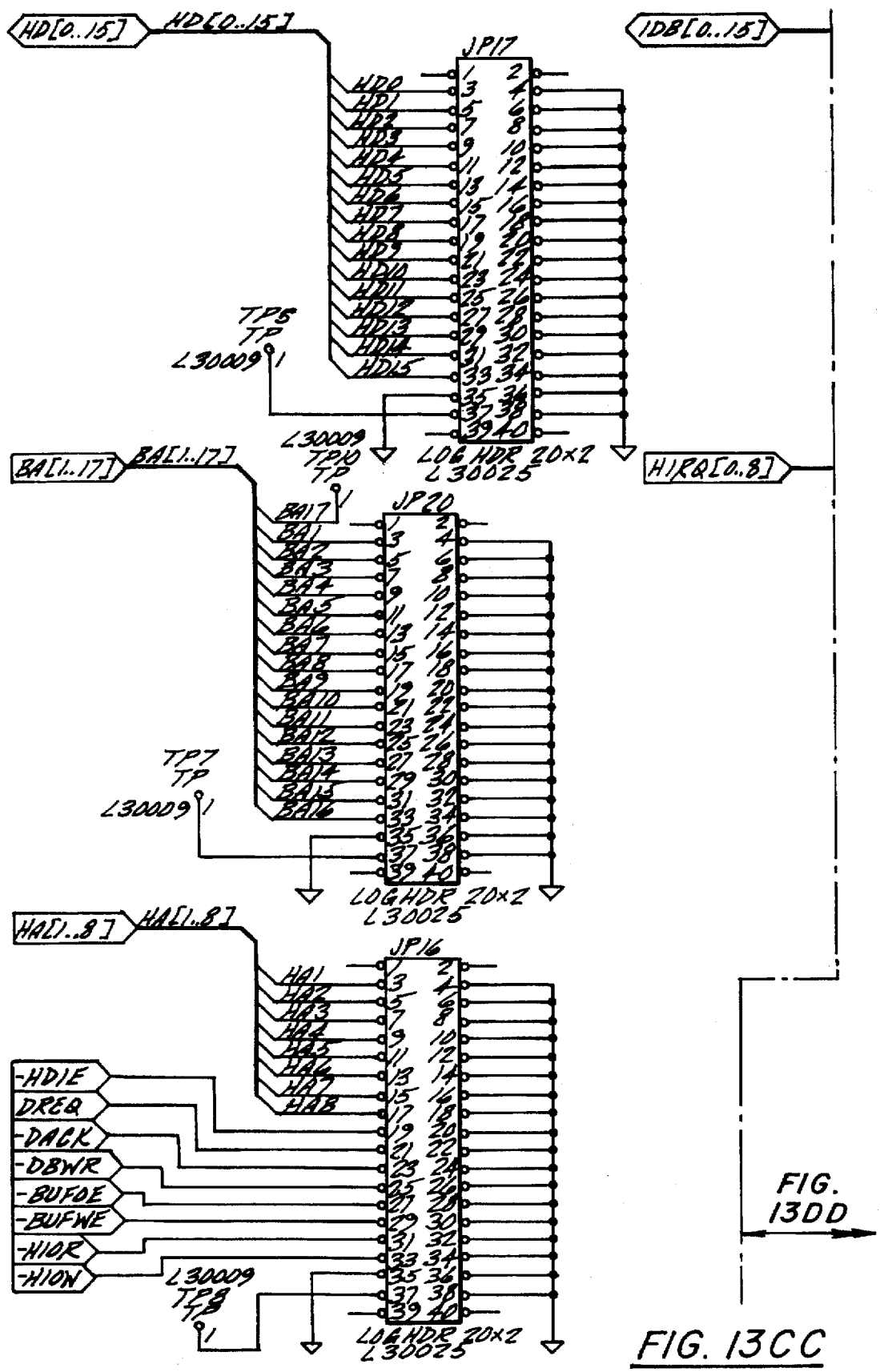
Figure 13D:
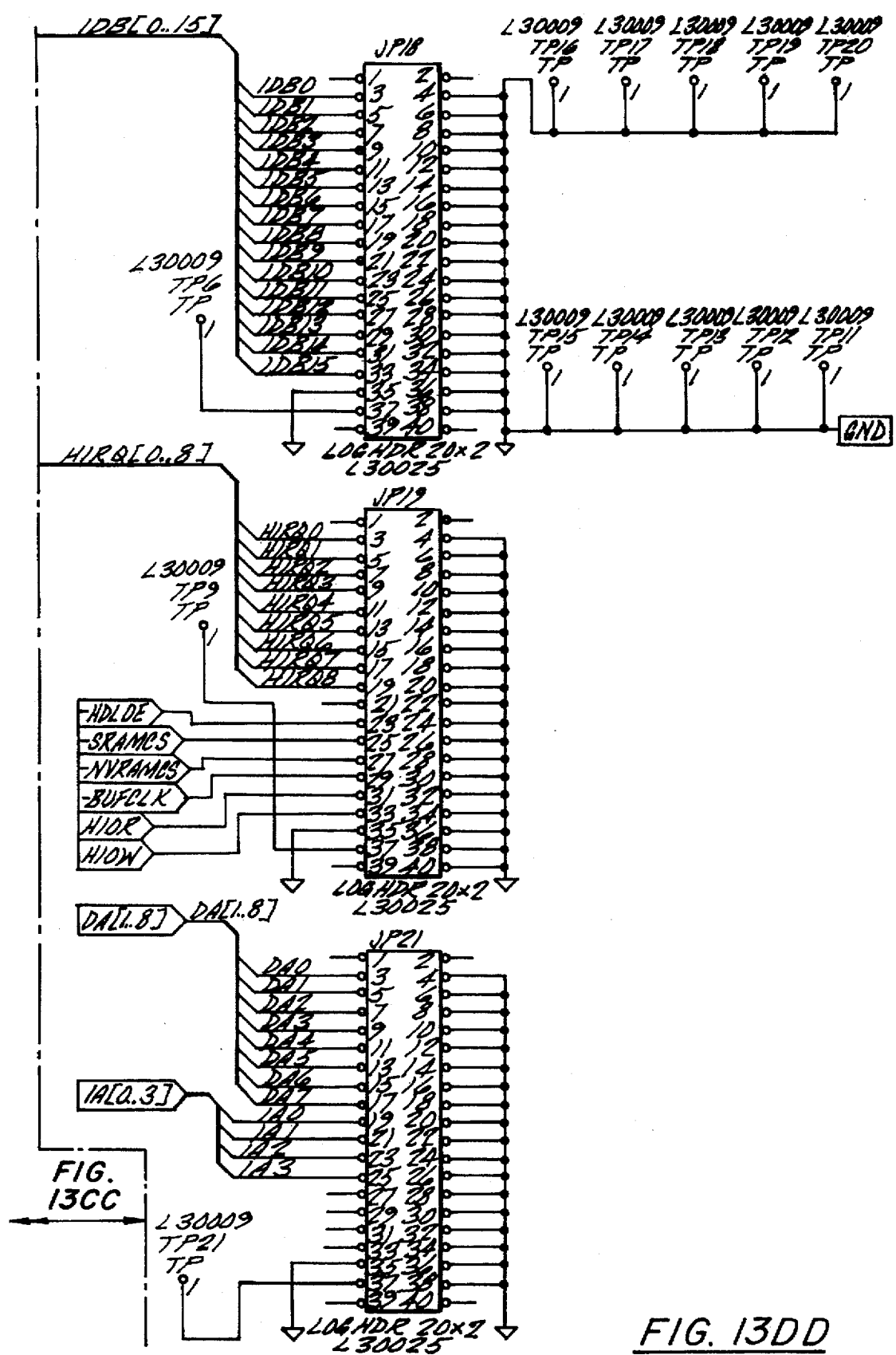
Figure 13E:
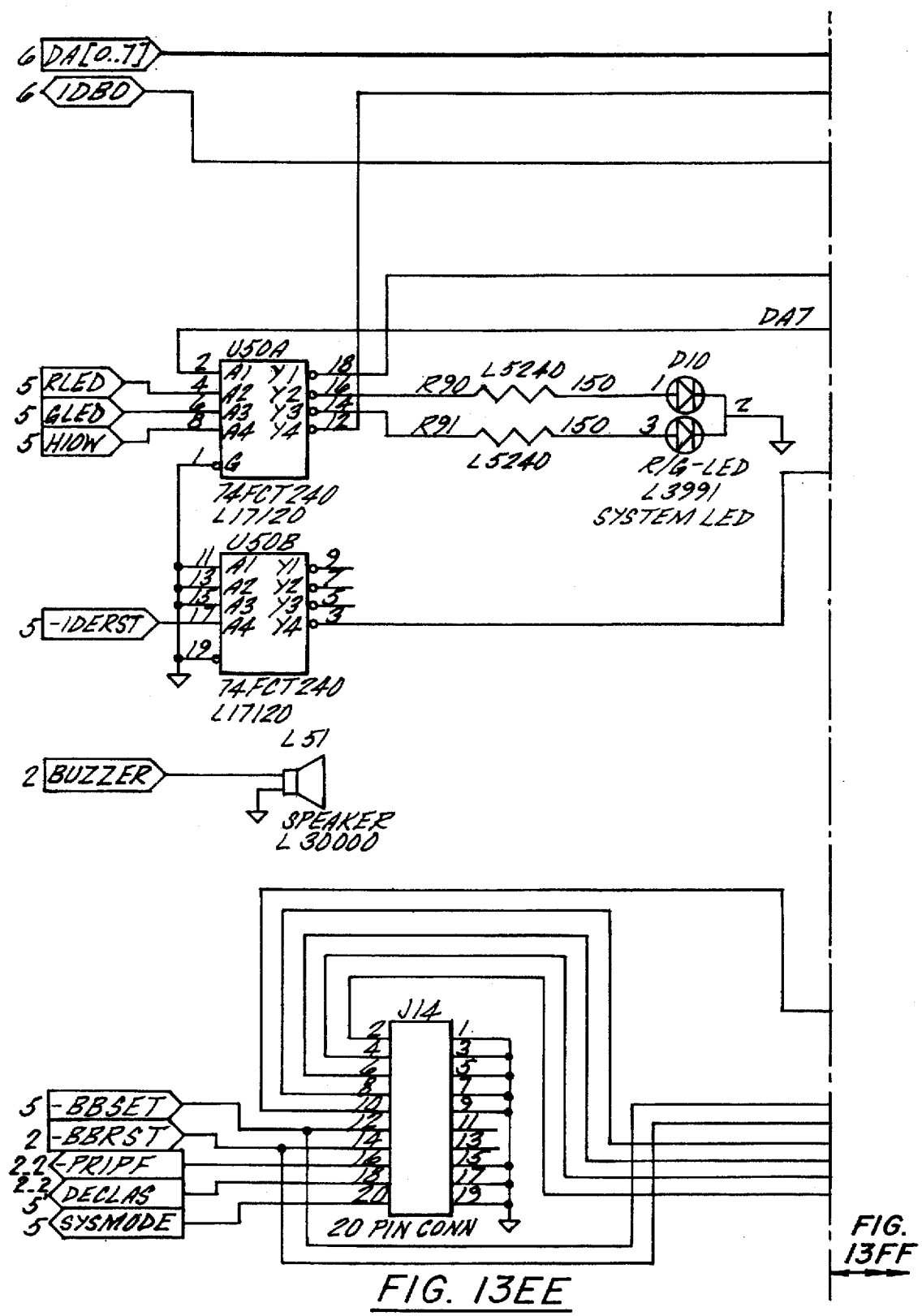
Figure 13F:
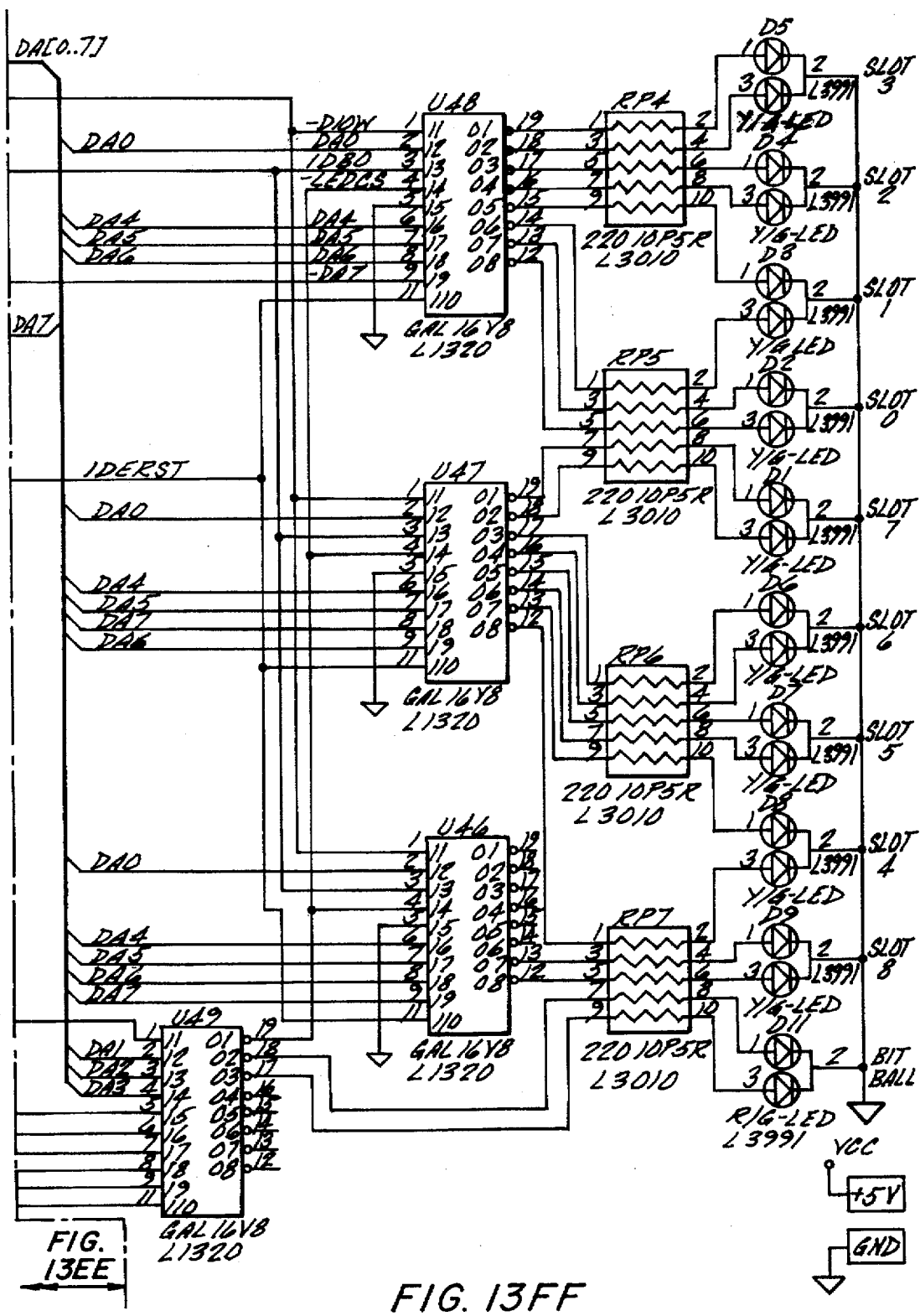

Referring to FIGS. 13A-T, schematics of the redundant array electronics for this embodiment are provided. This detailed schematic is readily understood and appreciated by one of ordinary skill in the art. It will also be appreciated that this schematic is only exemplary and not intended to limit the scope of the present invention as other circuit configurations may be apparent to one of ordinary skill in the art. In general this schematic, FIGS. 13A-T is similar to the schematic of FIGS. 8A-S with minor changes primarily required as a result of the repackaging and compliance with military specifications.

It will be appreciated that while a RAID-3 type configuration as been described herein with the redundant array of solid state memory devices, any of the RAID type configurations may be employed with the solid state memory devices without departing from the spirit or scope of the present invention. It will also be appreciated that while the above example of the present invention describes an array of flash memory PCMCIA card other electrical memory devices suitable for mass storage will suffice.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for storage of data and interfacing with a host system, comprising the steps of:

configuring a plurality of solid state memory devices, said plurality of solid state memory devices comprises a plurality of flash memory devices, each of said flash memory devices is packaged in a PCMCIA format; and presenting said plurality of solid state memory devices to the host system as a single logical solid state memory device.

2. The method claim 1 wherein said step of presenting comprises:

controlling a data path between said solid state memory devices and the host system;

generating parity at said solid state memory devices; and stripping data across said solid state memory devices.

3. The method of claim 2 further comprising the steps of:

redundantly storing executable operating routines on said solid state memory devices;

storing boot-up routines at a first memory means for system boot-up;

executing said boot-up routines;

downloading said operating routines from said solid state memory devices to second memory means in response to execution of said boot-up routines;

executing said operating routines in response to execution of said boot-up routines; and managing system setup in response to execution of said operating routines.

4. The method of claim 1 wherein said step of configuring comprises configuring said solid state memory devices to be read independently.

5. The method of claim 1 wherein said step of configuring comprises configuring said solid state memory devices so that identical data is written onto at least two of said solid state memory devices.

6. The method of claim 1 wherein said step of configuring comprises configuring said solid state memory devices to utilize complex error correction codes on at least two of said solid state memory devices.

7. The method of claim 1 wherein said step of configuring comprises configuring said solid state memory devices to employ bit-interleaved parity wherein one of said solid state memory devices supports parity which is shared among said solid state memory devices with parallel access.

8. The method of claim 1 wherein said step of configuring comprises configuring said solid state memory devices to employ block-interleaved parity wherein one of said solid state memory devices supports parity which is shared among said solid state memory devices with block stripping.

9. The method of claim 1 wherein said step of configuring comprises configuring said solid state memory devices so that parity is supported across all of said solid state memory devices with independent access.

10. A method for storage of data and interfacing with a host system, comprising the steps of:

configuring a plurality of solid state memory devices; and presenting said plurality of solid state memory devices to the host system as a single logical solid state memory device, said step of presenting comprising,
(1) controlling a data path between said solid state memory devices and the host system,
(2) generating parity at said solid state memory devices, and
(3) stripping data across said solid state memory devices.

11. The method of claim 10 wherein said plurality of solid state memory devices comprise a plurality of flash memory devices.

12. The method of claim 10 further comprising the steps of:

redundantly storing executable operating routines on said solid state memory devices;

storing boot-up routines at a first memory means for system boot-up;

executing said boot-up routines;

downloading said operating routines from said solid state memory devices to second memory means in response to execution of said boot-up routines;

executing said operating routines in response to execution of said boot-up routines; and managing system setup in response to execution of said operating routines.

13. The method of claim 10 wherein said step of configuring comprises configuring said solid state memory devices to be read independently.

14. The method of claim 10 wherein said step of configuring comprises configuring said solid state memory devices so that identical data is written onto at least two of said solid state memory devices.

15. The method of claim 10 wherein said step of configuring comprises configuring said solid state memory devices to utilize complex error correction codes on at least two of said solid state memory devices.

16. The method of claim 10 wherein said step of configuring comprises configuring said solid state memory devices to employ bit-interleaved parity wherein one of said solid state memory devices supports parity which is shared among said solid state memory devices with parallel access.

17. The method of claim 10 wherein said step of configuring comprises configuring said solid state memory devices to employ block-interleaved parity wherein one of said solid state memory devices supports parity which is shared among said solid state memory devices with block stripping.

18. The method of claim 10 wherein said step of configuring comprises configuring said solid state memory devices so that parity is supported across all of said solid state memory devices with independent access.

19. A method for storage of data and interfacing with a host system, comprising the steps of:

configuring a plurality of solid state memory devices so that identical data is written onto at least two of said solid state memory devices; and presenting said plurality of solid state memory devices to the host system as a single logical solid state memory device.

20. The method of claim 19 wherein said plurality of solid state memory devices comprise a plurality of flash memory devices.

21. A method for storage of data and interfacing with a host system, comprising the steps of:

configuring a plurality of solid state memory devices to utilize complex error correction codes on at least two of said solid state memory devices; and presenting said plurality of solid state memory devices to the host system as a single logical solid state memory device.

22. The method of claim 21 wherein said plurality of solid state memory devices comprise a plurality of flash memory devices.

23. A method for storage of data and interfacing with a host system, comprising the steps of:

configuring a plurality of solid state memory devices to employ bit-interleaved parity wherein one of said solid state memory devices supports parity which is shared among said solid state memory devices with parallel access; and presenting said plurality of solid state memory devices to the host system as a single logical solid state memory device.

24. The method of claim 23 wherein said plurality of solid state memory devices comprise a plurality of flash memory devices.

25. A method for storage of data and interfacing with a host system, comprising the steps of:

configuring a plurality of solid state memory devices to employ block-interleaved parity wherein one of said solid state memory devices supports parity which is shared among said solid state memory devices with block stripping; and presenting said plurality of solid state memory devices to the host system as a single logical solid state memory device.

26. The method of claim 25 wherein said plurality of solid state memory devices comprise a plurality of flash memory devices.

27. A method for storage of data and interfacing with a host system, comprising the steps of:

configuring a plurality of solid state memory devices so that parity is supported across all of said solid state memory devices with independent access; and presenting said plurality of solid state memory devices to the host system as a single logical solid state memory device.

28. The method of claim 27 wherein said plurality of solid state memory devices comprise a plurality of flash memory devices.

* * * * *